US008687704B2

(12) United States Patent
Jang et al.

(10) Patent No.: US 8,687,704 B2
(45) Date of Patent: Apr. 1, 2014

(54) BITSTREAM DECODING DEVICE AND METHOD

(75) Inventors: Euee-Seon Jang, Seoul (KR); Chung-Ku Lee, Incheon (KR); Hyun-Gyu Kim, Seoul (KR); Shin-Wook Lee, Seoul (KR); Jea-Bum Jun, Seoul (KR)

(73) Assignee: Humax Co., Ltd., Seongnam-si (KR)

( * ) Notice: Subject to any disclaimer, the term of this patent is extended or adjusted under 35 U.S.C. 154(b) by 287 days.

(21) Appl. No.: 12/738,484

(22) PCT Filed: Oct. 20, 2008

(86) PCT No.: PCT/KR2008/006197
§ 371 (c)(1),
(2), (4) Date: Apr. 16, 2010

(87) PCT Pub. No.: WO2009/051459
PCT Pub. Date: Apr. 23, 2009

(65) Prior Publication Data
US 2010/0220793 A1 Sep. 2, 2010

(30) Foreign Application Priority Data
Oct. 19, 2007 (KR) ........................ 10-2007-0105828

(51) Int. Cl.
*H04N 7/12* (2006.01)
*H04N 11/02* (2006.01)

(52) U.S. Cl.
USPC ............ 375/240.25; 375/E7.024; 375/E7.026

(58) Field of Classification Search
USPC .......................................................... 375/240
See application file for complete search history.

(56) References Cited

U.S. PATENT DOCUMENTS 5,398,072 A * 3/1995 Auld ........................ 375/240.25
5,452,006 A * 9/1995 Auld ........................ 375/240.26
5,502,494 A * 3/1996 Auld ........................ 375/240.25
5,566,089 A * 10/1996 Hoogenboom .............. 358/1.15
5,621,772 A * 4/1997 Maturi et al. ................ 375/366
5,646,693 A * 7/1997 Cismas .......................... 348/441
5,686,965 A * 11/1997 Auld ........................ 375/240.01

(Continued)

FOREIGN PATENT DOCUMENTS

WO WO 2007/114586 A1 10/2007

OTHER PUBLICATIONS

Wipliez, M.; Roquier, G.; Raulet, M.; Nezan, J.-F.; Deforges, O.; , "Code generation for the MPEG Reconfigurable Video Coding framework: From CAL actions to C functions," Multimedia and Expo, 2008 IEEE International Conference on , vol., No., pp. 1049-1052, Jun. 23, 2008-Apr. 26, 2008 doi: 10.1109/ICME.2008.4607618.*

(Continued)

*Primary Examiner* — Christopher S Kelley
*Assistant Examiner* — Asmamaw G Tarko
(74) *Attorney, Agent, or Firm* — Birch, Stewart, Kolasch & Birch, LLP

(57) ABSTRACT

A bitstream decoding apparatus and a method thereof, where the bitstream decoding apparatus includes: a decoder forming unit, configured to generate and output CSCI control information and connection control information by using partial decoder descriptions stored in a description storing unit; and a decoding unit, which selectively loads a plurality of functional units included in a toolbox by using the CSCI control information and the connection control information to decode a bitstream to video data.

4 Claims, 61 Drawing Sheets

(56) References Cited

U.S. PATENT DOCUMENTS

| | | | | |
|---|---|---|---|---|
| 5,703,793 | A * | 12/1997 | Wise et al. | 382/232 |
| 5,703,877 | A * | 12/1997 | Nuber et al. | 370/395.64 |
| 5,706,002 | A * | 1/1998 | Meehan et al. | 341/67 |
| 5,731,839 | A * | 3/1998 | Panaro | 375/240.15 |
| 5,740,307 | A * | 4/1998 | Lane | 386/343 |
| 5,793,927 | A * | 8/1998 | Lane | 386/200 |
| 5,798,788 | A * | 8/1998 | Meehan et al. | 348/180 |
| 5,801,973 | A * | 9/1998 | Wise et al. | 708/203 |
| 5,821,885 | A * | 10/1998 | Wise et al. | 341/67 |
| 5,835,636 | A * | 11/1998 | Auld | 382/233 |
| 5,850,258 | A * | 12/1998 | Kang | 375/240.01 |
| 5,940,016 | A * | 8/1999 | Lee | 341/67 |
| 5,982,830 | A * | 11/1999 | Maturi et al. | 375/366 |
| 6,031,960 | A * | 2/2000 | Lane | 386/326 |
| 6,075,576 | A * | 6/2000 | Tan et al. | 348/425.4 |
| 6,088,047 | A * | 7/2000 | Bose et al. | 345/547 |
| 6,088,391 | A * | 7/2000 | Auld et al. | 375/240.15 |
| 6,101,221 | A * | 8/2000 | Varanasi et al. | 375/240 |
| 6,122,316 | A * | 9/2000 | Varanasi et al. | 375/240.12 |
| 6,122,321 | A * | 9/2000 | Sazzad et al. | 375/240.03 |
| 6,148,032 | A * | 11/2000 | Pearlstein et al. | 375/240.15 |
| 6,178,203 | B1 * | 1/2001 | Lempel | 375/240.24 |
| 6,198,773 | B1 * | 3/2001 | Gill et al. | 375/240.26 |
| 6,215,822 | B1 * | 4/2001 | Bose et al. | 375/240.16 |
| 6,229,852 | B1 * | 5/2001 | Hoang | 375/240.25 |
| 6,233,277 | B1 * | 5/2001 | Ozcelik et al. | 375/240.02 |
| 6,236,681 | B1 * | 5/2001 | Varanasi et al. | 375/240.15 |
| 6,330,665 | B1 * | 12/2001 | Wise et al. | 712/300 |
| 6,385,248 | B1 * | 5/2002 | Pearlstein et al. | 375/240.25 |
| 6,389,071 | B1 * | 5/2002 | Wilson | 375/240 |
| 6,542,541 | B1 * | 4/2003 | Luna et al. | 375/240.01 |
| 6,574,273 | B1 * | 6/2003 | Luna et al. | 375/240 |
| 6,799,246 | B1 * | 9/2004 | Wise et al. | 711/117 |
| 6,836,514 | B2 * | 12/2004 | Gandhi et al. | 375/240.27 |
| 6,850,568 | B1 * | 2/2005 | Williams et al. | 375/240.16 |
| 6,891,893 | B2 * | 5/2005 | Sullivan et al. | 375/240.25 |
| 6,892,296 | B2 * | 5/2005 | Wise et al. | 712/300 |
| 6,940,912 | B2 * | 9/2005 | Sullivan et al. | 375/240.26 |
| 6,950,930 | B2 * | 9/2005 | Wise et al. | 712/300 |
| 6,965,328 | B2 * | 11/2005 | Ji | 341/50 |
| 7,025,209 | B2 * | 4/2006 | Hawkins | 709/217 |
| 7,047,305 | B1 * | 5/2006 | Brooks et al. | 709/231 |
| 7,069,573 | B1 * | 6/2006 | Brooks et al. | 725/62 |
| 7,072,880 | B2 * | 7/2006 | Beesley | 1/1 |
| 7,095,783 | B1 * | 8/2006 | Sotheran et al. | 375/240.01 |
| 7,200,858 | B1 * | 4/2007 | Benjamin et al. | 725/90 |
| 7,230,986 | B2 * | 6/2007 | Wise et al. | 375/240.26 |
| 7,376,191 | B2 * | 5/2008 | Melick et al. | 375/259 |
| 7,412,001 | B2 * | 8/2008 | Dufour et al. | 375/240.08 |
| 7,428,266 | B2 * | 9/2008 | Sullivan et al. | 375/240.26 |
| 7,433,824 | B2 * | 10/2008 | Mehrotra et al. | 704/501 |
| 7,609,762 | B2 * | 10/2009 | Crinon et al. | 375/240.13 |
| 7,852,919 | B2 * | 12/2010 | Crinon et al. | 375/240.13 |
| 8,085,680 | B1 * | 12/2011 | Craine | 370/252 |
| 8,149,920 | B2 * | 4/2012 | Jang et al. | 375/240.24 |
| 2002/0063792 | A1 * | 5/2002 | Speed et al. | 348/416.1 |
| 2002/0110193 | A1 * | 8/2002 | Yoo et al. | 375/240.02 |
| 2004/0179610 | A1 * | 9/2004 | Lu et al. | 375/240.25 |
| 2005/0025241 | A1 * | 2/2005 | Sullivan et al. | 375/240.12 |
| 2005/0041743 | A1 * | 2/2005 | Sullivan et al. | 375/240.24 |
| 2006/0109912 | A1 * | 5/2006 | Winger et al. | 375/240.23 |
| 2007/0071103 | A1 * | 3/2007 | Bi et al. | 375/240.18 |
| 2009/0003456 | A1 * | 1/2009 | Jang et al. | 375/240.24 |
| 2009/0103631 | A1 * | 4/2009 | Jang et al. | 375/240.25 |
| 2009/0161767 | A1 * | 6/2009 | Jang et al. | 375/240.24 |
| 2010/0034294 | A1 * | 2/2010 | Jang et al. | 375/240.25 |
| 2010/0054342 | A1 * | 3/2010 | Jang et al. | 375/240.25 |
| 2010/0208829 | A1 * | 8/2010 | Jang et al. | 375/240.25 |
| 2010/0220793 | A1 * | 9/2010 | Jang et al. | 375/240.25 |
| 2010/0278273 | A1 * | 11/2010 | Jang et al. | 375/240.25 |
| 2011/0032985 | A1 * | 2/2011 | Jang et al. | 375/240.02 |
| 2011/0044410 | A1 * | 2/2011 | Jang et al. | 375/340 |
| 2011/0116554 | A1 * | 5/2011 | Kwon et al. | 375/240.25 |
| 2011/0243250 | A1 * | 10/2011 | Jang et al. | 375/240.25 |
| 2011/0299603 | A1 * | 12/2011 | Jang et al. | 375/240.25 |
| 2012/0082242 | A1 * | 4/2012 | Narroschke et al. | 375/240.25 |

OTHER PUBLICATIONS

"Reconfigurable Video Coding Requirements v.3.0", Requirements and Video Group, ISO/IEC JTC1/SC29/WG11 N8943, Apr. 2007, pp. 1-9.

Jang et al., "Whitepaper on Reconfigurable Video Coding (RVC)", Video and ISG Subgroup, ISO/IEC JTC1/SC29/WG11, M8485, Oct. 2006, pp. 1-2.

Lee et al., "Results of CE 1.1 and Proposal of updated WD text for CDDL", ISO/IEC JTC1/SC29/WG11, MPEG2007/m14657, Jul. 2007, pp. 1-35.

Lee et al., "Working Draft 2 of ISO/IEC 23001-4: Codec Configuration Representation", Video Subgroup, ISO/IEC JTC1/SC29/WG11, MPEG2006/N8476, Oct. 2006, pp. 1-79.

Lee et al., "Working Draft 3.0 of ISO/IEC 23002-4: Video Tool Library" Video Subgroup, ISO/IEC JTC1/SC29/WG11, MPEG2006/N8769, Jan. 2007, pp. 1-148.

Wikipedia, "Reconfigurable video coding", Wikipedia , The Free Encyclopedia, Internet Citation, Sep. 2, 2011, XP007919780, pp. 1-2.

* cited by examiner

Example of functional units for performing syntax parsing

Example of functional units for performing decoding

FIG. 18

| Index No. | FU name | # of input CS/CI | # of output CS/CI | Input data | Output data |
|---|---|---|---|---|---|
| F0 | Parsing FU | 0 | 67 | – | – |
| F1 | DCR | 4 | 0 | QFS | QFSP |
| F2 | IS | 2 | 0 | QFSP | PQF |
| F3 | IAP | 3 | 0 | PQF | QF |
| F4 | IQ | 1 | 0 | QF | F |
| F5 | IT | 0 | 0 | F | f |
| F6 | VR | 0 | 0 | f | D |
| … | … | … | … | … | … |

FIG. 19

<table>
<tr><th>Index</th><th>FU</th><th>InputCS/CI</th><th># of branches</th><th>Branch information</th></tr>
<tr><td>R0</td><td>F0(R0)</td><td>C63</td><td>3</td><td>1: ((C63==1) || (C63==2)) GO R1;<br>2: ((C63==3) || (C63==4)) GO END;<br>3: GO ERR;</td></tr>
<tr><td>R1</td><td>PROCESS1<br>(variable setting)</td><td>C63</td><td>2</td><td>1: (C63==1) GO R2;<br>2: (C63==2) GO R3;</td></tr>
<tr><td>R2</td><td>F0(R75)</td><td>-</td><td>1</td><td>1: GO R3;</td></tr>
<tr><td>R3</td><td>F0(R85)</td><td>-</td><td>1</td><td>1: GO R4;</td></tr>
<tr><td>R4</td><td>F0(R114)</td><td>-</td><td>1</td><td>1: GO R5;</td></tr>
<tr><td>R5</td><td>F0(R120)</td><td></td><td>1</td><td>1: GO R6;</td></tr>
<tr><td>R6</td><td>F1</td><td>-</td><td>1</td><td>1: GO R7;</td></tr>
<tr><td>R7</td><td>F2</td><td>-</td><td>1</td><td>1: GO R9;</td></tr>
<tr><td>R8</td><td>F3</td><td>-</td><td>1</td><td>1: GO R10;</td></tr>
<tr><td>R9</td><td>F4</td><td>-</td><td>1</td><td>1: GO R11;</td></tr>
<tr><td>R10</td><td>F5</td><td>-</td><td>1</td><td>1: GO R12;</td></tr>
<tr><td>R11</td><td>F6</td><td>C65<br>C66<br>C67</td><td>3</td><td>1: (C66<=6) GO R5;<br>2::(C65<=C67) GO R4;<br>3: GO R12;</td></tr>
<tr><td>R12</td><td>F0(R74)</td><td>C63</td><td>4</td><td>1: (C63==1) GO R2;<br>2: (C63==2) GO R3;<br>3: ((C63==3) || (C63==4)) GO END;<br>4: GO ERR;</td></tr>
</table>

FIG. 20

| Index No. | CSCI information | CSCI |
|---|---|---|
| F1-C1 | Quantiser_scale | C54 |
| F1-C2 | CBP | C56 |
| F1-C3 | Ac_pred_flag | C58 |
| F1-C4 | The number of MB | C65 |
| F2-C1 | CBP | C56 |
| F2-C2 | Ac_pred_flag | C58 |
| F3-C1 | Quantiser_scale | C54 |
| F3-C2 | Ac_pred_flag | C58 |
| F3-C3 | The number of MB | C65 |
| F4-C1 | Quantiser_scale | C54 |
| ... | ... | ... |

FIG. 21

| Index | Flag | Element Name | Length/Type | Global/Local | Note |
|---|---|---|---|---|---|
| C0 | 1bit | Decoding OK | 1 bit | Local | Boolean. To acknowledge whether the decoding process is clearly processing or not. |
| C1 | 1bit | Profile and level indication | 8 bit | Global | |
| C2 | 1bit | User data | 8 bit array | Global | An array of arbitrary length of user data. |
| C3 | 1bit | Visual object verID | 4 bit | Global | |
| ... | ... | ... | ... | ... | ... |
| C53 | 1bit | Alternate vertical scan flag | 1 bit | Global | |
| C54 | 1bit | VOP quant | 9 bit | Global | VLD: define CSCI storage for maximum length (9). |
| C55 | 1bit | Macro-block type | 3 bit | Global | |
| C56 | 1bit | Coded block pattern for Chroma | 1 bit array(2) | Global | |
| C57 | 1bit | D-quant | 2 bit | Global | |
| C58 | 1bit | AC prediction flag | 1 bit | Global | |
| ... | ... | ... | ... | ... | ... |
| C62 | 1bit | DCT Coefficients | 8 bit array(6)(64) | Global | |
| C63 | 1bit | GOP or VOP branch condition | 3 bit | Global | |
| C64 | 1bit | #frame | 32 bit | Global | |
| C65 | 1bit | #MB | 32 bit | Global | |
| C66 | 1bit | #Block | 8 bit | Global | |
| C67 | 1bit | #Total MB | 32 bit | Global | |

FIG. 22

<table>
<tr><th>Index</th><th>Element Name</th><th>Input</th><th>Output</th><th>Process by SET-PROC</th><th>Note</th></tr>
<tr><td>M</td><td>Marker Bit</td><td>1 bit</td><td>C0</td><td>READ 1 > C0;</td><td></td></tr>
<tr><td>S0</td><td>Visual object<br>sequence start code</td><td>32 bit</td><td>C0</td><td>READ 32 B;<br>(C0=(IBS==HEX:1B0));</td><td></td></tr>
<tr><td>S1</td><td>Profile and level indication</td><td>8 bit</td><td>C1</td><td>READ 8 > C1;</td><td></td></tr>
<tr><td>S2</td><td>Visual object<br>sequence end code</td><td>32 bit</td><td>C0</td><td>READ 32 B;<br>(C0=((IBS==HEX:1B1) || (EOF)));</td><td></td></tr>
<tr><td>S3</td><td>Is user data or not</td><td>32 bit</td><td>[C2]</td><td>SEEK 32 B;<br>IF(IBS==HEX:1B2){SET C2;}</td><td>Seek next bits and<br>branch before physically<br>read a start code.</td></tr>
<tr><td>S4</td><td>User data start code</td><td>32 bit</td><td>C0</td><td>READ 32 B;<br>(C0=(IBS==HEX:1B2);</td><td></td></tr>
<tr><td>S5</td><td>User data</td><td>8 bit<br>(Array)</td><td>C2</td><td>SEEK 24;<br>WHILE (IBS != 1) {READ 8;PUSH C2 IBS;SEEK 24;}</td><td></td></tr>
<tr><td>S6</td><td>Visual object start code</td><td>32 bit</td><td>C0<br>[C3]<br>[C4]</td><td>READ 32 B;<br>(C0=(IBS==HEX:1B5));<br>SET C3, C4;</td><td>Default some values.</td></tr>
<tr><td>S7</td><td>Is visual object identifier</td><td>1 bit</td><td>[C13]<br>[C14]</td><td>READ 1;<br>If(IBS==1){SET C13, C14;}</td><td></td></tr>
</table>

FIG. 23

| | | | | | |
|---|---|---|---|---|---|
| S8 | Visual object verID | 4 bit | [C6] | READ 4 > C3; | |
| S9 | Visual object priority | 3 bit | C4 | READ 3 > C4; | |
| S10 | Visual object type | 4 bit | C5 | READ 4 > C5; | |
| S11 | Video object start code | 32 bit | C0 | READ 32 B;<br>(C0=(IBS in HEX:100~HEX:11F)); | |
| S12 | Video signal type | 1 bit | [C6]<br>[C7] | READ 1;<br>If(IBS==1){SET C6, C7;} | Default some values. |
| S13 | Video format | 3 bit | C6 | READ 3 > C6; | |
| ... | ... | ... | ... | ... | ... |
| S32 | Video object layer shape | 2 bit | C20 | READ 2 > C20; | |
| S33 | VOP time increment resolution | 16 bit | C21<br>C0 | READ 16 > C21;<br>(C0=(C21!=0)); | 0 is forbidden. |
| S34 | Fixed VOP rate | 1 bit | C22 | READ 1 > C22; | |
| S35 | Fixed VOP time increment | 1~16bit | C23 | READ BITSIZE:C21 > C23; | Length can varied by value of VOP time increment resolution. |
| S36 | Video object layer width | 13 bit | C24<br>C0 | READ 13 > C24;<br>(C0=(C24!=0)); | 0 is forbidden. |
| S37 | Video object layer height | 13 bit | C25<br>C0 | READ 13 > C25;<br>(C0=(C25!=0)); | 0 is forbidden. |

FIG. 24

| | | | | | |
|---|---|---|---|---|---|
| S38 | Interlaced | 1 bit | C26 | READ 1 > C26; | |
| S39 | OBMC disable | 1 bit | C27 | READ 1 > C27; | |
| S40 | Sprite enable | 1/2 bit | C28 | IF (C13==1) { READ 1 > C28; }<br>ELSE { READ 2 > C28; } | |
| ... | ... | ... | ... | ... | ... |
| S55 | Reduced resolution VOP enable | 1 bit | C39 | READ 1 > C39; | |
| S56 | Scalability | 1 bit | C40 | (C40=0); | Do not read this syntax.<br>(A difference between VCTR ref SW and ISO 14496-2)<br>Original code of this syntax:READ 1 > C40; |
| S57 | GOP or VOP appears | 32 bit | C63 | SEEK 24 B;<br>IF (IBS!=1) { READ 8 B;IF (EOF)<br>{ (C63=4); STOP; }}SEEK 32 B;<br>IF (IBS==HEX:1B3) { (C63=1); }<br>ELSE IF (IBS==HEX:1B6) { (C63=2); }<br>ELSE IF (IBS==HEX:1B1)<br>{ (C63=3); }ELSE { (C63=0); } | |
| S58 | Group of VOP start code | 32 bit | C0 | READ 32 B;<br>(C0=(IBS==HEX:1B3)); | |
| S59 | Time code (Hours) | 5 bit | C41 | READ 5 > C41 | Time code element |
| S60 | Time code (Minutes) | 6 bit | C42 | READ 6 > C42; | Time code element |
| S61 | Time code (Seconds) | 6 bit | C43 | READ 6 > C43; | Time code element |

FIG. 25

| | | | | | |
|---|---|---|---|---|---|
| S62 | Closed GOV | 1 bit | C44 | READ 1 > C44; | |
| ... | ... | ... | ... | ... | ... |
| S75 | D-quant | 2 bit | C57 | READ 2 > C57; | |
| S76 | AC prediction flag | 1 bit | C58 | READ 1 > C58; | |
| S77 | CBPY | 1~6 bit | C59 | VLD [1];(C59[0]=DIGIT:IBS_1);<br>(C59[1]=DIGIT:IBS_2);<br>(C59[2]=DIGIT:IBS_3);<br>(C59[3]=DIGIT:IBS_4); | |
| S78 | DCT DC size luminance | 2~11 bit | C60 | VLD [2] > C60[C66]; | |
| ... | ... | ... | ... | ... | ... |
| S81 | DCT Coefficients | 19 bit | C62 | IF (C66<4) {(V7 = (3 - C66));<br>(V1=(DIGIT:C59_V7));}<br>ELSE {(V7 = (5 -C66));<br>(V1=(DIGIT:C56_V7));}<br>IF (V1 != 0) {(V5 = 0);<br>UNTIL (V5 == 0) {VLD [4] > V2;<br>RLD V2,V3,V4,V5,T4;(V6 = 1);<br>WHILE (V6 < V4) {(C62[C66][V6] = 0);<br>(V6++);}(C62[C66][V6] = V3);(V6++);}<br>WHILE (V6 < 64) {(C62[C66][V6] = 0);(V6++);}} | |

FIG. 26

| Index | Syntax | Input | No. of Branches | Branch information | Note |
|---|---|---|---|---|---|
| ERR | - | - | - | None. | An FSM state that identifies a fatal error occurred during decoding process. |
| R0 | S0 | C0 | 2 | 1: (C0==1) GO R1;<br>2: GO ERR; | VS start code |
| R1 | S1 | - | 1 | 1: GO R2; | |
| R2 | S3 | [C2] | 2 | 1: ([C2]==1) GO R3;<br>2: GO R5; | User data or not |
| R3 | S4 | - | 1 | 1: GO R4; | User data start code |
| R4 | S5 | - | 1 | 1: GO R5; | User data |
| R5 | S6 | C0 | 2 | 1: (C0==1) GO R6;<br>2: GO ERR; | VO start code |
| R6 | S7 | [C13]<br>[C14] | 2 | 1: ([C13]==1 && [C14]==1) R7;<br>2: GO R9; | Branch : VO identifier |
| R7 | S8 | - | 1 | 1: GO R8; | |
| R8 | S9 | - | 1 | 1: GO R9; | |
| R9 | S10 | C5 | 2 | 1: ((C5==1) \|\| (C5==2)) GO R10;<br>2: GO R17; | Branch : Video signal type parameters by VO type |
| R10 | S12 | [C6]<br>[C7] | 2 | 1: ([C6]==1 && [C7]==1) GO R11;<br>2: GO R17; | Branch : Video signal type → |
| … | … | … | … | … | … |

FIG. 27

| | | | | | |
|---|---|---|---|---|---|
| R20 | S11 | C0 | 2 | 1: (C0==1) GO R21;<br>2: GO ERR; | Video object start code |
| R21 | S19 | C0 | 2 | 1: (C0==1) GO R22;<br>2: GO ERR; | Video object layer start code |
| R22 | S20 | - | 1 | 1: GO R23; | |
| R23 | S21 | C12 | 2 | 1: (C12==BIN:00010010) GO ERR;<br>2: GO R24; | VO type indication=Fine Granularity Scalable →<br>Do not process this branch now yet. (SP/ASP) |
| R24 | S22 | [C13]<br>[C14]<br>[C15] | 2 | 1: ([C13]==1 && [C14]==1<br>&& [C15]==1) GO R25;<br>2: GO R27; | Branch : VOL identifiers → |
| R25 | S23 | - | 1 | 1: GO R26; | |
| R26 | S24 | - | 1 | 1: GO R27; | |
| R27 | S25 | C15 | 2 | 1: (C15==BIN:1111) GO R28;<br>2: GO R30; | Branch : Extended-PAR parameters → |
| R28 | S26 | C0 | 1 | 1: (C0==1) GO R29;<br>2: GO ERR; | Forbidden value check |
| R29 | S27 | C0 | 1 | 1: (C0==1) (C67=(C24*C25/256));<br>GO R30;<br>2: GO ERR; | Forbidden value check |
| R30 | S28 | [C18]<br>[C19] | 2 | 1: ([C18]==1 && [C19]==1) GO R31;<br>2: GO R34; | Branch : VOL control parameters → |
| R31 | S29 | - | 1 | 1: GO R32; | |
| R32 | S30 | - | 1 | 1: GO R33; | |

FIG. 28

<table>
<tr><td>R33</td><td>S31</td><td>[C20]</td><td>2</td><td>1: ([C20]==1) GO ERR;<br>2: GO R34;</td><td>VBV parameters →<br>Do not process this branch now yet. (SP/ASP)</td></tr>
<tr><td>R34</td><td>S32</td><td>C20<br>C12</td><td>2</td><td>1: ((C20==3) && (C12!=1)) GO ERR;<br>2: GO R35;</td><td>Video object layer shape extension→<br>Do not process this branch now yet. (SP/ASP)</td></tr>
<tr><td>R35</td><td>M</td><td>C0</td><td>2</td><td>1: (C0==1) GO R36;<br>2: GO ERR;</td><td>Marker bit</td></tr>
<tr><td>...</td><td>...</td><td>...</td><td>...</td><td>...</td><td>...</td></tr>
<tr><td>R49</td><td>S40</td><td>C28</td><td>2</td><td>1: ((C28==1) || (C28==2)) GO ERR;<br>2: GO R50;</td><td>Sprite enable: Length variation branch is controlled in SET.Sprite enabled (static, GMC) syntax → Do not process this branch now yet. (SP/ASP)</td></tr>
<tr><td>R50</td><td>-</td><td>C13<br>C20</td><td>2</td><td>1: ((C13!=1) && (C20!=0)) GO ERR;<br>2: GO R51;</td><td>SADCT disable →<br>Do not process this branch now yet. (SP/ASP)</td></tr>
<tr><td>R51</td><td>S41</td><td>-</td><td>1</td><td>1: GO R52;</td><td></td></tr>
<tr><td>R52</td><td>S42</td><td>C30</td><td>2</td><td>1: (C30==1) GO R53;<br>2: GO R59;</td><td>Branch : Matrix loadings →</td></tr>
<tr><td>R53</td><td>S43</td><td>[C31]</td><td>2</td><td>1: ([C31]==1) GO R54;<br>2: GO R55;</td><td>Branch : Load intra matrix or not →</td></tr>
<tr><td>R54</td><td>S44</td><td>C0</td><td>2</td><td>1: (C0==1) GO R56;<br>2: GO ERR;</td><td></td></tr>
<tr><td>...</td><td>...</td><td>...</td><td>...</td><td>...</td><td>...</td></tr>
<tr><td>R65</td><td>-</td><td>C13</td><td>2</td><td>1: (C13!=1) GO R66;<br>2: GO R68;</td><td>Branch : New-prediction →</td></tr>
</table>

FIG. 29

| | | | | | |
|---|---|---|---|---|---|
| R66 | S54 | C38 | 2 | 1: (C38==1) GO ERR;<br>2: GO R67; | New-prediction parameters →<br>Do not process this branch now yet. (SP/ASP) |
| R67 | S55 | - | 1 | 1: GO R68; | |
| R68 | S56 | C40 | 2 | 1: (C40==1) GO ERR;<br>2: GO R69; | Scalability parameters →<br>Do not process this branch now yet. (SP/ASP) |
| R69 | S3 | [C2] | 2 | 1: ([C2]==1) GO R70;<br>2: GO R72; | User data or not |
| R70 | S4 | - | 1 | 1: GO R71; | User data start code |
| R71 | S5 | - | 1 | 1: GO R72; | User data |
| R72 | S57 | - | 1 | 1: GO RT; | Branch : GOP or VOP → |
| R73 | S58 | C0 | 2 | 1: (C0==1) GO R74;<br>2: GO ERR; | Group of VOP start code |
| R74 | S59 | - | 1 | 1: GO R75; | |
| ... | ... | ... | ... | ... | ... |

FIG. 30

| name | value | code |
|---|---|---|
| MCBPC | 0 | 1 |
| MCBPC | 1 | 001 |
| MCBPC | 2 | 010 |
| ... | ... | ... |
| MCBPC | 8 | 000000001 |
| MCBPC | 9 | NULL |
| CBPY | 0 | 0011 |
| CBPY | 1 | 00101 |
| CBPY | 2 | 00100 |
| ... | ... | ... |
| CBPY | 17 | 000001 |
| CBPY | 18 | NULL |
| intraDCy | 0 | 011 |
| intraDCy | 1 | 11 |
| intraDCy | 2 | 10 |

FIG. 31

| | | |
|---|---|---|
| intraDCy | 3 | 010 |
| ... | ... | ... |
| intraDCy | 12 | 00000000001 |
| intraDCy | 13 | NULL |
| intraDCc | 0 | 11 |
| intraDCc | 1 | 10 |
| intraDCc | 2 | 01 |
| ... | ... | ... |
| intraDCc | 12 | 000000000001 |
| intraDCc | 13 | NULL |
| DCT intra | 0 | 10 |
| DCT intra | 1 | 1111 |
| ... | ... | ... |
| DCT intra | 101 | 000001011111 |
| DCT intra | 102 | 0000011 |
| DCT intra | 103 | NULL |

FIG. 32

| Command | Usage | Example |
|---|---|---|
| READ | READ bits B > CSCI; | READ 32 B > C0;<br>READ 8;<br>READ 1 > C12; |
| SEEK | SEEK bits B > CSCI; | SEEK 32 B > C0; |
| FLUSH | FLUSH bits B; | FLUSH 8; |
| IF | IF (condition) { ~ }<br>ELSE { ~ } | |
| WHILE | WHILE (condition) { ~ } | |
| UNTIL | UNTIL (condition) { ~ } | |
| DO~WHILE | DO { ~ } WHILE (condition) | |
| DO~UNTIL | DO { ~ } UNTIL (condition) | |
| ( ~ ) (compute) | ( ……… ) | (C11=(V2+3)); |
| BREAK | BREAK; | |
| SET | SET CSCI, CSCI… ; | SET C0, C2; |
| STOP | STOP; | |
| PUSH | PUSH CSCI Value, Value… ; | PUSH C8 8, 16, 32; |
| GO | GO R#;; | GO R23; |
| HEX | HEX:value; | HEX:0F; |
| RLD | RLD index, level, run, islastrun, t#; | RLD V1, V2, V3, V4, T4; |
| VLD2 | VLD2 [T#] in > v1, v2, v3; | VLD2 [0] IBS > V1, V2, V3; |
| VLD4 | VLD4 [T#] > CSCI; | VLD4 [0] > C56; |

FIG. 33

| Index | Element Name | Input | Output | Process by SET-PROC | Note |
|---|---|---|---|---|---|
| M | Marker Bit | 1 bit | C0 | READ 1 > C0; | |
| S0 | start_code | 32 bit | C0 | READ 32 B;<br>IF (IBS== HEX:000001B3) C72=1;<br>IF (IBS== HEX:000001B8) C72=2;<br>IF (IBS== HEX:00000100) C72=3;<br>IF (IBS== HEX:000001B7) C72=4; | sequence_header_code<br>group_start_code<br>picture_start_code<br>sequence_end_code |
| S1 | horizontal_size_value | 12 bit | C1<br>[C1] | READ 12 > C1;<br>SET C1; | |
| S2 | vertical_size_value | 12 bit | C2<br>[C2] | READ 12 > C2;<br>SET C2; | |
| S3 | aspect_ratio_information | 4 bit | C3 | READ 4 > C3; | |
| S4 | frame_rate_code | 4 bit | C4<br>[C4] | READ 4 > C4;<br>SET C4; | |
| S5 | bit_rate_value | 18 bit | C5<br>[C5] | READ 18 > C5;<br>SET C5; | |
| S6 | vbv_buffer_size_value | 10 bit | C6<br>[C6] | READ 10 > C6;<br>SET C6; | |
| S7 | constrained_parameters_flag | 1 bit | C7 | READ 1 > C7; | |
| S8 | load_intra_quantiser_matrix | 1 bit | [C8] | READ 1;IF(IBS==1) {SET C8;} | |
| S9 | Intra quantiser matrix | 8 bit<br>(Array) | C8 | (V1=0);DO {READ 8;PUSH C8<br>IBS;(V1++);} UNTIL (V1==64); | |

FIG. 34

| | | | | | |
|---|---|---|---|---|---|
| S10 | Default intra quantiser matrix | 8 bit (Array) | C8 | PUSH C8 08, 16, 19, 22, 26, 27, 29, 34;<br>PUSH C8 16, 16, 22, 24, 27, 29, 34, 37;<br>PUSH C8 19, 22, 26, 27, 29, 34, 34, 38;<br>PUSH C8 22, 22, 26, 27, 29, 34, 37, 40;<br>PUSH C8 22, 26, 27, 29, 32, 35, 40, 48;<br>PUSH C8 26, 27, 29, 32, 35, 40, 48, 58;<br>PUSH C8 26, 27, 29, 34, 38, 46, 56, 69;<br>PUSH C8 27, 29, 35, 38, 46, 56, 69, 83; | |
| S11 | load_non_intra_ quantiser_matrix | 1 bit | [C9] | READ 1;IF(IBS==1) {SET C9;} | |
| S12 | non_Intra quantiser matrix | 8 bit (Array) | C9 | (V1=0);DO {READ 8;PUSH C9 IBS; (V1++);} UNTIL (V1==64); | |
| S13 | Default non_intra quantiser matrix | 8 bit (Array) | C9 | PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16; | |
| S14 | chroma_intra_ quantizer_matrix | 8 bit (Array) | C10 | (V1=0);DO {PUSH C10 C8;(V1++);} UNTIL (V1==64); | |
| S15 | chroma_non_intra_ quantizer_matrix | 8 bit (Array) | C11 | (V1=0);DO {PUSH C11 C9;(V1++);} UNTIL (V1==64); | |
| S16 | extension_start_code | 32 bit | C0 | READ 32 B;(C0=(IBS==HEX:000001B5)); | |
| S17 | extension_start_ code_identifier | 4 bit | C12 | READ 4 > C12; | |

FIG. 35

| | | | | | |
|---|---|---|---|---|---|
| S18 | profile_and_level_indication | 8 bit | C13<br>C24<br>C25 | READ 8 > C13;<br>C24 = C13 >> 4;<br>C25 = C13 & HEX:F; | |
| S19 | progressive_sequence | 1 bit | C14 | READ 1 > C14; | |
| S20 | chroma_format | 2 bit | C15 | READ 1 > C15; | |
| S21 | horizontal_size_extension | 2 bit | C16<br>C1 | READ 2 > C16;IF ([C1]==1)<br>{C1= (C16<<12) \| (C1 & HEX:0fff);} | |
| S22 | vertical_size_extension | 2 bit | C17<br>C2 | READ 2 > C17;IF ([C2]==1)<br>{C2= (C17<<12) \| (C2 & HEX:0fff);} | |
| S23 | bit_rate_extension | 12 bit | C18<br>C5<br>C28 | READ 12 > C18;<br>IF ([C5]==1) { C5 += (C18<<18);}<br>C26 = ((double) C5) * 400.0; | |
| S24 | vbv_buffer_size_extension | 8 bit | C19<br>C6 | READ 8 > C19;IF ([C6]==1)<br>{C6+= (C19 << 10);} | |
| S25 | low_delay | 1 bit | C20 | READ 1 > C20; | |
| S26 | frame_rate_extension_n | 2 bit | C21<br>[C21] | READ 2 > C21;<br>SET C21; | |
| S27 | frame_rate_extension_d | 5 bit | C22<br>[C22] | READ 5 > C22;<br>SET C22; | |
| S28 | | | C23 | IF(([C4]==1)&&([C21]==1)&&([C22]==1))<br>{FRATE C4 > V1;}<br>C23 = V1*((C21+1)/(C22+1));} | |

FIG. 36

| | | | | | |
|---|---|---|---|---|---|
| S29 | video_format | 3 bit | C27 | READ 3 > C27; | |
| S30 | color_description | 1 bit | [C28]<br>[C29]<br>[C30] | READ 1;<br>IF (IBS==1)<br>{SET C28;SET C29;SET C30;} | |
| S31 | color_primaries | 8 bit | C28 | READ 8 > C28; | |
| S32 | transfer_characteristics | 8 bit | C29 | READ 8 > C29; | |
| S33 | matrix_coefficients | 8 bit | C30 | READ 8 > C30; | |
| S34 | display_horizontal_size | 14 bit | C31 | READ 14 > C31; | |
| S35 | display_vertical_size | 14 bit | C32 | READ 14 > C32; | |
| S36 | drop_flag | 1 | C33 | READ 1 > C33; | |
| S37 | hour | 5 | C34 | READ 5 > C34; | |
| S38 | minute | 6 | C35 | READ 6 > C35; | |
| S39 | sec | 6 bit | C36 | READ 6 > C36; | |
| S40 | frame | 6 bit | C37 | READ 6 > C37; | |
| S41 | closed_gop | 1 bit | C38 | READ 1 > C38; | |
| S42 | broken_link | 1 bit | C39 | READ 1 > C39; | |
| S43 | temporal_reference | 10 bit | C40 | READ 10 > C40; | |
| S44 | picture_coding_type | 3 bit | C41 | READ 3 > C41; | |
| S45 | vbv_delay | 16bit | C42 | READ 16 > C42; | |

FIG. 37

| | | | | | |
|---|---|---|---|---|---|
| S46 | f_code | 4bit (Array) | C43 | (V1=0);<br>DO { READ 4;PUSH C43 IBS;<br>(V1++);}UNTIL (V1==4); | |
| S47 | intra_dc_precision | 2 bit | C44 | READ 2 > C44; | |
| S48 | picture_structure | 2 bit | C45 | READ 2 > C45; | |
| S49 | top_field_first | 1 bit | C46 | READ 1 > C46; | |
| S50 | frame_pred_frame_dct | 1 bit | C47 | READ 1 > C47; | |
| S51 | concealment_motion_vectors | 1 bit | C48 | READ 1 > C48; | |
| S52 | q_scale_type | 1 bit | C49 | READ 1 > C49; | |
| S53 | intra_vlc_format | 1 bit | C50 | READ 1 > C50; | |
| S54 | alternate_scan | 1 bit | C51 | READ 1 > C51; | |
| S55 | repeat_fist_field | 1 bit | C52 | READ 1 > C52; | |
| S56 | chroma_420_type | 1 bit | C53 | READ 1 > C53; | |
| S57 | progressive_frame | 1 bit | C54 | READ 1 > C54 | |
| S58 | composite_display_flag | 1 bit | C55 | READ 1 > C55; | |
| S59 | slice_start_code and slice_vertical_position, | 32 bit | C0<br>C56 | SEEK 32 B;IF((IBS< HEX:101)<br>\|\|(IBS>HEX:1AF)){C0=0;}ELSE<br>{C0=1;FLUSH 32 B;C56=IBS&HEX:FF;} | |
| S60 | slice_vertical_ position_extension | 3 bit | C57 | IF (C2>2800) {READ 3 ><br>C57;}ELSE { C57=0;} | |
| S61 | quantiser_scale_code andquantiser_scale | 5 bit | C58<br>C59 | READ 5 > C58;IF (C49==1)<br>{C59 = C58 ;}ELSE {C59=C58<<1 ;} | |

FIG. 38

| | | | | | |
|---|---|---|---|---|---|
| S62 | slice_extension_flag | 1 bit | C60 | READ 1;IF (IBS==0) {C60=0;} | |
| S63 | macroblock_address_increment | 1-11 bits | C62 | V1=0;SEEK 11;IF(IBS >=1024)<br>{FLUSH 1; C62=V1+1;} | |
| S64 | | 23 bits | C0 | SEEK 23:IF (!IBS) {C0=0;}ELSE {C0=1;} | |
| S65 | macroblock_type | 1-2 bit | C64 | READ 1;IF (IBS==1) {C64=1:}ELSE {READ 1;<br>IF (IBS==1) { C64=17;}} | Only for I-picture (not P and B) |
| S66 | dct_type | 0-1 bit | C65 | IF ((C45==3)&&(!C47)&&(C64&3)<br>{READ 1 > C65;}ELSE {C65=0;} | |
| S67 | coded_block_pattern | | C66 | IF(C64 & 1) { C66=(1<<6)-1}ELSE {C66=0;} | |
| S68 | | | C0 | C0=0;IF(C66 & (1<<(5-C67)))<br>{IF (C64&1) { C0=1;}} | |
| S69 | DCT DC size luminance | 5-14 bit | C68 | SEEK 5;IF (IBS<31)<br>{VLD2 [0] IBS> V1, V2, V3;<br>C68 = V1;FLUSH V2;}ELSE {SEEK 9;<br>(IBS=(IBS-HEX:1f0));VLD2<br>[1] IBS> V1, V2, V3;C68 = V1:FLUSH V2;} | |
| S70 | DCT DC size chrominance | 5-15 bit | C68 | SEEK 5;IF (IBS<31)<br>{VLD2 [2] IBS> V1, V2, V3;C68 = V1;<br>FLUSH V2;}ELSE {SEEK 10;<br>IBS=IBS-HEX:3e0;VLD2 [3] IBS><br>V1, V2, V3;C68 = V1;FLUSH V2;} | |
| S71 | DCT DC differential | 3~9bit | C69<br>C70[C67] | IF (C68==0) {C69 = 0:}<br>ELSE {READ C68 > C69;<br>IF ((C69 & (1<<(C68-1)))==0)<br>{C69 -= (1<<C68) - 1:}}<br>C70[C67][0]=C69; | |

FIG. 39

| | | | | | |
|---|---|---|---|---|---|
| S72 | DCT Coefficients | 1~9 bit | C70<br>C0 | C0=1; V7=1; V8=1;<br>WHILE (V8<64) {C70[C67][V8] = 0;V8++;}<br>WHILE (1) {SEEK 16;<br>IF (IBS>=16384 && !(C50)) {V9=4;V10=(IBS>>12)-4;}<br>ELSE IF (IBS>=1024) {IF (C50) {V9=5;<br>V10=(IBS>>8)-4;}<br>ELSE {V9=6;V10=(IBS>>8)-4;}}<br>ELSE IF (IBS>=512) {IF (C50) {V9=7;<br>V10=(IBS>>6)-8;}<br>ELSE {V9=8;V10=(IBS>>6)-8;}}<br>ELSE IF (IBS>=256) {V9=9;V10=(IBS>>4)-16;}<br>ELSE IF (IBS>=128) {V9=10;V10=(IBS>>3)-16;}<br>ELSE IF (IBS>=64) {V9=11;V10=(IBS>>2)-16;}<br>ELSE IF (IBS>=32) {V9=12;V10=(IBS>>1)-16;}<br>ELSE IF (IBS>=16) {V9=13;V10=(IBS-16);}<br>ELSE {C0=0;STOP;}<br>VLD2 [V9] V10 >V1, V2, V3;<br>FLUSH V3,;<br>IF (V1==64) {STOP;}<br>IF (V1==65) {READ 6 > V4;<br>V7 += V4;<br>READ 12> V5;<br>IF ((V5&2047)==0) {C0=0;STOP;}<br>IF((V6 = (V5>=2048))) { V5 = 4096 -V5;}}<br>ELSE {V4=V1; V7 += V4;V5=V2; READ 1 > V5;}<br>IF (V7>=64) {C0=0;STOP;}<br>IF (V6) {V5= -V5;}C70[C67][V7] = V5;} | |

FIG. 40

| Index | Syntax | Input | No. of Branches | Branch information | Note |
|---|---|---|---|---|---|
| ERR | - | - | - | None. | |
| R0 | S0 | C72 | 4 | 1: (C72==1) GO R1;<br>2: (C72==2) GO R39;<br>3: (C72==3) GO R47;<br>4: (C72==4) GO RT; | sequence_header_code<br>group_start_code<br>picture_start_code<br>sequence_end_code |
| R1 | S1 | - | 1 | 1: GO R2; | horizontal_size_value |
| R2 | S2 | - | 1 | 1: GO R3; | horizontal_size_value |
| R3 | S3 | - | 1 | 1: GO R4; | aspect_ratio_information |
| R4 | S4 | - | 1 | 1: GO R5; | frame_rate_code |
| R5 | S5 | - | 1 | 1: GO R6; | Bit_rate_value |
| R6 | M | - | 1 | 1: GO R7; | |
| R7 | S6 | - | 1 | 1: GO R8; | vbv_buffer_size_value |
| R8 | S7 | - | 1 | 1: GO R9; | constrained_parameters_flag |
| R9 | S8 | [C8] | 2 | 1: ([C8]==1) GO R10;<br>2: GO R11; | load_intra_quantiser_matrix |
| R10 | S9 | - | 1 | 1: GO R12; | Intra quantiser matrix |
| R11 | S10 | - | 1 | 1: GO R12; | Default intra quantiser matrix |
| R12 | S11 | [C9] | 2 | 1: ([C9]==1) GO R13;<br>2: GO R14; | load_non_intra_quantiser_matrix |
| R13 | S12 | - | 1 | 1: GO R15; | non_Intra quantiser matrix |

FIG. 41

| | | | | | |
|---|---|---|---|---|---|
| R14 | S13 | - | 1 | 1: GO R15; | Default non_intra quantiser matrix |
| R15 | S14 | - | 1 | 1: GO R16; | chroma_intra_quantizer_matrix |
| R16 | S15 | - | 1 | 1: GO RT: | chroma_non_intra_quantizer_matrix |
| R17 | S16 | C0 | 2 | 1: (C0==1) GO R18;<br>2: GO ERR; | extension_start_code |
| R18 | S17 | C12 | 4 | 1: (C12==1) GO R19;<br>2: (C12==2) GO R31;<br>3: (C12==8) GO R50;<br>4: GO ERR; | extension_start_code_identifier |
| R19 | S18 | - | 1 | 1: GO R20; | profile_and_level_indication |
| R20 | S19 | - | 1 | 1: GO R21; | progressive_sequence |
| R21 | S20 | - | 1 | 1: GO R22; | progressive_sequence |
| R22 | S21 | - | 1 | 1: GO R23; | chroma_format |
| R23 | S22 | - | 1 | 1: GO R24; | horizontal_size_extension |
| R24 | S23 | - | 1 | 1: GO R25; | vertical_size_extension |
| R25 | M | - | 1 | 1: GO R26; | bit_rate_extension |
| R26 | S24 | - | 1 | 1: GO R27; | vbv_buffer_size_extension |
| R27 | S25 | - | 1 | 1: GO R28; | low_delay |
| R28 | S26 | - | 1 | 1: GO R29; | frame_rate_extension_n |
| R29 | S27 | - | 1 | 1: GO R30; | frame_rate_extension_d |
| R30 | S28 | - | 1 | 1: GO RT; | |

FIG. 42

| | | | | | |
|---|---|---|---|---|---|
| R31 | S29 | - | 1 | 1: GO R32; | video_format |
| R32 | S30 | [C28] | 2 | 1: ([C28]==1) GO R33;<br>2: GO R36; | color_description |
| R33 | S31 | - | 1 | 1: GO R34; | color_primaries |
| R34 | S32 | - | 1 | 1: GO R35; | transfer_characteristics |
| R35 | S33 | - | 1 | 1: GO R36; | matrix_coefficients |
| R36 | S34 | - | 1 | 1: GO R37; | display_horizontal_size |
| R37 | M | - | 1 | 1: GO R38; | |
| R38 | S35 | - | 1 | 1: GO RT; | display_vertical_size |
| R39 | S36 | - | 1 | 1: GO R40; | drop_flag |
| R40 | S37 | - | 1 | 1: GO R41; | hour |
| R41 | S38 | - | 1 | 1: GO R42; | minute |
| R42 | M | - | 1 | 1: GO R43; | |
| R43 | S39 | - | 1 | 1: GO R44; | sec |
| R44 | S40 | - | 1 | 1: GO R45; | frame |
| R45 | S41 | - | 1 | 1: GO R46; | closed_gop |
| R46 | S42 | - | 1 | 1: GO RT; | broken_link |
| R47 | S43 | - | 1 | 1: GO R48; | temporal_reference |
| R48 | S44 | - | 1 | 1: GO R49; | picture_coding_type |
| R49 | S45 | - | 1 | 1: GO RT; | vbv_delay |

FIG. 43

| | | | | | |
|---|---|---|---|---|---|
| R50 | S46 | - | 1 | 1: GO R51; | f_code |
| R51 | S47 | - | 1 | 1: GO R52; | intra_dc_precision |
| R52 | S48 | - | 1 | 1: GO R53; | picture_structure |
| R53 | S49 | - | 1 | 1: GO R54; | top_field_first |
| R54 | S50 | - | 1 | 1: GO R55; | frame_pred_frame_dct |
| R55 | S51 | - | 1 | 1: GO R56; | concealment_motion_vectors |
| R56 | S52 | - | 1 | 1: GO R57; | q_scale_type |
| R57 | S53 | - | 1 | 1: GO R58; | intra_vlc_format |
| R58 | S54 | - | 1 | 1: GO R59; | alternate_scan |
| R59 | S55 | - | 1 | 1: GO R60; | repeat_fist_field |
| R60 | S56 | - | 1 | 1: GO R61; | chroma_420_type |
| R61 | S57 | - | 1 | 1: GO R62; | progressive_frame |
| R62 | S58 | - | 1 | 1: GO RT; | composite_display_flag |
| R63 | S59 | C0 | 2 | 1: (C0==1) C61=0; C62=0; GO R64;<br>2: GO ERR; | slice_start_code |
| R64 | S60 | - | 1 | 1: GO R65; | slice_vertical_position_extension |
| R65 | S61 | - | 1 | 1: GO R66; | quantiser_scale_code |
| R66 | S62 | - | 1 | 1: GO R67; | slice_extension_flag/intra_slice |
| R67 | S63 | - | 1 | 1: C61=((C57<<7)+C56-1)*16 + C62-1;<br>C62=1; C73=0; C74=0; C75=0; GO RT; | macroblock_address_increment |

FIG. 44

| | | | | | |
|---|---|---|---|---|---|
| R68 | - | C62 | 2 | 1: (C62==0) GO R69;<br>2: GO R71; | MB loop |
| R69 | S64 | C0 | 2 | 1: (C0==1) GO R70;<br>2: (C0==0) C71=1; GO RT; | |
| R70 | S63 | | 1 | 1: GO R71; | macroblock_address_increment |
| R71 | - | C62 | 2 | 1: (C62==1) GO R72;<br>2: C61++; C62--; C71=2; GO RT; | |
| R72 | S65 | - | 1 | 1: GO R73; | macroblock_type |
| R73 | S66 | C64 | 2 | 1: (C64&16) GO R74;<br>2: GO R75; | dct_type |
| R74 | S61 | - | 1 | 1: GO R75; | quantiser_scale_code |
| R75 | S67 | - | 1 | 1: C67=0; C61++;<br>C62--; C71=3; GO RT; | coded_block_pattern |
| R76 | S68 | C0 | 2 | 1: (C0==1) GO R77;<br>2: C67++; GO RT; | Block loop |
| R77 | | C67 | 2 | 1: (C67<4) GO R78;<br>2: GO R79; | |
| R78 | S69 | - | 1 | 1: GO R80; | DC_size for luma |
| R79 | S70 | - | 1 | 1: GO R80; | DC_size for chroma |
| R80 | S71 | - | 1 | 1: GO R81; | DC_diff |
| R81 | S72 | C0 | 2 | 1: (C0==1) C67++; GO RT;<br>2: GO ERR; | DCT coefficients |

FIG. 45

| Index | Flag | Element Name | Length/Type | Note |
|---|---|---|---|---|
| C0 | 1bit | Decoding OK | | |
| C1 | 1bit | horizontal_size | | |
| C2 | 1bit | vertical_size | | |
| C3 | 1bit | aspect_ratio_information | | |
| C4 | 1bit | frame_rate_code | | |
| C5 | 1bit | bit_rate_value | | |
| C6 | 1bit | vbv_buffer_size | | |
| C7 | 1bit | constrained_parameters_flag | | |
| C8 | 1bit | Intra quantiser matrix | 8 bitarray(64) | |
| C9 | 1bit | non_Intra quantiser matrix | 8 bitarray(64) | |
| C10 | 1bit | chroma_intra_quantizer_matrix | 8 bitarray(64) | |
| C11 | 1bit | chroma_non_intra_quantizer_matrix | 8 bitarray(64) | |
| C12 | 1bit | extension_start_code_ID | | |
| C13 | 1bit | profile_and_level_indication | | |
| C14 | 1bit | progressive_sequence | | |
| C15 | 1bit | chroma_format | | |
| C16 | 1bit | horizontal_size_extension | | |
| C17 | 1bit | vertical_size_extension | | |

FIG. 46

| | | | | |
|---|---|---|---|---|
| C18 | 1bit | bit_rate_extension | | |
| C19 | 1bit | vbv_buffer_size_extension | | |
| C20 | 1bit | low_delay | | |
| C21 | 1bit | frame_rate_extension_n | | |
| C22 | 1bit | frame_rate_extension_d | | |
| C23 | 1bit | frame_rate | | |
| C24 | 1bit | profile | | |
| C25 | 1bit | level | | |
| C26 | 1bit | bit_rate | | |
| C27 | 1bit | video_format | | |
| C28 | 1bit | color_primaries | | |
| C29 | 1bit | transfer_characteristics | | |
| C30 | 1bit | matrix_coefficients | | |
| C31 | 1bit | display_horizontal_size | | |
| C32 | 1bit | display_vertical_size | | |
| C33 | 1bit | drop_flag | | |
| C34 | 1bit | hour | | |
| C35 | 1bit | minute | | |
| C36 | 1bit | sec | | |

FIG. 47

| | | | | |
|---|---|---|---|---|
| C37 | 1bit | frame | | |
| C38 | 1bit | closed_gop | | |
| C39 | 1bit | broken_link | | |
| C40 | 1bit | temporal_reference | | |
| C41 | 1bit | picture_coding_type | | |
| C42 | 1bit | vbv_delay | | |
| C43 | 1bit | f_code | 4 bitArray (4) | |
| C44 | 1bit | intra_dc_precision | | |
| C45 | 1bit | picture_structure | | |
| C46 | 1bit | top_field_first | | |
| C47 | 1bit | frame_pred_frame_dct | | |
| C48 | 1bit | concealment_motion_vectors | | |
| C49 | 1bit | q_scale_type | | |
| C50 | 1bit | intra_vlc_format | | |
| C51 | 1bit | alternate_scan | | |
| C52 | 1bit | repeat_fist_field | | |
| C53 | 1bit | chroma_420_type | | |
| C54 | 1bit | progressive_frame | | |
| C55 | 1bit | composite_display_flag | | |

FIG. 48

| | | | | |
|---|---|---|---|---|
| C56 | 1bit | slice_vertical_position | | |
| C57 | 1bit | slice_vertical_position_extension | | |
| C58 | 1bit | quantizer_scale_code | | |
| C59 | 1bit | quantizer_scale | | |
| C60 | 1bit | Intra_slice | | |
| C61 | 1bit | #MBA | | |
| C62 | 1bit | #MBAinc | | |
| C63 | 1bit | #MBAmax | | |
| C64 | 1bit | macroblock_type | | |
| C65 | 1bit | dct_type | | |
| C66 | 1bit | coded_block_pattern | | |
| C67 | 1bit | #B | | |
| C68 | 1bit | DCT DC size | | |
| C69 | 1bit | DCT DC differential | | |
| C70 | 1bit | DCT Coefficients | | |
| C71 | 1bit | Loop type | | |
| C72 | 1bit | Start_code_type | | |
| C73 | 1bit | dc_dct_pred[0] | | |
| C74 | 1bit | dc_dct_pred[1] | | |
| C75 | 1bit | dc_dct_pred[2] | | |

FIG. 49

| Index | FU name | input CSCI | output CSCI | Input data | Output data |
|---|---|---|---|---|---|
| F0 | SynP | 0 | 75 | | |
| F1 | DCR | 4 | 0 | QFS | QFSP |
| F2 | IS | 1 | 0 | QFSP | QF |
| F3 | IQ | 3 | 0 | QF | F |
| F4 | IT | 0 | 0 | F | f |
| F5 | VR | 3 | 0 | f | D |

FIG. 50

| Index | FU | Input CS/CI | No. of Branches | Branch information |
|---|---|---|---|---|
| R0 | F0(R0) | C72 | 2 | 1: (C72==4) GO END;<br>2: GO R1; |
| R1 | F0(R17) | - | 1 | 1: GO R2; |
| R2 | F0(R17) | - | 1 | 1: GO R3; |
| R3 | F0(R0) | C72 | 2 | 1: (C72==4) GO END;<br>2: GO R4; |
| R4 | F0(R0) | C72 | 2 | 1: (C72==4) GO END;<br>2: GO R5; |
| R5 | F0(R17) | - | 1 | 1: GO R6; |
| R6 | F0(R63) | - | 1 | 1: GO R7; |
| R7 | F0(R68) | C71 | 3 | 1: (C71==1) GO R6;<br>2: (C71==2) GO R7;<br>3: (C71==3) GO R8; |
| R8 | F0(R76) | C67 | | 1: (C67<6) GO R8;<br>2: GO R9; |
| R9 | F1 | - | 1 | 1: GO R10; |
| R10 | F2 | - | 1 | 1: GO R11; |
| R11 | F3 | - | 1 | 1: GO R12; |
| R12 | F4 | - | 1 | 1: GO R13; |
| R13 | F5 | C61<br>C62 | 2 | 1: (C61>=C62) GO R3;<br>2: GO R7; |

FIG. 51

| Index No. | CSCI information | CSCI table element |
|---|---|---|
| F1-C1 | dc_dct_pred[0] | C73 |
| F1-C2 | dc_dct_pred[1] | C74 |
| F1-C3 | dc_dct_pred[2] | C75 |
| F1-C4 | intra_dc_precision | C44 |
| F2-C1 | alternate_scan | C51 |
| F3-C1 | intra_quantizer_matrix | C8 |
| F3-C2 | chroma_intra_quantizer_matrix | C10 |
| F3-C3 | quantizer_scale | C59 |
| F5-C1 | MBA | C61 |

DC Luma Table 0

| | |
|---|---|
| 1 | 2 |
| 1 | 2 |
| 1 | 2 |
| 1 | 2 |
| 1 | 2 |
| 1 | 2 |
| 1 | 2 |
| 1 | 2 |
| 2 | 2 |
| 2 | 2 |
| 2 | 2 |
| 2 | 2 |
| 2 | 2 |
| 2 | 2 |
| 2 | 2 |
| 2 | 2 |
| 0 | 3 |
| 0 | 3 |
| 0 | 3 |
| 0 | 3 |
| 3 | 3 |
| 3 | 3 |
| 3 | 3 |
| 3 | 3 |
| 4 | 3 |
| 4 | 3 |
| 4 | 3 |
| 4 | 3 |
| 5 | 3 |
| 5 | 3 |
| 6 | 3 |
| -1 | 0 |

[B]

DC Luma Table 1

| | |
|---|---|
| 7 | 6 |
| 7 | 6 |
| 7 | 6 |
| 7 | 6 |
| 7 | 6 |
| 7 | 6 |
| 7 | 6 |
| 7 | 6 |
| 8 | 7 |
| 8 | 7 |
| 8 | 7 |
| 8 | 7 |
| 9 | 8 |
| 9 | 8 |
| 10 | 9 |
| 11 | 9 |

DC Chroma Table 0

| | |
|---|---|
| 0 | 2 |
| 0 | 2 |
| 0 | 2 |
| 0 | 2 |
| 0 | 2 |
| 0 | 2 |
| 0 | 2 |
| 0 | 2 |
| 1 | 2 |
| 1 | 2 |
| 1 | 2 |
| 1 | 2 |
| 1 | 2 |
| 1 | 2 |
| 1 | 2 |
| 1 | 2 |
| 2 | 2 |
| 2 | 2 |
| 2 | 2 |
| 2 | 2 |
| 2 | 2 |
| 2 | 2 |
| 2 | 2 |
| 2 | 2 |
| 3 | 3 |
| 3 | 3 |
| 3 | 3 |
| 3 | 3 |
| 4 | 4 |
| 4 | 4 |
| 5 | 5 |
| -1 | 0 |

[D]

DC Chroma Table 1

| | |
|---|---|
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 7 | 7 |
| 7 | 7 |
| 7 | 7 |
| 7 | 7 |
| 7 | 7 |
| 7 | 7 |
| 7 | 7 |
| 7 | 7 |
| 8 | 8 |
| 8 | 8 |
| 8 | 8 |
| 8 | 8 |
| 9 | 9 |
| 9 | 9 |
| 10 | 10 |
| 11 | 10 |

DCT Table next

| | | |
|---|---|---|
| 0 | 2 | 4 |
| 2 | 1 | 4 |
| 1 | 1 | 3 |
| 1 | 1 | 3 |
| 64 | 0 | 2 |
| 64 | 0 | 2 |
| 64 | 0 | 2 |
| 64 | 0 | 2 |
| 0 | 1 | 2 |
| 0 | 1 | 2 |
| 0 | 1 | 2 |
| 0 | 1 | 2 |

[F]

| DCT Table 0a 1/2 | | | DCT Table 0a 2/2 | | |
|---|---|---|---|---|---|
| 65 | 0 | 6 | 0 | 6 | 8 |
| 65 | 0 | 6 | 12 | 1 | 8 |
| 65 | 0 | 6 | 11 | 1 | 8 |
| 65 | 0 | 6 | 3 | 2 | 8 |
| 2 | 2 | 7 | 1 | 3 | 8 |
| 2 | 2 | 7 | 0 | 5 | 8 |
| 9 | 1 | 7 | 10 | 1 | 8 |
| 9 | 1 | 7 | 0 | 3 | 5 |
| 0 | 4 | 7 | 0 | 3 | 5 |
| 0 | 4 | 7 | 0 | 3 | 5 |
| 8 | 1 | 7 | 0 | 3 | 5 |
| 8 | 1 | 7 | 0 | 3 | 5 |
| 7 | 1 | 6 | 0 | 3 | 5 |
| 7 | 1 | 6 | 0 | 3 | 5 |
| 7 | 1 | 6 | 0 | 3 | 5 |
| 7 | 1 | 6 | 4 | 1 | 5 |
| 6 | 1 | 6 | 4 | 1 | 5 |
| 6 | 1 | 6 | 4 | 1 | 5 |
| 6 | 1 | 6 | 4 | 1 | 5 |
| 6 | 1 | 6 | 4 | 1 | 5 |
| 1 | 2 | 6 | 4 | 1 | 5 |
| 1 | 2 | 6 | 4 | 1 | 5 |
| 1 | 2 | 6 | 4 | 1 | 5 |
| 1 | 2 | 6 | 3 | 1 | 5 |
| 5 | 1 | 6 | 3 | 1 | 5 |
| 5 | 1 | 6 | 3 | 1 | 5 |
| 5 | 1 | 6 | 3 | 1 | 5 |
| 5 | 1 | 6 | 3 | 1 | 5 |
| 13 | 1 | 8 | 3 | 1 | 5 |

FIG. 55
[G]

| DCT Table 0 1/5 | | | DCT Table 0 2/5 | | | DCT Table 0 3/5 | | | DCT Table 0 4/5 | | | DCT Table 0 5/5 | | |
|---|---|---|---|---|---|---|---|---|---|---|---|---|---|---|
| 65 | 0 | 6 | 1 | 2 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 7 | 1 | 7 | 3 | 1 | 5 | 64 | 0 | 4 | 0 | 1 | 2 | 0 | 2 | 3 |
| 7 | 1 | 7 | 3 | 1 | 5 | 64 | 0 | 4 | 0 | 1 | 2 | 0 | 2 | 3 |
| 8 | 1 | 7 | 3 | 1 | 5 | 0 | 3 | 4 | 0 | 1 | 2 | 0 | 2 | 3 |
| 8 | 1 | 7 | 3 | 1 | 5 | 0 | 3 | 4 | 0 | 1 | 2 | 0 | 2 | 3 |
| 6 | 1 | 7 | 3 | 1 | 5 | 0 | 3 | 4 | 0 | 1 | 2 | 0 | 2 | 3 |
| 6 | 1 | 7 | 1 | 1 | 3 | 0 | 3 | 4 | 0 | 1 | 2 | 0 | 2 | 3 |
| 2 | 2 | 7 | 1 | 1 | 3 | 0 | 3 | 4 | 0 | 1 | 2 | 0 | 2 | 3 |
| 2 | 2 | 7 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 4 | 1 | 6 | 1 | 1 | 3 | 0 | 3 | 4 | 0 | 1 | 2 | 0 | 4 | 5 |
| 4 | 1 | 6 | 1 | 1 | 3 | 0 | 3 | 4 | 0 | 1 | 2 | 0 | 4 | 5 |
| 4 | 1 | 6 | 1 | 1 | 3 | 0 | 1 | 2 | 0 | 1 | 2 | 0 | 4 | 5 |
| 4 | 1 | 6 | 1 | 1 | 3 | 0 | 1 | 2 | 0 | 1 | 2 | 0 | 4 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 1 | 5 | 8 | 1 | 1 | 3 | 0 | 1 | 2 | 0 | 1 | 2 | 0 | 5 | 5 |
| 11 | 1 | 8 | 1 | 1 | 3 | 0 | 1 | 2 | 0 | 1 | 2 | 0 | 5 | 5 |
| 0 | 11 | 8 | 1 | 1 | 3 | 0 | 1 | 2 | 0 | 1 | 2 | 0 | 5 | 5 |
| 0 | 10 | 8 | 1 | 1 | 3 | 0 | 1 | 2 | 0 | 1 | 2 | 0 | 5 | 5 |
| 13 | 1 | 8 | 1 | 1 | 3 | 0 | 1 | 2 | 0 | 1 | 2 | 9 | 1 | 7 |
| 12 | 1 | 8 | 1 | 1 | 3 | 0 | 1 | 2 | 0 | 1 | 2 | 9 | 1 | 7 |
| 3 | 2 | 8 | 1 | 1 | 3 | 0 | 1 | 2 | 0 | 1 | 2 | 1 | 3 | 7 |
| 1 | 4 | 8 | 1 | 1 | 3 | 0 | 1 | 2 | 0 | 2 | 3 | 1 | 3 | 7 |
| 2 | 1 | 5 | 1 | 1 | 3 | 0 | 1 | 2 | 0 | 2 | 3 | 10 | 1 | 7 |
| 2 | 1 | 5 | 1 | 1 | 3 | 0 | 1 | 2 | 0 | 2 | 3 | 10 | 1 | 7 |
| 2 | 1 | 5 | 1 | 1 | 3 | 0 | 1 | 2 | 0 | 2 | 3 | 0 | 8 | 7 |
| 2 | 1 | 5 | 1 | 1 | 3 | 0 | 1 | 2 | 0 | 2 | 3 | 0 | 8 | 7 |
| 2 | 1 | 5 | 1 | 1 | 3 | 0 | 1 | 2 | 0 | 2 | 3 | 0 | 9 | 7 |
| 2 | 1 | 5 | 64 | 0 | 4 | 0 | 1 | 2 | 0 | 2 | 3 | 0 | 9 | 7 |
| 2 | 1 | 5 | 64 | 0 | 4 | 0 | 1 | 2 | 0 | 2 | 3 | 0 | 12 | 8 |
| 2 | 1 | 5 | 64 | 0 | 4 | 0 | 1 | 2 | 0 | 2 | 3 | 0 | 13 | 8 |
| 1 | 2 | 5 | 64 | 0 | 4 | 0 | 1 | 2 | 0 | 2 | 3 | 2 | 3 | 8 |
| 1 | 2 | 5 | 64 | 0 | 4 | 0 | 1 | 2 | 0 | 2 | 3 | 4 | 2 | 8 |
| 1 | 2 | 5 | 64 | 0 | 4 | 0 | 1 | 2 | 0 | 2 | 3 | 0 | 14 | 8 |
| 1 | 2 | 5 | 64 | 0 | 4 | 0 | 1 | 2 | 0 | 2 | 3 | 0 | 15 | 8 |
| 1 | 2 | 5 | 64 | 0 | 4 | 0 | 1 | 2 | 0 | 2 | 3 | | | |
| 1 | 2 | 5 | 64 | 0 | 4 | 0 | 1 | 2 | 0 | 2 | 3 | | | |
| 1 | 2 | 5 | 64 | 0 | 4 | 0 | 1 | 2 | 0 | 2 | 3 | | | |

DCT Table 1a

| | | |
|---|---|---|
| 16 | 1 | 10 |
| 5 | 2 | 10 |
| 0 | 7 | 10 |
| 2 | 3 | 10 |
| 1 | 4 | 10 |
| 15 | 1 | 10 |
| 14 | 1 | 10 |
| 4 | 2 | 10 |

[I]

DCT Table 1

| | | |
|---|---|---|
| 5 | 2 | 9 |
| 5 | 2 | 9 |
| 14 | 1 | 9 |
| 14 | 1 | 9 |
| 2 | 4 | 10 |
| 16 | 1 | 10 |
| 15 | 1 | 9 |
| 15 | 1 | 9 |

[J]

DCT Table 2

| | | |
|---|---|---|
| 0 | 11 | 12 |
| 8 | 2 | 12 |
| 4 | 3 | 12 |
| 0 | 10 | 12 |
| 2 | 4 | 12 |
| 7 | 2 | 12 |
| 21 | 1 | 12 |
| 20 | 1 | 12 |
| 0 | 9 | 12 |
| 19 | 1 | 12 |
| 18 | 1 | 12 |
| 1 | 5 | 12 |
| 3 | 3 | 12 |
| 0 | 8 | 12 |
| 6 | 2 | 12 |
| 17 | 1 | 12 |

[K]

DCT Table 3

| | | |
|---|---|---|
| 10 | 2 | 13 |
| 9 | 2 | 13 |
| 5 | 3 | 13 |
| 3 | 4 | 13 |
| 2 | 5 | 13 |
| 1 | 7 | 13 |
| 1 | 6 | 13 |
| 0 | 15 | 13 |
| 0 | 14 | 13 |
| 0 | 13 | 13 |
| 0 | 12 | 13 |
| 26 | 1 | 13 |
| 25 | 1 | 13 |
| 24 | 1 | 13 |
| 23 | 1 | 13 |
| 22 | 1 | 13 |

[L]

DCT Table 4

| | | |
|---|---|---|
| 0 | 31 | 14 |
| 0 | 30 | 14 |
| 0 | 29 | 14 |
| 0 | 28 | 14 |
| 0 | 27 | 14 |
| 0 | 26 | 14 |
| 0 | 25 | 14 |
| 0 | 24 | 14 |
| 0 | 23 | 14 |
| 0 | 22 | 14 |
| 0 | 21 | 14 |
| 0 | 20 | 14 |
| 0 | 19 | 14 |
| 0 | 18 | 14 |
| 0 | 17 | 14 |
| 0 | 16 | 14 |

DCT Table 5

| | | |
|---|---|---|
| 0 | 40 | 15 |
| 0 | 39 | 15 |
| 0 | 38 | 15 |
| 0 | 37 | 15 |
| 0 | 36 | 15 |
| 0 | 35 | 15 |
| 0 | 34 | 15 |
| 0 | 33 | 15 |
| 0 | 32 | 15 |
| 1 | 14 | 15 |
| 1 | 13 | 15 |
| 1 | 12 | 15 |
| 1 | 11 | 15 |
| 1 | 10 | 15 |
| 1 | 9 | 15 |
| 1 | 8 | 15 |

[N]

DCT Table 6

| | | |
|---|---|---|
| 1 | 18 | 16 |
| 1 | 17 | 16 |
| 1 | 16 | 16 |
| 1 | 15 | 16 |
| 6 | 3 | 16 |
| 16 | 2 | 16 |
| 15 | 2 | 16 |
| 14 | 2 | 16 |
| 13 | 2 | 16 |
| 12 | 2 | 16 |
| 11 | 2 | 16 |
| 31 | 1 | 16 |
| 30 | 1 | 16 |
| 29 | 1 | 16 |
| 28 | 1 | 16 |
| 27 | 1 | 16 |

BITSTREAM DECODING DEVICE AND METHOD

TECHNICAL FIELD

The present invention relates to a bitstream decoding device and a method thereof, more specifically to a bitstream decoding device and a method thereof that have a decoding solution.

BACKGROUND ART

Typically, a video is converted to a bitstream by an encoder. At this time, the bitstream is stored depending on the coding type that satisfies the constraint condition of the encoder.

MPEG requires syntax and semantics, which are the constraint condition of the encoder.

The syntax, which refers to the structure, format, or length of data, shows the sequence of expressing the data. In other words, the syntax is to conform with a rule for encoding/decoding and defines the sequence and length of each element of the bitstream and a corresponding data format.

The semantics refers to the meaning of each bit that constitutes data. In other words, the semantics shows the meaning of each element of the bitstream.

Accordingly, the bitstream can be generated in various types depending on the encoding condition or the applied standard (or codec) of the encoder. Typically, each standard (e.g. MPEG-1, MPEG-2, MPEG-4 and MPEG-4 AVC) has a different bitstream syntax.

Accordingly, it may be considered that the bitstream encoded according to each standard or encoding condition has different types (i.e. syntax and semantics). A decoder corresponding to a pertinent encoder must be used to perform the decoding of the bitstream.

As described above, the typical bitstream decoder has a restriction that must satisfy the constraint condition of the encoder. This restriction makes it difficult to realize an integrated decoder corresponding to a plurality of standards.

DISCLOSURE

Technical Problem

Accordingly, the present invention, which is contrived to solve the aforementioned problems, provides a bitstream decoding device and a method thereof having a decoding solution that can decode a bitstream encoded in various types (syntaxes and semantics) in accordance with each standard (e.g. MPEG-1, MPEG-2, MPEG-4 and MPEG-4 AVC) by using the same information recognizing method.

The present invention also provides a bitstream decoding device and a method thereof having a decoding solution that can parse a bitstream, compressed in various encoding methods, by using the same information analyzing method and organically control each functional unit for performing the decoding by using the parsed data.

The present invention provides a bitstream decoding device and a method thereof having a decoding solution that can commonly apply a syntax analyzing method for decoding various types of bit streams.

The present invention provides a bitstream decoding device and a method thereof having a decoding solution that can apply a set of new commands for parsing various types of bitstreams by using a common syntax analyzing method.

The present invention provides a bitstream decoding device and a method thereof having a decoding solution that can allow a decoder to easily decode a bitstream when a syntax element is changed, added or deleted.

The present invention provides a bitstream decoding device and a method thereof having a decoding solution that can allow some elements used to decode a bit stream to share the element information (i.e. a result from syntax parsing) of analyzed syntax.

The present invention provides a bitstream decoding device and a method thereof having a decoding solution that can allow the element information of an analyzed syntax to be used to analyze the syntax element of a following bit stream.

The present invention provides a bitstream decoding device and a method thereof having a decoding solution that can realize each function of various decoding methods suggested by a variety of standards (or codec) in units of functional unit to put the realized functions in a toolbox.

The present invention provides a bitstream decoding device and a method thereof having a decoding solution that can perform a predetermined process by selectively loading some functional units necessary for a toolbox in order to decode a bitstream encoded in various types.

The present invention provides a bitstream decoding device and a method thereof having a decoding solution that can easily change, add or delete the functional units installed in a toolbox.

In addition, the present invention is to internationally standardize the concept and structure of codec integration for decoding a bitstream. Other problems that the present invention solves will become more apparent through the following description.

Technical Solution

To solve the above problems, an aspect of the present invention features an encoder/decoder and/or an integrated codec apparatus that can be universally used for various standards.

In accordance with an embodiment of the present invention, a decoder can include a decoder forming unit, configured to generate and output CSCI control information and connection control information by using partial decoder descriptions stored in a description storing unit; and a decoding solution, configured to selectively load a plurality of functional units included in a toolbox by using the CSCI control information and the connection control information to decode a bitstream to video data.

The toolbox can include at least one parsing functional unit and a plurality of decoding functional units, the parsing functional unit configured to perform syntax parsing of the bitstream, the plurality of decoding functional units configured to decode the bitstream.

The partial decoder description can be described to be compatible with a network language.

The partial decoder description can be converted to a caltrop actor language (CAL) and stored in the description storing unit or converted to a caltrop actor language (CAL) and used by the decoder forming unit.

Advantageous Effects

As described above, an integrated codec apparatus and a method thereof in accordance with the present invention can decode a bitstream encoded in various types (syntaxes and semantics) in accordance with each standard (e.g. MPEG-1, MPEG-2, MPEG-4 and MPEG-4 AVC) by using the same information recognizing method.

The present invention can parse a bitstream, compressed in various methods, by using the same information analyzing method and organically control each functional unit for performing the decoding by using the parsed data.

The present invention can commonly apply a syntax analyzing method for decoding various types of bit streams.

The present invention can apply a set of new commands for parsing various types of bitstreams by using a common syntax analyzing method.

The present invention can easily decode a bitstream when a syntax element is changed, added or deleted.

The present invention can allow some elements used to decode a bit stream to share the element information of analyzed syntax (i.e. a result from syntax parsing).

The present invention can allow element information of analyzed syntax to be used to analyze the syntax element of a following bit stream.

The present invention can be used for the integration of a video or still image codec performing the processing in units of blocks besides MPEG-1, MPEG-2, MPEG-4 and MPEG-4 AVC codecs.

The present invention can realize each function of various decoding methods suggested by a variety of standards (or codec) in units of functional unit to put the realized functions in a toolbox.

The present invention can perform a predetermined process by selectively loading some functional units necessary for a toolbox in order to decode a bitstream encoded in various types.

In addition, the present invention can easily change, add or delete the functional units installed in a toolbox.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

DESCRIPTION OF DRAWINGS

FIG. 18 through FIG. 57 are examples showing the structure of each partial decoder description.

MODE FOR INVENTION

Figure 1:
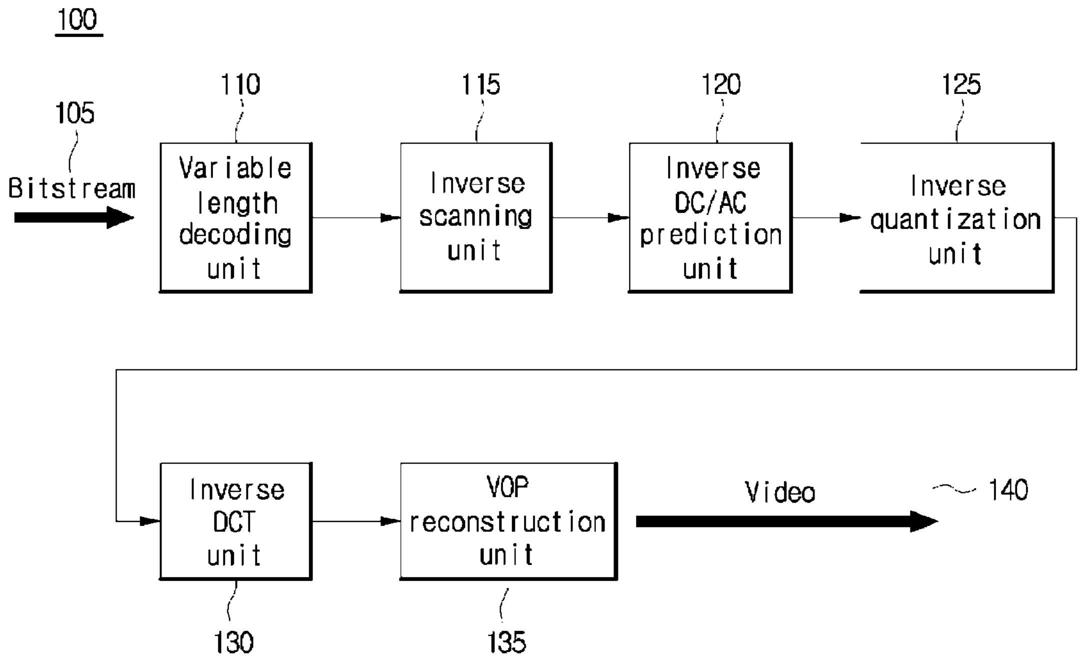
FIG. 1 shows a brief structure of a typical decoder.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term and/or shall include the combination of a plurality of listed items or any of the plurality of listed items.

When one element is described as being "connected" or "accessed" to another element, it shall be construed as being connected or accessed to another element directly but also as possibly having yet another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of an integrated codec apparatus and a method thereof in accordance with an embodiment of the present invention will be described in detail with reference to the accompanying drawings. Identical or corresponding elements will be given the same reference numerals, regardless of the figure number, and any redundant description of the identical or corresponding elements will not be repeated.

Figure 2:
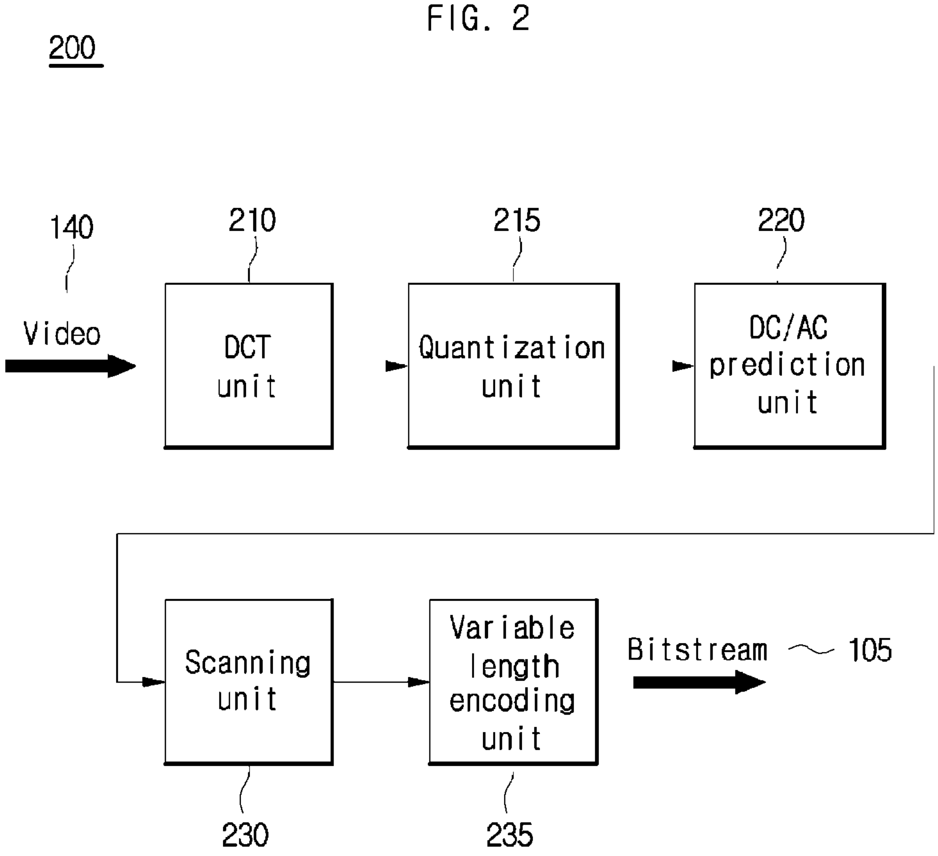
FIG. 2 shows a brief structure of a typical encoder.

FIG. 1 shows a brief structure of a typical decoder, and FIG. 2 shows a brief structure of a typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135. It shall be evident that the decoder 100 has a structure that can be changed depending on an applied standard and some elements can be replaced with other elements.

If a transferred bit stream 105 is syntax-parsed and corresponding header information and encoded image data are extracted, the variable length decoding unit 110 determines a quantized discrete cosine transform (DCT) coefficient by using a predetermined Huffman table and the inverse scanning unit 115 generates data having the same sequence as a corresponding video 140 by performing inverse scanning. In other words, the inverse scanning unit 115 outputs corresponding values in the inverse order of scanning in various ways. In the encoding, after the quantization is performed, a scanning direction can be determined depending on the distribution of a frequency band. Typically, the scanning method can be performed in a zigzag form. Alternatively, the scanning can be performed per codec in various ways.

Syntax parsing can be collectively performed by the variable length decoding unit 110 or by an element for processing a bitstream 105 prior to the variable length decoding unit 110. In this case, since the same standard is applied to the corresponding encoder and decoder, the syntax is parsed by a predetermined rule only, to correspond to the pertinent standard.

The inverse DC/AC prediction unit 120 determines the direction of a reference block for prediction by using the magnitude of the DCT coefficient at a frequency band.

The inverse quantization unit 125 performs the inverse quantization of inversely scanned data. In other words, the inverse quantization unit 125 returns DC and AC coefficients by using a quantization parameter (OP) designated in an encoding process.

The inverse discrete cosine transform unit 130 evaluates an actual video data pixel value to generate a video object plane (VOP) by performing an inverse discrete cosine transform.

The VOP reconstruction unit 135 reconstructs a video signal by using the VOP generated by the inverse discrete cosine transform unit 130 and outputs the reconstructed signal.

As illustrated in FIG. 2, an MPEG-4 encoder 200 typically includes a discrete cosine transform unit 210, a quantization unit 215, a DC/AC prediction unit 220, a scanning unit 230 and a variable length encoding unit 235.

Each element included in the encoder 200 performs the inverse functions of the corresponding elements of the decoder 100. This shall be evident to any person of ordinary skill in the art. Briefly, the encoder 200 converts a video signal (i.e. a digital video pixel value) to a frequency value through DCT and quantization in order to performs the encoding. Then, the encoder 200 performs variable length encoding that differentiates the length of a corresponding bit according to the frequency of information to output it in a compressed bitstream form.

Figure 3:
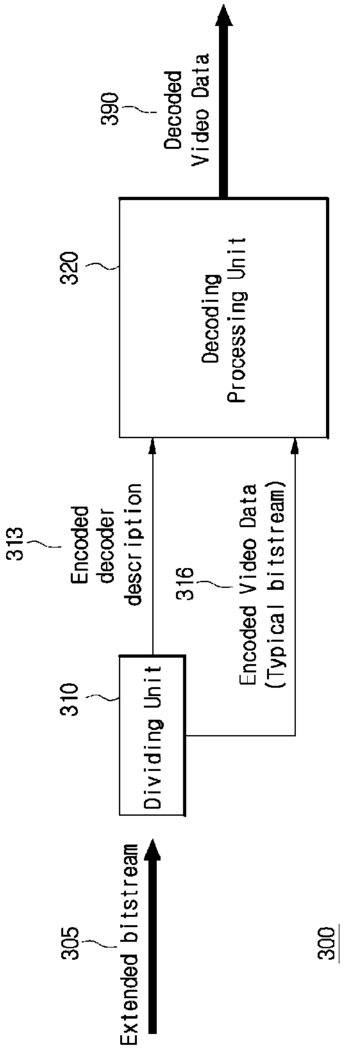
FIG. 3 shows a brief structure of a decoder in accordance with an embodiment of the present invention.
Figure 4:
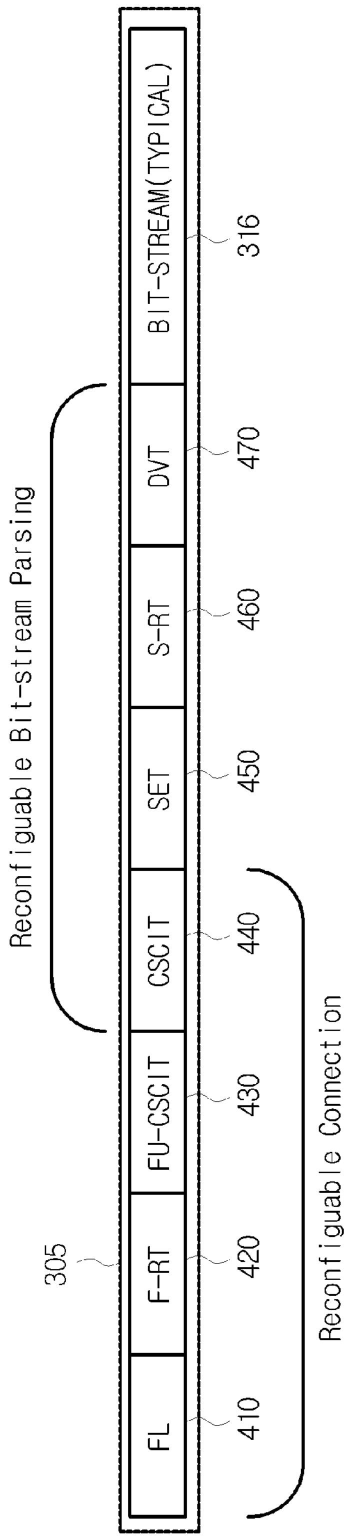
FIG. 4 shows a brief structure of an extended bitstream in accordance with an embodiment of the present invention.
Figure 5:
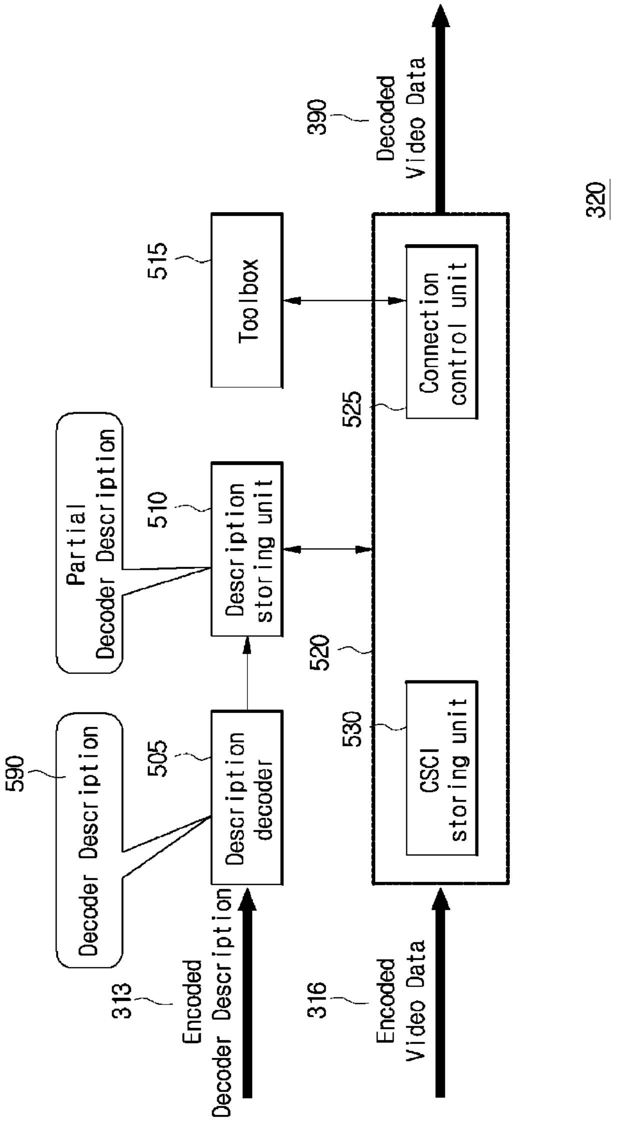
FIG. 5 shows a brief structure of a decoding processing unit in accordance with an embodiment of the present invention.
Figure 6:
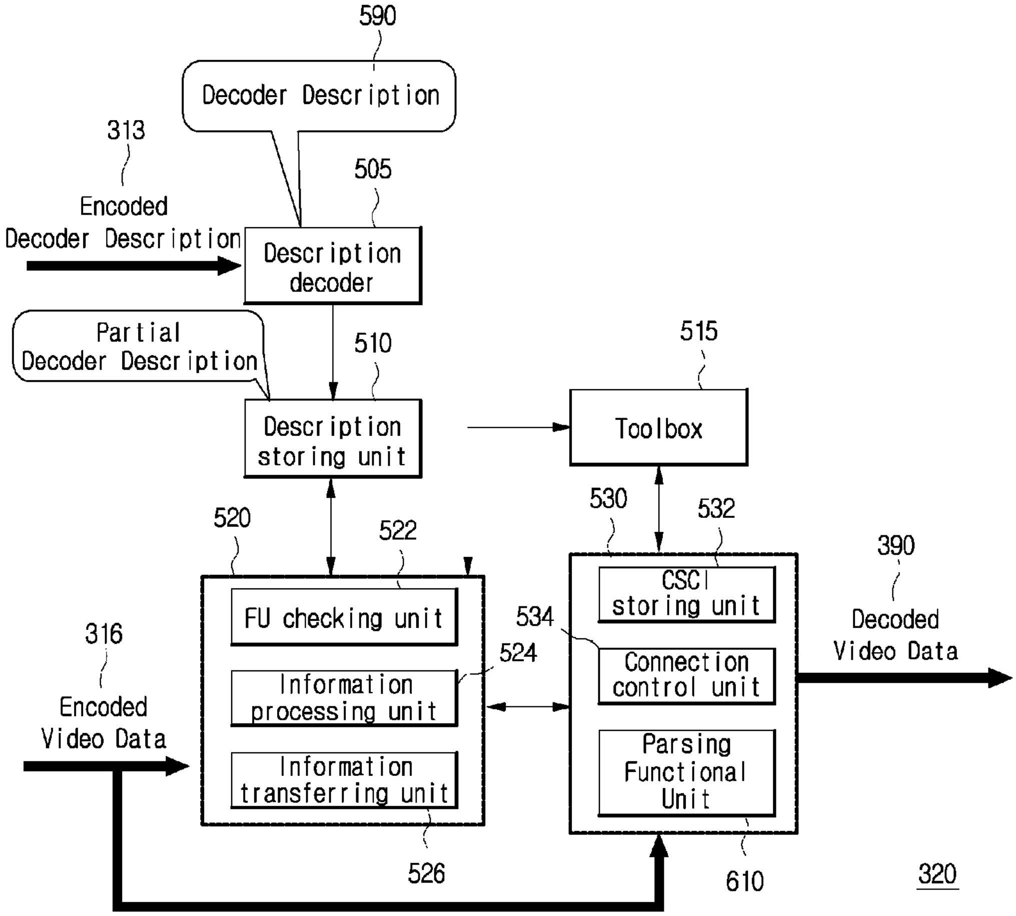
FIG. 6 shows a brief structure of a decoding processing unit in accordance with another embodiment of the present invention.
Figure 7:
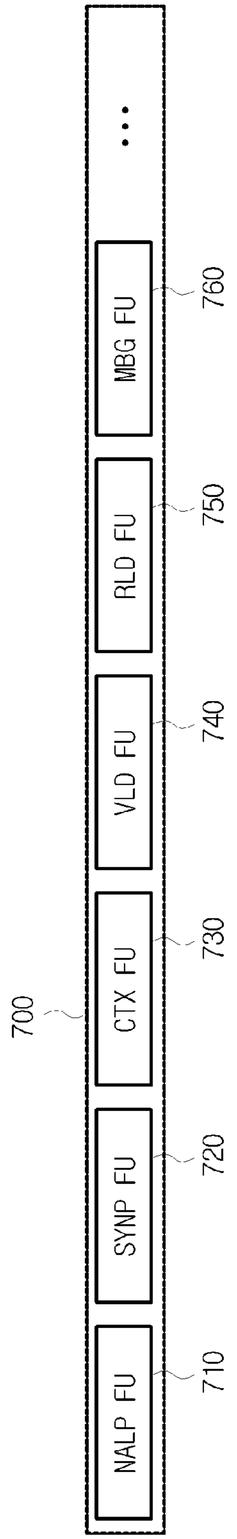
FIG. 7 shows an example of functional units for syntax parsing in accordance with an embodiment of the present invention.
Figure 8:
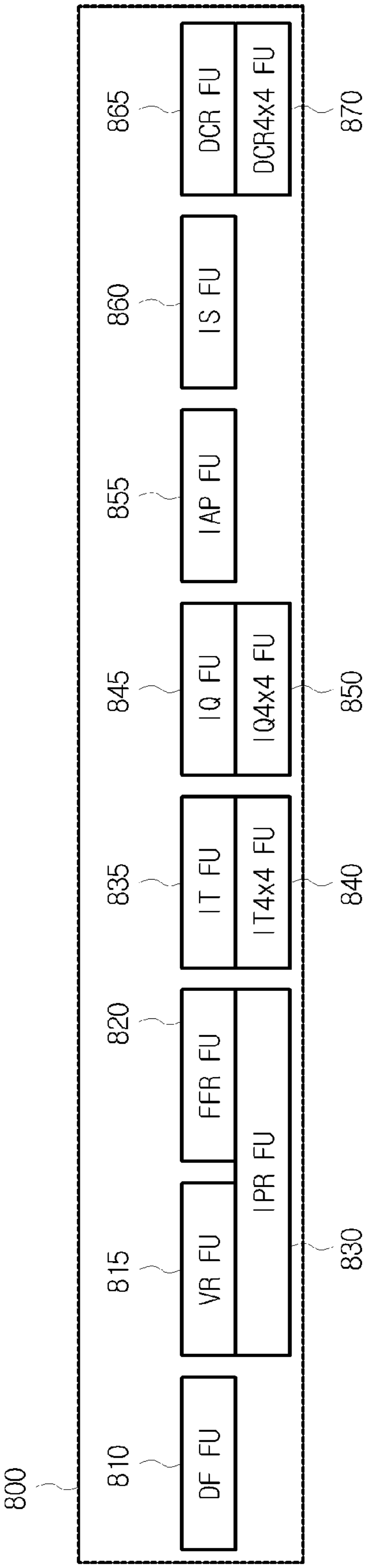
FIG. 8 shows an example of functional units for decoding processing in accordance with an embodiment of the present invention.

FIG. 3 shows a brief structure of a decoder in accordance with an embodiment of the present invention, and FIG. 4 shows a brief structure of an extended bitstream in accordance with an embodiment of the present invention. FIG. 5 shows a brief structure of a decoding processing unit in accordance with an embodiment of the present invention, and FIG. 6 shows a brief structure of a decoding processing unit in accordance with another embodiment of the present invention. FIG. 7 shows an example of functional units for syntax parsing in accordance with an embodiment of the present invention, and FIG. 8 shows an example of functional units for decoding processing in accordance with an embodiment of the present invention.

As shown in FIG. 3, a decoder 300 in accordance with the present invention has a structure that is different from that of the conventional decoder (refer to FIG. 1).

In particular, a decoder description and a bitstream are provided to the decoder 300 in order to perform an encoding/decoding method. The decoder description can be provided to the decoder 300 in the form of an extended bitstream 305, which is realized through integration with a bitstream, or in the form of independent data. Of course, in case that a particular storing unit of the decoder 300 pre-stores hierarchy information corresponding to a decoder description, providing the decoder description can be omitted. However, the case that the pertinent data is included in an extended bitstream before being provided to the decoder 300 will be described below.

In accordance with an embodiment of the present invention, the decoder 300 includes a dividing unit 310 and a decoding processing unit 320. It shall be obvious that at least one of the elements (e.g. the dividing unit 310, the decoding processing unit 320 or at least one element included in the decoding processing unit 320) can be realized as a software program (or a combination of program codes), which is designed to perform a function described below.

The dividing unit 310 divides an inputted extended bitstream 305 into an encoded decoder description 313 and a typical bitstream 316 (hereinafter, referred to as "typical bitstream") and inputs them into the decoding processing unit 320.

The dividing unit 310 can input the encoded decoder description 313 into a description decoder 505 and input the typical bitstream 316 into a decoder forming unit 520. As described above, if the encoded decoder description 313 and the typical bitstream 316 are respectively inputted as independent data, the dividing unit 310 can be omitted. Here, the typical bitstream 316 can have the identical format to the bitstream 105 of FIG. 1.

An example of the extended bitstream 305 is shown in FIG. 4. Referring to FIG. 4, the extended bitstream 305 can include the decoder description 313 and the typical bitstream 316. The extended bitstream 305 and the encoded decoder description 313, as shown in FIG. 4, are merely an example for the convenience of description and understanding. It shall be obvious that the extended bitstream 305 and/or the encoded decoder description 313 are not limited to the example of FIG. 4.

A decoder description 590, to which the encoded decoder description 131 is decoded by a description decoder 505, includes configuration information of a typical bitstream and information related to the type of encoding the typical bitstream 316 (or connection between functional units) and the determination of input or output data of a particular functional unit, in order to parse a bitstream encoded by various encoding methods and/or a bitstream encoded by using functions selected by a user among various functions. The decoder description 590 can be described by using a textual description or binary description method. Of course, if the encoded decoder description 316 is realized so as to be recognized by a decoder forming unit 520 without the processing of the description decoder 505, the description decoder 505 can be omitted.

The decoder description 590 can be divided into partial decoder descriptions, such as a functional unit list (FL) 410, a functional unit rule table (F-RT) 420, a functional unit CSCIT (FU-CSCIT) 430, a control signal and context information table (CSCIT) 440, a syntax element table (SET) 450, a syntax-rule table (S-RT) 460 and a default value table (DVT) 470, before being stored in a description storing unit 510. The order of each partial decoder description for forming the decoder description can be obviously changed in various ways.

Here, it is possible to use the FL 410, the F-RT 420, the FU-CSCIT 430 and the CSCIT 440 in order to determine the connection of the each functional unit. Hereinafter, the pertinent partial decoder descriptions can be referred to as "first decoder descriptions" as necessary.

The FU-CSCIT 440 may be a partial decoder description for the mapping between each functional unit (i.e. for performing the decoding) in a toolbox 515 and element information stored in a CSCI storing unit 532. In this case, the element information can function as a control variable for each functional unit (i.e. for performing the decoding and/or performing the syntax parsing) of the toolbox 515.

Moreover, it is possible to use the CSCIT 440, the SET 450, the S-RT 460 and the DVT 470 in order to perform the parsing of the typical bitstream 316. Hereinafter, the pertinent partial decoder descriptions can be referred to as "second decoder descriptions" if necessary. The format and function of each partial decoder description will be described below in detail.

The description decoder 405 decodes the encoded decoder description 313 inputted from the dividing unit 310 to generate a decoder description. Thereafter, the description decoder 405 divides the generated decoder description into a plurality of partial decoder descriptions in the form capable of being recognized by a decoder forming unit 520 (or a decoding solution 530) and stores the divided partial decoder descriptions in a description storing unit 510.

It is unnecessary that each partial decoder description being stored in the description storing unit 510 is represented in the form of a typical table. It is sufficient as long as the partial decoder description is information capable of being recognized by the decoder forming unit 520 (or the decoding solution 530).

Figure 11:
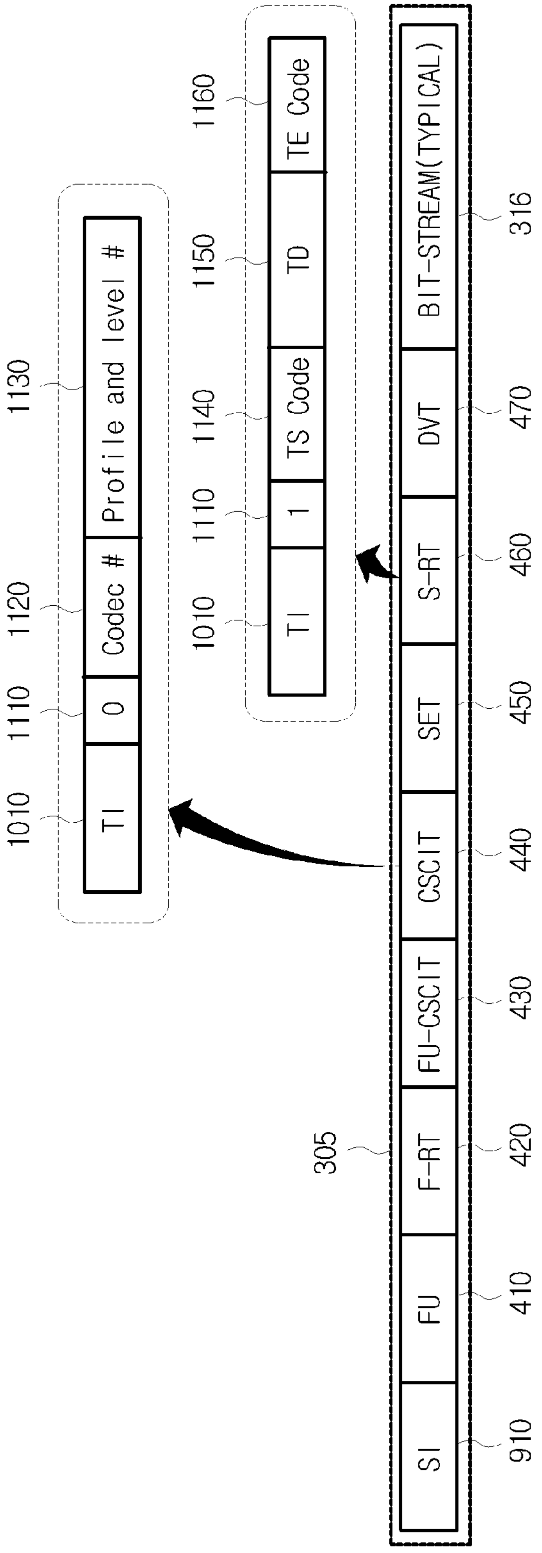
FIG. 11 shows the structure of an extended bitstream in accordance with a third embodiment of the present invention.

The partial decoder descriptions such as the FL 410, the F-RT 420, the FU-CSCIT 430, the CSCIT 440, the SET 450, the S-RT 460 and the DVT 470 can be stored in the description storing unit 510 by allowing the decoder description to be analyzed by the description decoder 405. The description decoder 405, as shown in FIG. 11, can distinguish each partial decoder description with reference to a table identifier (TI) 1010.

Figure 9:
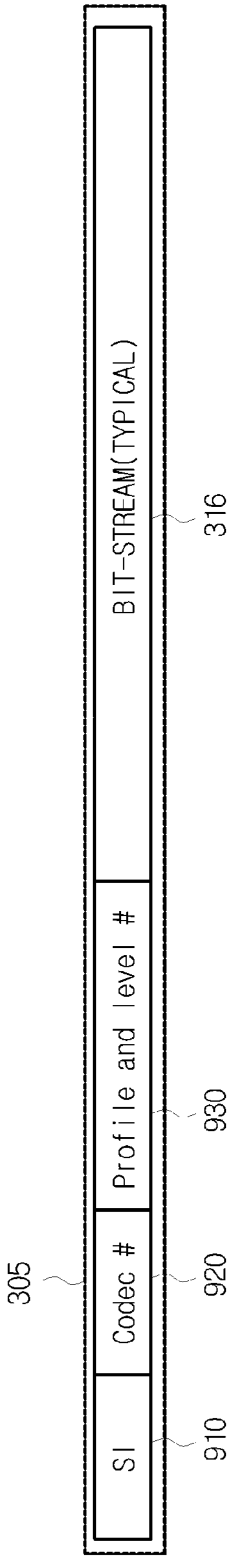
FIG. 9 shows the structure of an extended bitstream in accordance with a first embodiment of the present invention.

Of course, it is unnecessary that the decoder description includes information corresponding to all partial decoder descriptions. As shown in FIG. 9, the decoder description can include a codec number 920 and a profile and level number 930, or as shown in FIG. 11, the decoder description can include a codec number 1120 and a profile and level number 1130 for only some of the partial decoder descriptions.

In the case of including the codec number and the profile and level number, the description decoder 405 can select a corresponding partial decoder description, to be used for the decoding, from the partial decoder descriptions pre-stored in the description storing unit 510, instead of generating a new partial decoded description, for all or some of partial decoder descriptions. Moreover, in the case of including the codec number, the profile and level number and correction information, the description decoder 405 can extract a partial decoder description corresponding to a pertinent codec from the partial decoder descriptions pre-stored at the description storing unit 410 and generate a new partial decoder description to which the correction information is applied. Of course, in the case of including a table description for generating a partial decoder description instead of the codec number and the profile and level number, the description decoder 405 can generate a new partial decoder description to be used in the decoding for all or some of the partial decoder descriptions.

Figure 12:
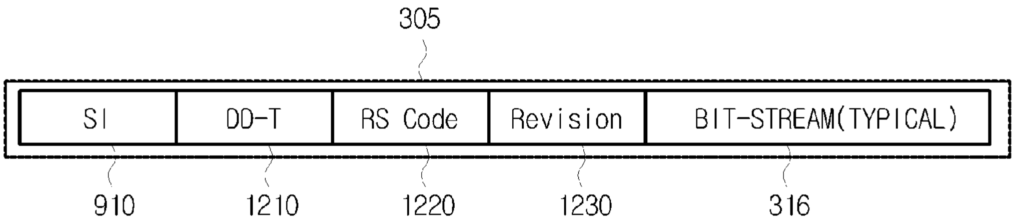
FIG. 12 shows the structure of an extended bitstream in accordance with a fourth embodiment of the present invention.

The decoder description, as shown in FIG. 12, can further include revision information 1230 in addition to the decoder description (DD-T) 1210 related to each partial decoder description. The structure of each extended bitstream will be described in detail with reference to the relative drawings.

The description storing unit 410 stores each partial decoder description that is divided by the description decoder 405. Of course, if the extended bitstream 305 includes the codec number 920 or 1120 and the profile and level number 930 or 1130, the description storing unit 510 can pre-store at least one partial decoder description to allow at least one partial decoder description to be used by the decoder forming unit 520 or the decoding solution 530.

Each embodiment of the decoding processing unit 320 is shown in FIG. 5 and FIG. 6.

Referring to FIG. 5, which shows the decoding processing unit 320 in accordance with a first embodiment of the present invention, the decoding processing unit 320 can include the description decoder 505, the description storing unit 510, the tool box 515, the decoder forming unit 520 and the decoding solution 530.

The decoder forming unit 520 includes an FU checking unit 522, an information processing unit 524, and an information transferring unit 526.

If the partial decoder descriptions are stored in the description storing unit 510 by the processing of the description decoder 505, the FU checking unit 522 checks whether the toolbox includes all of the functional units described in a partial decoder description (e.g. the FL 410). If even one of functional units, which are described in the partial decoder description, is not present in the toolbox 515, an error message can be displayed through a display apparatus or the update of the pertinent functional unit can be requested to a user. Of course, in the case of being connected to a server device for performing the update of the pertinent functional unit through a communication network, the FU checking unit 522 can automatically perform the update through the communication network.

The information processing unit 524 classifies each partial decoder description stored in the description storing unit 510 according to the roles of each partial decoder description and processes each of the partial decoder descriptions in the form being easily operated by the decoding solution 530. This is because the stored format (e.g. a table format) of the partial descriptions stored in the description storing unit 510 may not be adequate for use by the decoding solution 530 or the decoding solution 530 may need information to be used more efficiently.

Since the functions and formats of each partial decoder description are to be described later in detail with reference to the relevant drawings, the format of processed data will be briefly described hereinafter.

The information processing unit 524 classifies the partial decoder descriptions according to their roles whether each of the partial decoder descriptions is to be used for generating or storing control signal/context information (CSCI) or for connecting the functional units, before processing CSCI control information and connection control information. For example, the partial decoder descriptions such as the SET 450, S-RT 460, the CSCIT 440 and the DVT 470 can be used for generating the CSCI control information, and the partial decoder descriptions such as the FL 410, the F-RT 420, the S-RT 460, and the FU-CSCIT 430 can be used for generating the connection control information.

The CSCI control information and the connection control information processed by the information processing unit 524 can be represented according to the representing method of an XML-based abstract decoder model (ADM), for example. Examples are shown as follows. Of course, the representing method of the processed CSCI control information and the processed connection control information is not obviously limited to the below examples.

Firstly, the CSCI control information can be represented as follows.

```
<CSCIs>
    <csci_memory id="C0" name="CSCI #0" type="integer" />
    <csci_memory id="C1" name="CSCI #1" type="integer" />
    <csci_memory id="C2" name="CSCI #2" type="array" />
    <csci_memory id="C3" name="CSCI #3" type="integer" />
    <csci_memory id="C4" name="CSCI #4" type="integer" />
    <csci_memory id="C5" name="CSCI #5" type="integer" />
    <csci_memory id="C6" name="CSCI #6" type="integer" />
    <csci_memory id="C7" name="CSCI #7" type="integer" />
    <csci_memory id="C8" name="CSCI #8" type="integer" />
    <csci_memory id="C9" name="CSCI #9" type="integer" />
    <csci_memory id="C10" name="CSCI #10" type="integer" />
    <csci_memory id="C11" name="CSCI #11" type="integer" />
    <csci_memory id="C12" name="CSCI #12" type="integer" />
    ......
</CSCI>
```

Next, the connection control information can be represented as follows.

```
<Network name="Decoder">
<Package>
<QID>
<ID id="MPEG4 Simple Profile" />
</QID>
</Package>
<Port kind="Input" name="BITSTREAM" />
<Port kind="Ouput" name="YUV" />
<Instance id="1">
<Class name="Parser">
```

-continued

```
<QID>
<ID id="c" />
</QID>
</Class>
<Note kind="label" name="Stream Parser" />
</Instance>
<Instance id="2">
<Class name="VS">
<QID>
<ID id="c" />
</QID>
<Note kind="label" name="Video Session" />
</Class>
</Instance>
<Connection src="" src-port="BITSTREAM" dst="1"
dst-port="BITSTREAM" />
<Connection src="1" src-port="CSCI" dst="2" dst-port="CSCI" />
<Connection src="1" src-port="DATA" dst="2"
dst-port="DATA" />
<Connection src="2" src-port="YUV" dst="" dst-port="YUV" />
</Network>
```

The information transferring unit 526 transfers the CSCI control information and the connection control information, processed by the information processing unit 524, to the decoding solution 530. The information transferring unit 526 can transfer the CSCI control information to a CSCI storing unit 532, which actually performs the storage and operation of CSCI information, and the connection control information to a connection control unit 534, which controls the connection between functional units. It shall be obvious that if the CSCI storing unit 532 is operated only to store the CSCI information and the operation of the CSCI information is performed by the connection control unit 534, the information transferring unit 524 can transfer the CSCI control information and the connection control information to the connection control unit 534.

The decoding solution 530 includes the CSCI storing unit 532 and the connection control unit 534. The decoder solution 530 can further include a working memory (not shown), which allows at least one functional unit to be loaded by the calling of the connection control unit 534 to perform a predetermined process.

Referring to FIG. 6, which shows a second embodiment of the decoding processing unit 320, the decoding processing unit 320 can include the description decoder 505, the description storing unit 510, the toolbox 515, the decoder forming unit 520, and the decoding solution 530.

Compared with FIG. 5, the decoding solution 530 of the decoding processing unit 320 in FIG. 6 can further include a parsing functional unit 610. The parsing functional unit 610 performs the syntax parsing of a bitstream. The parsing functional unit 610 can be stored in the decoding solution 530 as an independent element. However, it shall be obvious that the same effect can be brought about by allowing the decoding solution 530 to have two working memories and the connection control unit 534 to control one of the two working memories to dedicatedly load only functional units for performing the decoding and the other working memory to dedicatedly load the parsing functional unit 610 only. In two aforementioned cases, the parsing processing and decoding processing of a bitstream can be performed successively and/or in parallel.

Compared with FIG. 5, the information processing unit 524 also additionally processes syntax parsing control information and provides it to the decoding solution 530, for the processing of the parsing functional unit 610. Accordingly, it may be possible to change the roles of the partial decoder descriptions for generating the CSCI control information, the connection control information and the syntax parsing control information.

In particular, the information processing unit 524 classifies the partial decoder descriptions according to whether each of the partial decoder descriptions is used for the generation or storage of the CSCI, the syntax parsing, or the connection of functional units, before processing CSCI control information, connection control information and syntax parsing control information. For example, the partial decoder description such as the CSCIT 440 can be used for generating the CSCI control information; the partial decoder descriptions such as the FL 410, the F-RT 420, and the FU-CSCIT 430 can be used for generating the connection control information; and the partial decoder descriptions such as the SET 450, the S-RT 460, the CSCIT 440, and DVT 470 can be used for generating the syntax parsing control information.

As described above, the CSCI control information and the connection control information processed by the information processing unit 524 can be represented according to the representing method of an XML-based abstract decoder model (ADM), for example. Below is an example of representing the syntax parsing control information.

```
<syntax>
  <syntax_element id="S0" name="Syntax #0">
    <process>
      <cmd type="READ">
        <parameter index=0>32</parameter>
        <parameter index=1>B</parameter>
      </cmd>
      <cmd type="EXPRESSION">
        <parameter index=0>(C0=(IBS==HEX:1B0))</parameter>
      </cmd>
    </process>
  </syntax_element>
  <syntax_element id="S1" name="Syntax #1">
    <process>
      <cmd type="READ">
        <parameter index=0>8</parameter>
        <output type="CSCI">C1</output>
      </cmd>
    </process>
  </syntax_element>
  (......)
</syntax>
```

The information transferring unit 526 transfers the CSCI control information, the connection control information, and the syntax parsing control information, processed by the information processing unit 524, to the decoding solution 530. The information transferring unit 526 can transfer the CSCI control information to the CSCI storing unit 532, which actually performs the storage and operation of CSCI information, the connection control information to the connection control unit 534, which controls the connection between functional units, and the syntax parsing control information to the parsing functional unit 610. It shall be obvious that, if the CSCI storing unit 532 is operated only to store the CSCI information and the operation of the CSCI information is performed by the connection control unit 534, the information transferring unit 524 can transfer the CSCI control information and the connection control information to the connection control unit 534. It shall be also obvious that, if the parsing functional unit 610 performs the syntax parsing of a bitstream by the control of the connection control unit 534, the information transferring unit 524 can transfer the syntax parsing control information to the connection control unit 534.

The decoding solution 530 includes the CSCI storing unit 532, the connection control unit 534, and the parsing functional unit 610. The decoder solution 530 can further include at least one working memory, which allows at least one functional unit to be loaded by the calling of the connection control unit 534 to perform a predetermined process.

The parsing functional unit 610 can be a functional unit that can perform the syntax parsing of all bitstreams regardless of the encoding formats of the bitstreams or a functional unit that is particularly generated to perform the syntax parsing of a particular type of bitstream. In brief, the parsing functional unit 610 includes at least one functional unit for performing the syntax parsing. Hereinafter, the parsing functional unit 610 will be described in detail with reference to the relevant drawings.

As shown in FIG. 5 and FIG. 6, it is possible to re-combine or form the decoder 300 of the present invention in various ways such that an inputted bitstream can be decoded regardless of the encoding type by allowing the functional units (e.g. a functional unit for performing the decoding and/or the parsing functional unit for performing the syntax parsing) of the toolbox 515 to be selectively loaded and to be decoded.

As described above, the decoder forming unit 520 (or the connection control unit 534) forms a decoder for processing an inputted bitstream, and the decoding of a bitstream is performed by an actual decoder (i.e. the decoding solution 530) formed by the control of the decoding forming unit 520 (or the connection control unit 534). As such, separating two processing units that have the casual relationship with each other makes it possible to form a plurality of decoding solutions by using one decoder forming information, thereby allowing a decoder to more efficiently perform the processing.

Hereinafter, the function and operation of each element of the decoding processing unit 320 will be described with the relevant drawings.

The description decoder 505, as described above, decodes the inputted encoded decoder description 313 as a decoder description, and then divides the decoder description into a plurality of partial decoder descriptions to store them in the description storing unit 410.

The toolbox 515 includes a plurality of functional units, each of which is realized to perform a predetermined process. Here, the parsing functional unit 610, which is formed by using one functional unit or the combination of functional units, can be included in the toolbox 515 or the decoding solution 530. A parsing functional unit and each functional unit can be formed by using the combination of each program code.

In other words, the toolbox 515 refers to an area in which functional units realized to perform each function (i.e. predetermined processes) are included. Each of the functional units is loaded by the connection control of the connection control unit 534, thereby forming successive connection operation relationship in order to output encoded video data included in the typical bitstream 316 as video data.

Of course, as described with reference to FIG. 6, the parsing functional unit 610 can be formed to perform the analysis of the typical bitstream 316 without the connection control of the connection control unit 534 by being included in decoding solution 530 and using syntax parsing control information. This is because the following functional units may use element information that is analyzed by the parsing functional unit 610 and stored in the CSCI storing unit 532 and/or video data of a micro block size outputted from the parsing functional unit 610.

The parsing functional unit 610 analyzes the inputted typical bitstream 316 by using the syntax parsing information in order to store element information as a result of the syntax parsing in the CSCI storing unit 532. The CSCI storing unit 532 may be a buffer memory, for example. The element information may be CSCI, for example. The element information that is parsed by the parsing functional unit 610 and stored in the CSCI storing unit 532 may be a parsed result value of a pertinent operation and an input value determining the following syntax of the typical bitstream 316, simultaneously.

The parsing functional unit 610 can also perform the entropy decoding of video data and a header of the syntax-parsed typical bitstream 316 to output video data of a predetermined macroblock size to a following functional unit according to the connection control of the connection control unit 534.

Of course, the parsing functional unit 610 can store video data of a macroblock size in a predetermined buffer memory, and a following functional unit according to the load (i.e. the connection control) of the connection control unit 534 can read the video data of the macroblock size from the pertinent buffer memory to process the read video data. Then, the parsing functional unit 610 can store the processed video data at the pertinent buffer memory, for the processing of a following functional unit.

In other words, the parsing functional unit 610 can obviously store the video data of the macroblock size in the CSCI storing unit 532 or a buffer memory before the connection control unit 534 provides the stored video data of the macroblock size to a selected functional unit or the selected functional unit reads the video data from the CSCI storing unit 532 or the buffer memory. Hereinafter, it is assumed that the video data of the macroblock size outputted by the parsing functional unit 610 is directly inputted into a functional unit according to the connection control of the connection control unit 534.

The parsing functional unit 610 can be realized as one software program (including a combination of program codes). This is because even though the parsing functional unit 610 is realized to perform a plurality of functions corresponding to a plurality of standards (e.g. MPEG-1/2/4/AVC and AVS), respectively, it is possible to perform a corresponding operation by using the syntax parsing control information. Of course, the parsing functional unit 610, as shown in FIG. 7, can be realized by being segmented into a plurality of functional units or as a combination of program codes into which each functional unit is blocked.

Hereinafter, the functions of the parsing processing unit 610 will be described by describing each functional unit shown in FIG. 7 in detail.

The parsing functional unit 610, as shown in FIG. 7, can include a network abstraction layer parsing (NALP) functional unit 710, a syntax parsing (SYNP) functional unit 720, a context determination (CTX) functional unit 730, a variable length decoding (VLD) functional unit 740, a run length decoding (RLD) functional unit 750 and a macroblock generator (MBG) functional unit 760.

It shall be obvious that the parsing functional unit 610 can include any functional unit for performing the syntax parsing regardless of an applied standard, that a functional unit necessary for performing the syntax parsing can be added, that an existing functional unit can be modified and that an unnecessary functional unit can be deleted. It is also obviously possible to combine the functional units that are commonly applicable by a plurality of standards among functional units included in the parsing functional unit 610. Described below is each function of the functional units, which is evident to any person of ordinary skill in the art.

The NALP functional unit 710 parses a network abstraction layer (NAL) of MPEG-4 AVC, and the SYNP functional unit 720 parses the syntax of a bitstream. The SYNP functional unit 720 can be included in the VLD functional unit 740.

The CTX functional unit 730 determines a VLC table of MPEG-4 AVC, and the VLD functional unit 740 performs the entropy decoding.

The RLD functional unit 750 performs the entropy decoding of AC values, and the MBG functional unit 760 combines DC values and AC values to generate one macroblock datum. The VLD functional unit 740 can perform the functions of all or some of the functional units included in the aforementioned parsing functional unit 610, according to system realizing types.

As described above, the parsing functional unit 610 can be realized as one software program or a plurality of software programs (e.g. the VLD functional unit 740 can be independently realized as an independent software program). The operation, by which the parsing functional unit 610 extracts or generates element information by using syntax parsing control information and stores the extracted or generated element information in the CSCI storing unit 532, will be described later when the connection control unit 534 is described.

The decoding functional units included in the toolbox 515 decodes video data in units of macroblocks, outputted (or stored at the buffer memory) by the parsing functional unit 610, and outputs the decoded video data having a predetermined size by being activated by the selective load of the connection control unit 534 and performing each predetermined process.

The toolbox 515 can include functional units for performing the foregoing functions according to each standard. Each functional unit can be realized as an independent processing block (e.g. a software program, a combination of command codes and a function) or one integrated processing block. Although the decoding functional units are realized as one integrated processing block, the corresponding processing can be obviously performed by the connection control of the connection control unit 534.

The decoding functional units, as shown in FIG. 8, can include a de-blocking filtering (DF) functional unit 810, a VOP reconstructing (VR) functional unit 815, a frame field reordering (FFR) functional unit 820, an intra prediction and picture reconstruction (IPR) functional unit 830, an inverse transform (IT) functional unit 835, an inverse quantization (IQ) functional unit 845, an inverse AC prediction (IAP) functional unit 855, an inverse scanning (IS) functional unit 860 and a DC reconstruction (DCR) functional unit 865.

An IT 4×4 functional unit 840, an IQ 4×4 functional unit 850 and a DCR 4×4 functional unit 870 process the blocks having the size of 4×4. This is because although MPEG-1/2/4 process data in 8×8 block size in the transform, quantization and prediction, MPEG-4 AVC may process data in 4×4 block size.

It shall be obvious that the toolbox 515 can include any functional unit for performing a data decoding function regardless of an applied standard, that a necessary functional unit for the developed technology can be added, that an existing functional unit can be modified and that an unnecessary functional unit can be deleted. For example, in the case of additionally needing the IS functional unit processing data in 4×4 block size to perform the decoding, the pertinent functional units can be included in the toolbox 515. A special prediction (SPR) functional unit (not shown) can be also added to perform the intra prediction in the MPEG-4 AVC.

It shall be obviously possible to combine the functional units that are commonly applicable by a plurality of standards among functional units of the toolbox 515. Briefly described below is each function of the functional units, which is evident to any person of ordinary skill in the art.

The DF functional unit 810 is a de-blocking filter of MPEG-4 AVC, and the VR functional unit 815 is a functional unit storing a decoded pixel value.

The FFR functional unit 820 is for an interlaced mode, and the IPR functional unit 830 performs the intra prediction of MPEG-4 AVC and then stores a decoded pixel value. As described above, the intra prediction of MPEG-4 AVC can be performed by the SPR functional unit.

The IT functional unit 835 performs the inverse transform of DC values and AC values, and the IQ functional unit 845 performs the inverse quantization of the AC values.

The IAP functional unit 855 performs the inverse AC prediction of the AC values, and the IS functional unit 860 performs the inverse scan of the AC values. The DCR functional unit 865 performs the inverse DC prediction and the inverse quantization of the DC values.

It is unnecessary that the processing operation between the above-described parsing functional unit 610 and decoding functional units is successively performed (i.e. the operation of the parsing functional unit 610 is completed before the decoding functional unit starts to be operated). It is obviously possible to perform the parallel processing by allowing at least two functional units to be loaded onto a working memory by the connection control of the connection control unit 534. This is because it is sufficient to allow only minimum element information necessary for the operation of a particular decoding functional unit to be stored in the CSCI storing unit 532 by the parsing functional unit 610.

As described with reference to FIG. 6, if the parsing functional unit 610 or at least two working memories are included in the decoding solution 530, although the pertinent description is omitted, it is obviously possible to perform the syntax parsing and decoding processing in parallel without additional control of the connection control unit 534.

The CSCI storing unit 532 stores element information (e.g. CSCI), which is the result value from the syntax parsing that the parsing functional unit 610 performs by using CSCI control information (or syntax parsing control information), to correspond to the CSCIT 440. For example, the CSCI storing unit 532 can be a buffer memory.

The element information stored in the CSCI storing unit 532 can be used as input data for performing a process of the SET 450 by the parsing functional unit 610 or as a control variable for determining a following connection index in the S-RT 460.

The element information stored in the CSCI storing unit 532 can be also used as a control variable for determining a following connection index in the F-RT 420 by the connection control unit 534 or used to map an input CSCI of a functional unit to element information, stored in the CSCI storing unit 532, in the FU-CSCIT 430.

In other words, the element information stored in the CSCI storing unit 532 links the parsing functional unit 610 with the decoding functional units.

The connection control unit 534 sets the connection of each decoding functional unit in order to decode a bitstream encoded by various standards through the control of the selective load of each functional unit. In other words, the connection control unit 534 selects a suitable functional unit of each functional unit included in the toolbox 515 in order to determine a performing order of the selected functional units. Herein, the connection control unit 534 connects the pertinent functional units by using connection control information and controls each functional unit to use the element information provided by the parsing functional unit 610 to decode video data in units of macroblock.

Hereinafter, the functions and purposes of each partial decoder description will be described based on the operation of the information processing unit 524 of the decoder forming unit 520 with reference to the relevant drawings. Although the connection control unit 534 performs the processing by using the information processed by the information processing unit 524, this will be described by referring to the details of the partial decoder description for the convenience of description and understanding.

The information processing unit 524 generates the connection control information by using the partial decoder descriptions such as the FL 410, the F-RT 420, the FU-CSCIT 430 and the CSCIT 440. It is also possible to further use the S-RT 460 in order to set the connection of each functional unit for the syntax parsing.

Firstly, an FU list (FL) 410, as shown in FIG. 18, refers to a partial decoder description including a list of functional units included in the toolbox 515, input and output data of the pertinent functional units, and element information controlling the functional units.

The FL 410 can further include a buffer memory name of data inputted into each functional unit (or an address in which pertinent data is written or an address of a buffer memory in which pertinent data is written) and a buffer memory name of data outputted by the pertinent functional unit (or an address in which pertinent data is written or an address of a buffer memory in which pertinent data is written).

Accordingly, each functional unit can use the FL 410 in order to read and process input data and to write corresponding output data. Information written in the FL 410 can be used in order to allow input and output data to be transferred to each functional unit, or the connection control unit 534 can provide suitable input data to each functional unit.

However, in the FL 410, input data and output data of the parsing functional unit generating element information is not written. This is because the parsing functional unit 610 can use information such as the SET 450 in order to generate element information and to write the generated information at a designated position.

The FL 410, as shown in FIG. 18, can include an index (F), which is an identifier for identifying each functional unit, a name of each functional unit (FU name), the number of a CSCI variable, input data, and output data.

The particular functional unit loaded onto the working memory by the connection control unit 534 receives input data from the connection control unit 534 and generates output data by performing a predetermined process. Here, the functional unit is included in the toolbox 515, and refers to a series of processing operations (e.g. purposes, algorithms, and functions) that process the input data by performing the predetermined process to generate the output data. The pertinent functional unit can store the output data in a buffer memory for the processing of a following functional unit (i.e. a functional unit subsequently loaded by the control of the connection control unit 534). Since the functional units of FIG. 18 have been described with reference to the relevant drawings, the pertinent detailed description will be omitted. Similarly, since a QFS, a QFSP, a PQF, and a QF are evident to any person of ordinary skill in the art of MPEG, the pertinent description will be omitted. For example, the QFS refers to a various-length encoded output value.

If it is sufficient that the decoding processing unit 320 uses only one standard to decode encoded video data included in the typical bitstream 316, the FL 410 can only include information related to the functional units for performing a corresponding process of the pertinent standard.

However, in case that the pertinent video data is encoded by a plurality of standards (e.g. in the case of applying different encoding standards in units of a plurality of frames), information related to the functional units conforming to a plurality of standards to decode pertinent encoded video data will be necessary. Accordingly, in this case, the FL 410 is required to include the information related to the functional units conforming to a plurality of standards necessary to decode the encoded video data among all functional units conforming to a plurality of corresponding standards.

Of course, even though different standards encoded in units of a plurality of frames are applied to video data, if the plurality of typical bitstreams 316 and extended bitstreams 305 are generated per applied encoding standard, each of the FL 410 can include the information related to the functional units conforming to each corresponding standard.

The FL 410 can be described by using a describing method such as a textual description or a binary description (i.e. a bit-converted binary code form). The minimum necessary data of the partial decoder description can be written in a similar scripting language.

Next, the F-RT 420 provides connection information of the functional unit to be used to decode the inputted typical bitstream 316.

The F-RT 420, as shown in FIG. 19, includes an index (R) indexing each connection information (Rule), a functional unit (F#), corresponding to a pertinent connection index, element information (input CS/CI, C#) necessary for the connection control, the number of branches (No. of branches), connectable to a following functional unit and each branch information (#1, #2 and #3 . . . ) necessary as many as the number of branches.

Only if the number of branches is equal to or greater than 2, there is the necessary element information. In this case, the connection index can vary according to the determined result of a conditional statement using the necessary element information. In other words, if the number of branches is 1, there is no necessary element information and it proceeds to the connection index pointed by the branch information. After the pertinent conditional statement, a following connection index (R) is shown.

If it is sufficient that the decoding processing unit 320 uses only one standard to decode encoded video data included in the typical bitstream 316, the F-RT 420 will indicate the connection of the functional units for performing a corresponding process of the pertinent standard.

However, if the pertinent video data is encoded by a plurality of standards (e.g. in the case of applying different encoding standards in units of a plurality of frames), the obvious thing is to include the information for designating the connection of the functional units conforming to a plurality of standards to decode pertinent encoded video data. If each partial decoder description, to be described below, needs additional information for applying a plurality of standards and/or correction for applying a plurality of standards, it is obvious that pertinent information will be further included.

The F-RT 420 can be described by using a describing method such as a textual description or a binary description (i.e. a bit-converted binary code form). The minimum necessary data of the partial decoder description can be written in a similar scripting language.

F0 is a functional unit for performing R0 through R5 and R12 among the indexes (R) indexing each connection information (rule) shown in FIG. 19. Referring to the FL 410 in FIG. 18, it can be recognized that F0 is the parsing functional unit 610. Accordingly, it can be recognized that the connection control unit 534 controls the connection of operations of each functional unit (including functional units performing syntax parsing in the case of FIG. 5) included in the toolbox 515. Moreover, in case that the selected functional unit is a functional unit performing the syntax parsing, the F-RT 420 includes the connection information (rule) indicating that the pertinent functional unit must read and process an $n^{th}$ syntax (e.g. F0 (R74)).

Moreover, an index R1 is defined with "PROCESS1" on a field of functional unit. For example, "PROCESS1" can be a function being called to perform other operations (i.e. operations except for syntax parsing and data decoding) necessary for programming software such as variable declaration, memory setting, and initialization of a variable value. Such a process can be inserted into the necessary location of the F-RT 420 for the performing of software and called by the connection control unit 530 in the middle of the syntax parsing operation or the data decoding operation. Even though FIG. 19 shows that one process is inserted, it shall be obvious that a plurality of processes having all identical performing operations or different performing operations can be inserted into a plurality of locations of the F-RT 420.

Next, the FU-CSCIT 430 is a partial decoder description for connecting element information stored in the CSCI storing unit 532 with element information (input CSCI) necessary for each functional unit.

As shown in FIG. 20, the FU-CSCIT 430 includes an index (F-C), which is arranged as a pair of the index of the FL 410 and element information, pertinent element information, and an index (C) used for the mapping in the CSCIT 440. In addition, the FU-CSCIT 430 can further include a data type of element information. The data type will be described as 9-bit integer and 1-bit flag, for example.

The FU-CSCIT 430 can be described by using a describing method such as a textual description or a binary description (i.e. a bit-converted binary code form). The minimum necessary data of the partial decoder description can be written in a similar scripting language.

For example, if F1 receives 4 items of element information from the F-RT 420 (refer to FIG. 18), the element information is listed per functional unit in the FU-CSCIT 430. In other words, F1-C1, F1-C2, F1-C3 and F1-C4 are listed, and like C54, C56, C58 and C65, each element information is mapped by using the index (C) of the CSCIT 440 (refer to FIG. 21).

Similarly, if F2 receives 2 items of the element information, the FU-CSCIT 430 indexes F2-C1 and F2-C2, and C56 and C 58 are mapped. Here, the C54 and C 56 can be recognized as the addresses in which the corresponding element information (e.g. a history address, a buffer memory title or a history address of a buffer memory) is stored. The pertinent functional unit can generate output data by using the input data and the element information corresponding to index (C) and output (or write in the buffer memory) the generated output data.

For example, the DCR needs 4 items of element information to process input data of QFS in the FL 410, and the 4 items of element information is recognized as C54, C56, C58 and C65 by the FU-CSCIT 430. The CSCIT storing unit 532 reads the element information corresponding to the pertinent index (C) to generate QFSP.

Finally, the CSCIT 440 writes details related to the element information (e.g. CSCI) as result information of a process that the parsing functional unit 610 uses the SET 450 and S-RT 460. In other words, the CSCIT 440 has information related to all meaningful data (i.e. element information), which is processed from the typical bitstream 316 and stored in the CSCI storing unit 532 and to be used by the decoding functional units.

As shown in FIG. 21, the CSCIT 440 includes an index (C), which is an identifier as an identification number of the pertinent element information, a flag, a name (Element Name) of pertinent element information, an attribute (e.g. a storage space size of the pertinent element information and determination of whether the pertinent element information is an array type) for designating a data-structural property of pertinent element information and global/local indicating whether the pertinent element information is used in the syntax parsing operation only or in the overall decoding operation.

The CSCIT 440 can be described by using a describing method such as a textual description or a binary description (i.e. a bit-converted binary code form). The minimum necessary data of the partial decoder description can be written in a similar scripting language.

Next, the CSCIT 440, the SET 450, S-RT 460 and the DVT 470, which are used in order to extract or generate element information from the typical bitstream 316 and store the extracted or generated element information in the CSCI storing unit 520, will be described. However, since the CSCIT 440 has already been described with reference to FIG. 20, the pertinent description will be omitted.

Firstly, the SET 450 refers to a partial decoder description formed to include information related to the syntaxes of the inputted typical bitstream 316.

As shown in FIG. 22 through FIG. 25, the SET 450 includes an index of each of the syntax, an element name, input data, output data and a SET-process (process by SET-PROC). Here, the index refers to an identifier S identifying each of the syntax used for the S-RT 460. The element name, which is a name of the syntax, can be named with reference to the meaning or function of the syntax. The input data refers to a nominal length of a bit inputted at one time in the typical bitstream 316. The output data, which is element information (i.e. CSCI (C)), refers to a list of the CSCIT 440 referred when acquired data is stored. Here, an output data field can be the name of a buffer memory in which generated element information (or a written address of the pertinent data or an address of the buffer memory in which the pertinent data is written) is to be written. Then, in the case of needing the pertinent element information as input data, the pertinent element data can be read by using the CSCI (C). The SET-process writes the process including what processing operation is performed to generate the element information as output data after each of the bitstream syntax is inputted.

The SET 450 can be described by using a describing method such as a textual description or a binary description (i.e. a bit-converted binary code form). The minimum necessary data of the partial decoder description can be written in a similar scripting language.

Then, the S-RT 460 refers to connection information between syntaxes in the typical bitstream 316. In other words, the S-RT 460 has information to order to call each of the syntax and to move to a next syntax. The parsing functional unit 610 uses the R-ST 460 to read the typical bitstream 316 or to determine the sequence of storing and/or renewing the element information in the CSCI storing unit 532.

As shown in FIG. 26 through FIG. 29, the S-RT 460 includes an index (R), an index (S) of syntax, input data (C), the number of branches, and branch information.

The index (R) indexes each of the connection information (Rule). Since the index (S) of the syntax designates the syntax to be processed in a particular connection index, the parsing functional unit (or the functional units performing the syntax parsing) uses the SET 450 to perform the designated process of the pertinent syntax.

The input data indicates a list of the element information to be used for the conditional determination to control the connection of a pertinent connection index The number of branches, which is the number of cases capable of being connected to a following syntax, refers to the total number of the branch routes of a corresponding connection index. The branch information, which is provided in the same quantity as the number of branches (#1, #2, #3 . . . ), refers to a condition determining algorithm determining which connection index is processed next. It is possible to directly determine the sequence and contents of data to be read by the branch information. As shown in FIG. 22 through FIG. 25, if the number of branches is 1, no input data is provided and it directly proceeds to process the connection index designated by the branch information. However, if the number of branches is 2 or more, the condition determination (consisting of following connection information (R) after the conditional statement) is performed and it proceeds to process a corresponding connection index The parsing functional unit 610 renews the CSCI storing unit 532 by processing the syntax defined in the pertinent connection index. Then, the parsing syntax unit 610 reads the renewed data by referring to the element information of the CSCI storing unit 380 to use it for branch condition determination. For example, C0 under the branch condition of the branch information of an index R0, "C0==1," is the element information C0 after the syntax S0 is processed.

The S-RT 460 can be described by using a describing method such as a textual description or a binary description (i.e. a bit-converted binary code form). The minimum necessary data of the partial decoder description can be written in a similar scripting language.

Finally, the DVT 470 refers to a partial decoder description in which Huffman table information to be used by each encoder/decoder is written. In each encoding, MPEG-1/2/4/AVC performs entropy coding. At this time, a Huffman coding method is mainly used. In this case, the Huffman table is used. It is required that the Huffman table information to be used by the pertinent decoder be provided in each decoding in order to realize an integrated codec. Accordingly, the decoder description in accordance with the present invention includes the Huffman table information corresponding to each of the syntax when the syntax is parsed. Of course, in case that the Huffman table information corresponding to each standard is already written in the description storing unit 510, the transmission of the DVT 470 will be omitted, or as shown in FIG. 11, it is possible to include a codec number (Codec #) and a profile and level number (Profile and level number) only.

As shown in FIG. 30 and FIG. 31, the DVT 470 includes a name of each Huffman table, an actual value outputted after being compressed by a Huffman coding and a code value used when the compressed actual value is stored in the typical bitstream 316. For example, if the actual value, 3, is obtained by compressing an MCBPC value, the code value of 011 is written in the typical bitstream 316 by a Huffman table mapping work (e.g. a process part of the SET 450). For another example, since VLD[1] is written in a process part of an index S77 (refer to FIG. 22 through FIG. 23) of the SET 450, a function VLD is called. The code value is obtained by reading the typical bitstream 316 in a length (i.e. a fixed length or a variable length) pre-determined by the function. Then, the corresponding actual value can be obtained by the Huffman table mapping work. At this time, a Huffman table [1], which is the first table CBPY, is used.

The DVT 470 can be described by using a describing method such as a textual description or a binary description (i.e. a bit-converted binary code form). The minimum necessary data of the partial decoder description can be written in a similar scripting language.

Below is an example of the DVT 470 described in textual description.

DVT{((0,1), (1,001), (2,010), (3,011), (4,0001), (5,000001), (6,000010)7, (7,000011), (8,000000001), (9,NULL)) ((0,0011), (1,00101), (2,00100), (3,1001), (4,00011), (5,0111), (6,000010), (7,1011), (8,00010), (9,000011), (10,0101), (11,1010), (12,0100), (13,1000), (14, 0110), (15,11), (16,000000), (17,000001), (18,NULL)) ((0, 011), (1,11), (2,10), (3,010), (4,001), (5,0001), (6,00001), (7,000001), (8,0000001), (9,00000001), (10,000000001), (11,0000000001), (12,00000000001), (13,NULL)) ((0,11), (1,10), (2,01), (3,001), (4,0001), (5,00001), (6,000001), (7,0000001), (8,00000001), (9,000000001), (10,0000000001), (11,00000000001), (12,000000000001), (13,NULL)) . . . .

Below is another example of the DVT 470 described in binary description.

00000011111111111111111111111111011111100001100-
011001000110100001 1011001000000100110000000100110-
0000100011000001101001000000000100000011111 0010-
00011001010010100101001000010010010010100011001-
0001110011000001000 1001011001010001000110-
000011001000101001001010001000100001001000001000
110000101100110000000001100000010000011111100011-
0110001011000101000011 0 1000011001001000001-
0010100001001100000010011100000010100000000000010-
1001 00000000101010000000000010101100000000000100-
000111110001011000101000010 0
10001100100100000100101000010011 00000010 . . . .

Each partial decoder description can be written in the binary description, to thereby reduce a storage space, improve processing efficiency and shorten the time taken to transmit the extended bitstream 305 including the decoder description. Below, Table 1 is an example of an overhead bit of textual description and binary description.

TABLE 1

| Overhead of Textual/Binary Description (bytes) | | |
|---|---|---|
| Table name | Textual Description | Binary Description |
| SET | 3653 | 1089 |
| S-RT | 4201 | 1122 |
| F-RT | 466 | 142 |
| CSCIT | 808 | 24 |
| FU-CSCIT | 151 | 37 |
| FL | 98 | 28 |
| DVT | 2599 | 259 |
| Total | 11,976 | 2,702 |

Described below is a linking operation between partial decoder descriptions to be used by the parsing functional unit 610 and/or the connection control unit 534.

In accordance with the present invention, the decoding processing unit 320 of the decoder 300 can start to be operated in various ways. Some examples are described below.

One example, which is applicable to the decoding processing unit 320 of FIG. 5, is to control the processing relationship (e.g. operation sequence and connection) of each functional unit of the toolbox 515 by using connection control information and CSCI control information received from the decoder forming unit 520. According to this method, as shown in the F-RT 420, the parsing functional unit 610 is firstly loaded among the functional units of the toolbox 515, to thereby allow the element information, evaluated by allowing the typical bitstream to be syntax-parsed, to be stored in the CSCI storing unit 532. Then, if the control authority is returned to the connection control unit 534 (e.g. to allow the control authority to return to the connection control unit 534 like the index R72 of the S-RT 460), the corresponding functional unit is loaded to process a following operation, to thereby control the connection of each functional unit.

According to another method, which is applicable to the decoding processing unit 320 of FIG. 6, if the parsing functional unit 610 having received the syntax parsing control information is independently operated and completes the syntax parsing of the typical bitstream, the connection control unit 534 having received the connection control information controls the connection through the selective loading of decoding functional units. In this case, the connection control unit 534 must previously recognize whether some or all of the element information is completed to be stored in the CSCI storing unit 532. Herein, the connection control unit 534 must continuously monitor whether the necessary element information is stored in the CSCI storing unit 532 or allow the parsing functional unit 610 having stored the element information to report this to the connection control unit 534 (e.g. to allow the control authority to return to the connection control unit 534 like the index R72 of the S-RT 460). Of course, the connection control unit 534 (or a functional unit loaded by the control of the connection control unit 534) and/or the parsing functional unit 610 can be obviously on standby after starting its operation without monitoring whether the necessary element information is stored in the CSCI storing unit 532 until the necessary information is stored in the pertinent storing unit.

Another example, which is applicable to the decoding processing unit 320 of FIG. 5 and/or FIG. 6, is to start to operate the decoding processing unit 320 by allowing the decoder forming unit 520 to transfer the CSCI control information and the connection control information to the connection control unit 534 and/or the parsing functional unit 610.

Hereinafter, a linking operation of each partial decoder description being used by the parsing functional unit 610 and/or the connection control unit 534 will be described based on the first aforementioned embodiment of the present invention.

Firstly, the connection control unit 534 can read first rule information (Rule) of the F-RT 420 from the description storing unit 510 to call a pertinent functional unit. As shown in the F-RT 420, the connection control unit 534 firstly reads F0(R0) and load the parsing functional unit of the toolbox 515 in order to start the processing. This may result in allowing processing blocks of the program codes corresponding to the parsing functional unit 610 to be activated. According to the FL 410, F0 can be a parsing functional unit. If the selected functional unit is the parsing functional unit 610, information (e.g. F0(R0) and F0(R114)) related to which syntax is to be read and processed.

The parsing functional unit 610 reads a pertinent syntax by reading rule information (this can be the information processed by the information processing unit 524) designated by the connection control unit 534 (i.e. the F-RT 420) among the rule information (Rule) of the S-RT 460. Since the rule information designated by the F-RT 420 is F0(R0) in the above, the parsing functional unit 610 starts the processing from R0. The parsing functional unit 610 recognizes that a syntax S0 is to be processed in an index R0 by the S-RT 460 and the syntax S0 is a visual object sequence start code. The parsing functional unit 610 also reads a corresponding bit (i.e. 32 bits determined as an input value for the SET 450) from the typical bitstream 316 to generate a corresponding output value (i.e. element information C0) and store it in the CSCI storing unit 532. The CSCIT 440 describes which pertinent element information is stored in the CSCI storing unit 532. Next, the parsing functional unit 610 puts the element information (i.e. C0) stored in the CSCI storing unit 532 into the branch information corresponding to the S-RT 460 and proceeds in order to process an index corresponding to the result. For example, branch information corresponding to the index R0 is "C0==1." If this condition is satisfied, it proceeds to an index R1. Otherwise, it is processed as an error. This operation is continued until it encounters "GO RT" to allow the control authority (e.g. the index R72 of the S-RT 460) to be transferred to the F-RT 420 (i.e. the connection control unit 534).

However, while the parsing function unit 610 uses the SET 450 to generate element information and to store the generated element information in the CSCI storing unit 532, if a VLD function (e.g. an index S74 of the SET 450) is called, the entropy decoding is performed by using the DVT 470. At this time, if the element information is generated, the generated element information is stored in the CSCI storing unit 532.

If there is 'GO RT' in the processing operation of the parsing functional unit 610 and the control authority is transferred to the F-RT 420 (i.e. connection control unit 530) (e.g. index of R72 of the S-RT 460), the connection control unit 534 reads C 63 (i.e. element information according to the index of S57 of the SET 450 in the syntax parsing operation), which is, the input value of an index R0 of the F-RT 420 from the CSCI storing unit 532 and designates a next index to be processed by substituting it for branch information (i.e. ((C63==1)||(C63==2)) or ((C63==3)||(C63==4))). In other words, depending on whether the branch information is satisfied, it is determined whether it proceeds to an index R1, is ended or is processed as an error.

If it proceeds to the index R1, a predetermined processing (e.g. variable declaration, memory setting and variable initialization) is performed, and then, the next index to be processed is determined.

As described above, if some/all element information is stored in the CSCI storing unit 520 by the processing of the parsing functional unit 610, the connection control unit 534 calls a functional unit F1 in an index R6. F1 is identified as the DC reconstruction (DCR).

The DCR recognizes 4 input values (i.e. C54, C56, C58 and C65) by referring to the FU-CSCIT 430 and reads element information from the CSCI storing unit 532. It can be recognized through the mapping to the CSCIT 440 what is the pertinent element information. The DCR completes the processing of the video data having a predetermined macro block size for the pertinent functional unit by using the read element information and stores the processed video data in a buffer memory or the CSCI storing unit 532.

Such an operation, as shown in F-RT 420, is repeated form the index of R6 to R11 of the F-RT 420. Accordingly, the DCR, IS, IAP, IQ, IT and VR are controlled so as to be successively connected. The connection control unit 534 can recognize whether a functional unit completes the processing. If the processing of the pertinent functional unit is completed, the processing of the following functional unit is ordered to be processed. Moreover, the corresponding functional unit stores the processed data in a predetermined buffer memory or the CSCI storing unit 532, to process the video data of the following functional unit. The method by which the connection control unit 532 recognizes whether a functional unit completes the processing is evident to those of ordinary skill in the art, and the pertinent description will be omitted.

The decoding processing unit 320 can output video data corresponding to the inputted typical bitstream 316 by allowing the connection control unit 534 to control the processing to be performed according to the aforementioned operation, which is an index sequence written in the F-RT 420 and/or an index sequence depending on the branch condition.

As understood through the foregoing description, a linking loop between partial decoder descriptions of the present invention can be roughly classified into two types. That is, a F-RT loop is formed to include the F-RT 420, the FL410, the FU-CSCIT 430, the F-RT 420, a CSCIT (branch condition application, for example) and a F-RT (next rule). An S-RT loop is formed to include the S-RT 460, the SET 450, the CSCIT 440, the S-RT 460, the CSCIT (branch condition application, for example) and the F-RT (next rule).

The F-RT loop can be also classified into two types as follows. Firstly, in the case of ordering the execution of the decoding functional unit, the F-RT loop is formed to include the F-RT 420, the FL 410, the FU-CSCIT 430, the F-RT 420, the CSCIT (branch condition application, for example) and the F-RT (next rule). Secondly, in the case of ordering the execution of the parsing functional unit, the F-RT loop is formed to include the F-RT 420, the FL 410, (S-RT loop), the F-RT 420, the CSCIT (branch condition application, for example) and the F-RT (next rule).

The S-RT loop can be also classified into two types as follows. Firstly, in the case of branching into the next rule, the S-RT loop is formed to include the S-RT 460, the SET 450, the CSCIT 440, the S-RT 460, the CSCIT (branch condition application, for example) and the F-RT (next rule). Secondly, in the case of returning to the F-RT 420, the S-RT loop is formed to include the S-RT 460, the SET 450, the CSCIT 440, the S-RT 460, the CSCIT (branch condition application, for example) and the F-RT (index of the called F-RT 420).

The connection control of the connection control unit 534 according to the F-RT 420 may cause the connections of functional unit of the toolbox 510 to be different from one another.

Hereinafter, the commands forming each partial decoder description will be described in detail.

FIG. 32 is an example of commands for constituting each partial decoder description in accordance with an embodiment of the present invention. Information for parsing the syntax of a standard such as MPEG-2/MPEG-4/MPEG-4 AVC (i.e. a partial decoder description) can be formed by using each of the commands. Described below is a linking relationship between partial decoder descriptions for parsing MPEG-2 main profile (MP) intra coded syntaxes and each partial decoder description.

As shown in FIG. 32, each partial decoder description can be formed to include the commands such as READ, SEEK, FLUSH, IF, WHILE, UNTIL, DO~WHILE, DO~UNTIL, BREAK, SET, STOP and PUSH. Of course, all commands are unnecessary for being used in each of the partial decoder descriptions. It shall be obvious that any command can be selectively used per each partial decoder description. The use of each command will be briefly described below.

Firstly, READ is the command for reading a bit from a bitstream, used as, for example, "READ bits B>CSCI;". Here, "bits" indicates the number of bits to be read. "B" refers to a byte-alignment flag. ">CSCI" indicates a CSCI index to be stored. "B" and ">CSCI" are used as options. If ">CSCI" is not designated, it is determined to be stored in the IBS only.

Next, SEEK is the command for reading a bit from a bitstream but allowing a file pointer not to be moved. The file pointer refers to a reference position for the operation such as reading a bit. A parameter of the SEEK command can be applied identically to the above-described READ.

FLUSH is the command for moving the file pointer at a bitstream by as many as the number of the bits. Its parameter can be applied identically to the READ.

IF is the command for providing the branch according to a given condition, used as "IF (condition) {~} ELSE {~}".

WHILE is the command for repeatedly performing a designated block during a period of time, used as "WHILE (condition) {~}" while the given condition is true.

UNTIL is the command for repeatedly performing a designated block during a period of time, used as "UNTIL (condition) {~}" until the given condition is true.

DO~WHILE is the transformation of the WHILE command and the command for performing a block prior to the conditional determination, used as "DO {~} WHILE (condition)".

DO~UNTIL is the transformation of the UNTIL command and the command for performing a block prior to the conditional determination, used as "DO {~} UNTIL (condition)".

The form (~) (compute) is used as, for example, "(C11=(V2+3));". In other words, all computing formulas of SET-PROC can be written in parentheses, and operators such as arithmetic (i.e. addition, subtraction, multiplication and division), substitution, addition/subtraction, (++/−−), bit operation, logical sum/logical product and checking whether CSCI is used.

BREAK is the command for being released from a nearest loop.

SET is the command for setting a flag related to whether to use the designated CSCI. The CSCI to designate flags can be arranged and broken by a comma. For example, the CSCI can be broken as SET C0, C2.

STOP is the command for stopping processing the currently-processed syntax element and turning to a next operation.

PUSH is the command for adding given data in the back of written data in an array-type CSCI. The added values are arranged and broken by a comma (e.g. PUSH C8 8, 16, 32;).

GO is the command for branching into a specified position. For example, GO R#,; indicates branching into R#, and GO RT indicates returning to a called position.

HEX is the command for reporting that a hexadecimal follows the HEX command.

RLD is an interface for an RLD function supportable in MPEG-4, used as "RLD index, level, run, islastrun, t#;". Here, index, level, run and islastrun indicate an internal variable and CSCI storing an RLD return value. t# indicates a Huffman table ID used for RLD.

VLD2 is a VLD function for MPEG-2, used as "VLD2 [t#] in >v1, v2, v3;". Here, "t#" indicates a Huffman table ID used for RLD, and "in" indicates an index value to be inputted. "v1", "v2" and "v3" indicate an output result value.

Finally, VLD4 is a VLD function for MPEG-4, used as "VLD4 [#]>CSCI;". Here, t# indicates a Huffman table ID used for RLD, and ">CSCI" indicates a CSCI index to be stored. If ">CSCI" is not designated as an option, it is determined to be stored in a variable IBS only.

The detailed examples of partial decoder descriptions (i.e. partial decoder descriptions for the syntax processing for MPEG-2 MP intra coding) formed by the aforementioned commands are illustrated through FIG. 33 and FIG. 57. In detail, the SET 450 is shown in FIG. 33 through FIG. 39, the S-RT 460 in FIG. 40 through FIG. 44, the CSCIT 440 in FIG. 45 through FIG. 49, the FL 410 in FIG. 49, the F-RT 420 in FIG. 50, the FU-CSCIT 430 in FIG. 51 and the DVT 470 in FIG. 52 through FIG. 57.

Since the linking relationship between partial decoder descriptions has been already described in detail, the generalization of the linking relationship will be briefly described below.

The linking between the partial decoder descriptions for the syntax parsing is firstly performed in the order of the index of the F-RT 420 (refer to FIG. 50). In other words, the linking is started from the index R0 of the F-RT 420.

The R-RT 420 recognizes the index number (F#) of the functional unit corresponding to the index number (R#) to be currently processed. For example, if the index number to be currently processed is R0, F0 (i.e. the parsing functional unit of the FL 410) is recognized. If the index number to be currently processed is R9, F1 (i.e. the DCR of FL 410) is recognized.

First, the case in which a pertinent functional unit is a syntax parser (i.e. the index number F0 of the FL 410) by the recognized index number will be described.

R# is recognized by using "F#(R#)" information written in a "FU" field of the F-RT 420, and an index of S# corresponding to the index of R# in the S-RT 460 is recognized. For example, "F0(R0)" is written in the "FU" field of the index R0 of the F-RT 420, and R0 corresponds to S0 of a syntax field of the S-RT 460.

Then, "Process by SET-PROC" corresponding to the recognized S# is recognized in the SET 450. For example, "Process by SET-PROC" of the SET corresponding to the S0 of the syntax field of the S-RT 460 is "READ 32 B; IF (IBS==HEX:000001B3) C72=1; IF (IBS==HEX: 000001B8) C72=2; IF (IBS==HEX:00000100) C72=3; IF (IBS==HEX:000001B7) C72=4;".

The result of calculating the "Process by SET-PROC" of the SET 450 is stored corresponding to C# of an "output" field of the pertinent index S#. For example, the "Process by SET-PROC" of the SET corresponding to the S0 of the syntax field of the S-RT 460 is stored as C72.

If the calculated result is completed to be stored, it is determined by re-referring to the S-RT 460 which branch information the stored CSCI information satisfies. In the case of the index R0 of the S-RT 460, it is determined which one of the branch information "1: (C72==1) GO R1; 2: (C72==2) GO R39; 3: (C72==3) GO R47; and 4: (C72==4) GO RT;" C72 of the CSCI satisfies. In the case of satisfying any one of 1 through 3 in the aforementioned 4 conditions, it proceeds to the corresponding index R# in the S-RT 460, and the aforementioned operation is repeated. However, in the case of satisfying the fourth condition (i.e. (C72==4) GO RT), the operation returns to the F-RT 420.

Then, the case in which the pertinent functional unit is not the parsing functional unit (i.e. the index number F0 of the FL 410) by the recognized index number will be described.

The number of an input CSCI corresponding to the pertinent F# is recognized by using the FL 410 and the "F#" information written in the "FU" field of the F-RT 420. For example, "F1" is written in the "FU" field of the index R9 of the F-RT 420. In the FL 410, F1 is the DCR, and the request of 4 input CSCI is written.

If the number of input CSCI required by referring to the FL 410 is not zero, the CSCI value C# corresponding to an "F#(C#)" field is recognized by referring to the FU-CSCIT 440, and the corresponding value is read in the CSCI storing unit 520.

Then, the pertinent functional unit generates output data by using inputted data (e.g. MB data) and input CSCI values and then returns to the F-RT 420.

As described above, in case that the pertinent functional unit is not the syntax parser (i.e. the index number F0 of the FL 410), if it satisfies "GO RT" and the pertinent functional unit is not the syntax parser, a predetermined operation is completed, and then it returns to the F-RT 420.

The F-RT 420 determines the branch condition according to the C# of the current step, and it proceeds to the corresponding step. If the satisfied condition is END (e.g. (C72==4) GO END;), the syntax parsing is ended. If the satisfied condition is ordered to the R# (e.g. GO R1), it proceeds to the pertinent index.

Figure 10:
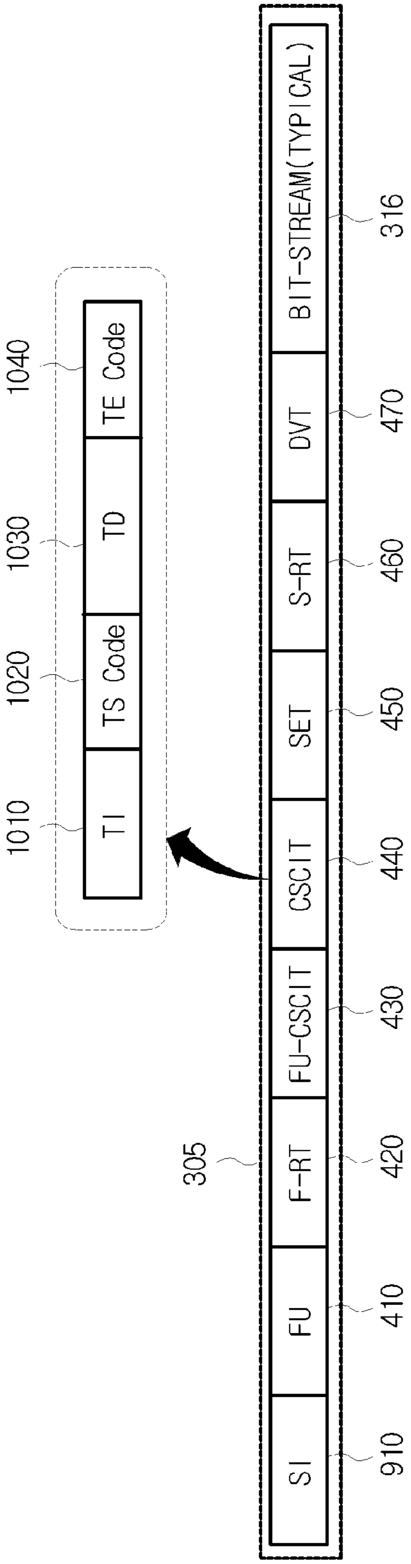
FIG. 10 shows the structure of an extended bitstream in accordance with a second embodiment of the present invention.

FIG. 9 shows the structure of an extended bitstream in accordance with a first embodiment of the present invention, and FIG. 10 shows the structure of an extended bitstream in accordance with a second embodiment of the present invention. FIG. 11 shows the structure of an extended bitstream in accordance with a third embodiment of the present invention, and FIG. 12 shows the structure of an extended bitstream in accordance with a fourth embodiment of the present invention.

As shown in FIG. 9 through FIG. 11, the decoder description included in the extended bitstream 305 of the present invention can be formed so as not to include partial decoder description information but to include applied standard information (no table), so as to include all table information (full tables) and so as to include only some table information (partial tables). In order to identify each of them, the decoder description information can include stream identifier (SI) information. The SI information can be distinguished as shown in the following Table 2.

TABLE 2

| Stream Identifier | |
|---|---|
| SI | Decoder description |
| 00 | No table |
| 01 | Full tables |
| 10 | Partial tables |

As shown in FIG. 9, the extended bitstream 305, which is decoder description (i.e. the encoded decoder description 313, which is decoded to a partial decoder description by the description decoder 505; the same is applied hereinafter), can include an S1910 (i.e. 00) indicating "not including the partial decoder description information" and a codec number 920 and a profile and level number 930.

This shows the case of not sending the partial decoder description information but using the partial decoder description information already stored in a description storing unit 510. Although the pertinent typical bitstream 316 sends basic information related to the used codec and profile and level, the decoding processing unit 320 can perform the decoding by using the ordered partial decoder description.

For this, the SET (450), the CSCIT (440), the FL (410), the FU-CSCIT (430) and the DVT (470) can be described per applied standard (i.e. codec), and the F-RT 420 and the S-RT 460 can be described per profile of each applied standard (refer to Tables 3 and 4.

TABLE 3

| Partial decoder descriptions per codec | | | | | |
|---|---|---|---|---|---|
| Standard | Partial decoder description | | | | |
| MPEG-1 | SET #1 | FL #1 | FU-CSCIT #1 | CSCIT #1 | DVT #1 |
| MPEG-2 | SET #2 | FL #2 | FU-CSCIT #2 | CSCIT #2 | DVT #2 |
| MPEG-4 | SET #3 | FL #3 | FU-CSCIT #3 | CSCIT #3 | DVT #3 |
| AVC | SET #4 | FL #4 | FU-CSCIT #4 | CSCIT #4 | DVT #4 |

TABLE 4

| Partial decoder descriptions per profile and level | | |
|---|---|---|
| SI | Partial decoder description | |
| MPEG-1 | F-RT #1-1 | S-RT #1-1 |
| MPEG-2 MP | F-RT #2-1 | S-RT #2-1 |
| MPEG-4 SP | F-RT #3-1 | S-RT #3-1 |
| MPEG-4 ASP | F-RT #3-2 | S-RT #3-2 |
| AVC BP | F-RT #4-1 | S-RT #4-1 |

In the case of MPEG-4 SP, the decoding method can be described by using SET#3, FL#3, CSCIT#3, FU-CSCIT#3, DVT#3, F-RT#3-1, and S-RT#3-1. If the codec number is designated as 3 and the profile and level number is designated as 2, the decoding processing unit 320 can perform the decoding operation by referring to the corresponding partial decoder descriptions (i.e. by using the corresponding information processed by the information processing unit 524).

As shown in FIG. 10, the extended bitstream 305, which is a decoder description, can include all aforementioned partial decoder description information. In this case, when referring to Table 2, the S1910 will be set as 01. Each partial decoder description can include a table identifier (IT) 1010, a table start code (TS code) 1020, a table description (TD) 1030 and a table end code (TE code) 1040. The order of the IT 1010 and the TS code 1020 can be changed, and the TD 1030 can be described in a form of binary description. Of course, the order of each partial decoder description can be changed.

Moreover, as shown in FIG. 11, the extended bitstream 305, which is the decoder description, can include some aforementioned partial decoder description information and a codec number corresponding to some partial decoder description information. In this case, when referring to Table 2, the S1910 will be set as 10. However, in this case, since the format of the partial decoder description information is not unified, a format identifier 1110 can be further equipped behind the TI 1010 so as to determine the format of the pertinent table information.

As illustrated in FIG. 12, the extended bitstream 305 can further include a decoder description (T-DD) 1210 related to the partial decoder description information and renewing information. The T-DD 1210 can be any one of the decoder descriptions described with reference to FIG. 9 through FIG. 11, and the S1910 will be set as the corresponding value. The renewing information can include a revision start code (RS code) 1220 and a revision 1230.

The revision 1230, in which a regulation rule of a partial decoder description is added, deleted and renewed, can be provided in a form of "insert index into table-name ( )", "delete index from table-name;" and "update index in table-name( )".

For example, in the case of adding S100 into a SET#4, the revision 1230 can be provided in a form of "insert S100 into SET#4 ("READ 1;IF(IBS==1){SET C31;}");". In the case of deleting R31 from a S-RT#3-1, the revision 1230 can be provided in a form of "delete R31 from S-RT#3-1;". In the case of updating R7 in a F-RT#2-1, the revision 1230 can be provided in a form of "update R7 in a F-RT#2-1 (F6, 1: (C66<=6) GO R5; 2: (C65<=C67) GO R4; 3: GO R12;);".

While the description decoder 405 reads the revision 1230 and the decoding of the pertinent extended bitstream 305 is performed, the partial decoder descriptions of their changed revisions are stored in the description storing unit 510. However, once the decoding is completed, the pertinent partial decoder descriptions stored in the description storing unit 510 must be returned to their original state. It is possible to recognize whether the decoding is completed by allowing the decoder forming unit 520 or the decoding solution 530 to provide the completing notice to the description decoder 405 or the description decoder 405 to monitor whether the decoding is completed.

As described above, in accordance with the present invention, the conventional profile can be used by using a functional unit provided by the conventional standard (i.e. codec), and a new decoder can be configured by using the conventional functional unit. Moreover, a new decoder can be realized by using a new functional unit. In other words, a decoder can be embodied without any restriction.

However, in the case of adding a new functional unit into the toolbox 510, the algorithm (i.e. a description related to the functional unit) related to the pertinent functional unit must be added, and the pertinent information must be added into the FL 410. In this case, a compile operation related to the algorithm can be required.

To realize a unified codec, each element must be organically controlled such that a bitstream, encoded by various encoding methods, can be parsed and decoded by a decoding method corresponding to the pertinent encoding method.

In this case, the pertinent bitstream can be a bitstream formed in various forms mixed with diverse standards (codecs) or generated by various encoding methods in one standard. Moreover, various functional units used in the diverse standards must be divided into separate units, and the only function necessary for a user must be selected to make one codec (encoder or decoder), in order to support various decoding/encoding methods.

As described above, the present invention can organically connect and control each functional unit by an identical information analyzing method regardless of the encoding method encoded with a bitstream by allowing a decoder description to be provided.

Moreover, although the syntax of a bitstream is changed or newly added, the appropriate processing can be performed by only modifying the pertinent information of the S-RT 460 or only inserting the additional information. It is also possible to control the connection of decoding functional units of a pertinent decoder or whether the decoding functional units are operated by selecting a function necessary for a user and forming the F-RT 420 in processing units of bitstream level, frame level and MB level.

Figure 13:
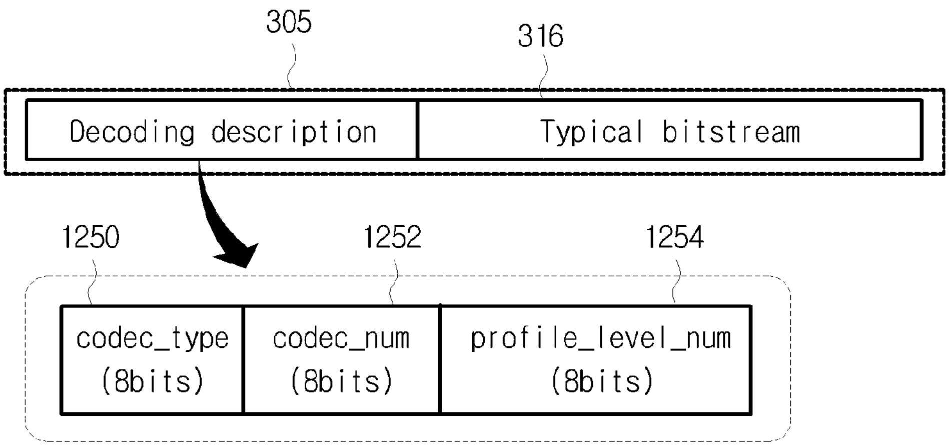
FIG. 13 shows the structure of an extended bitstream in accordance with a fifth embodiment of the present invention.
Figure 14:
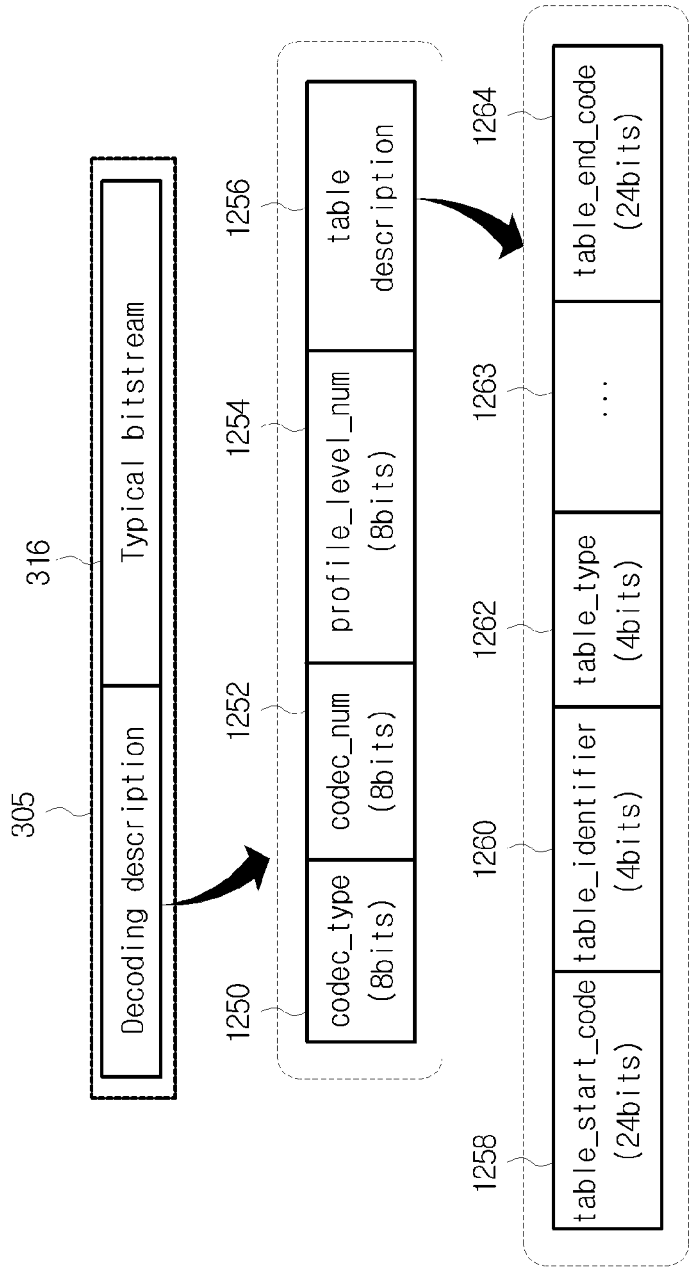
FIG. 14 shows the structure of an extended bitstream in accordance with a sixth embodiment of the present invention.
Figure 15:
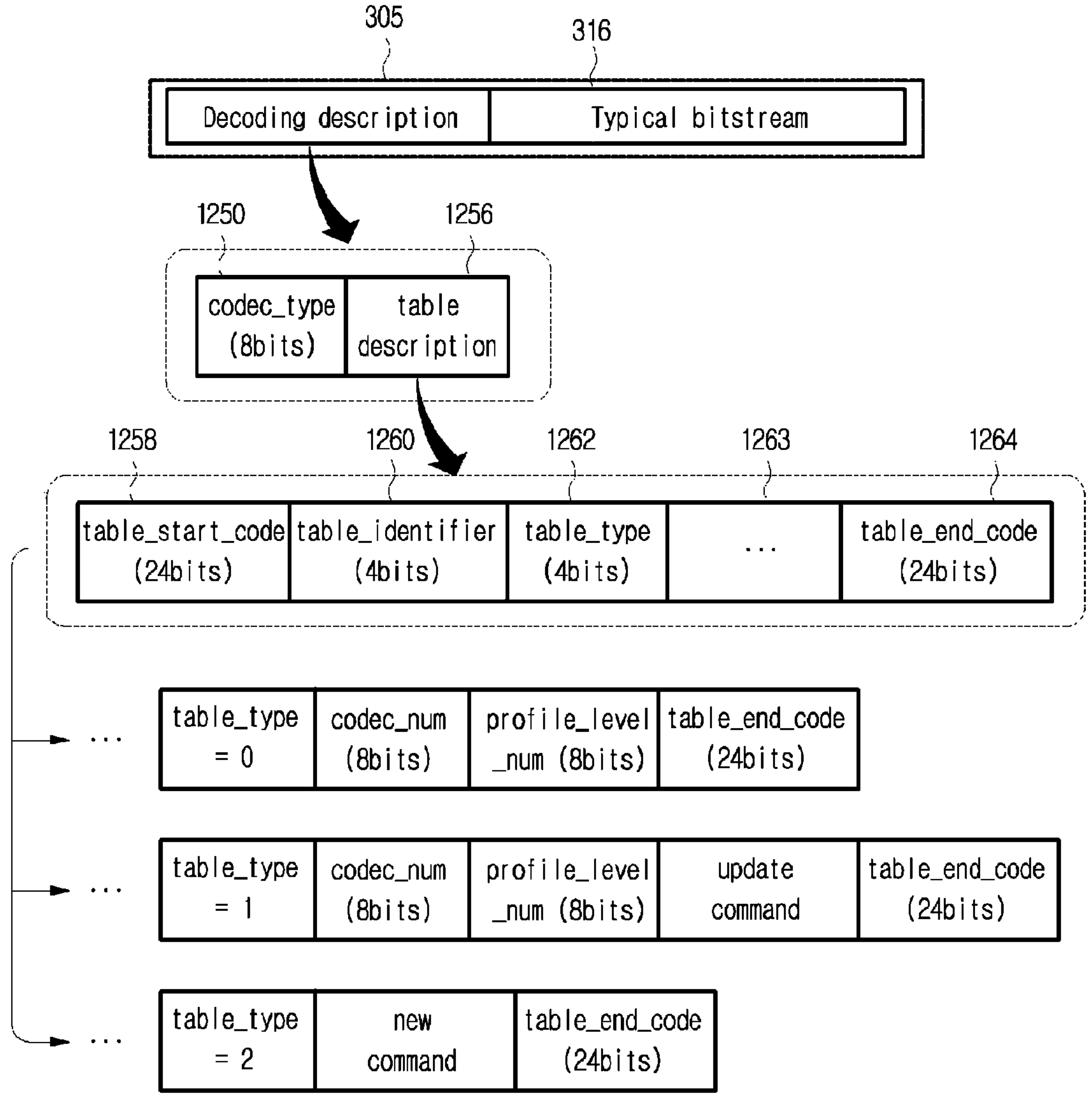
FIG. 15 shows the structure of an extended bitstream in accordance with a seventh embodiment of the present invention.
Figure 16:
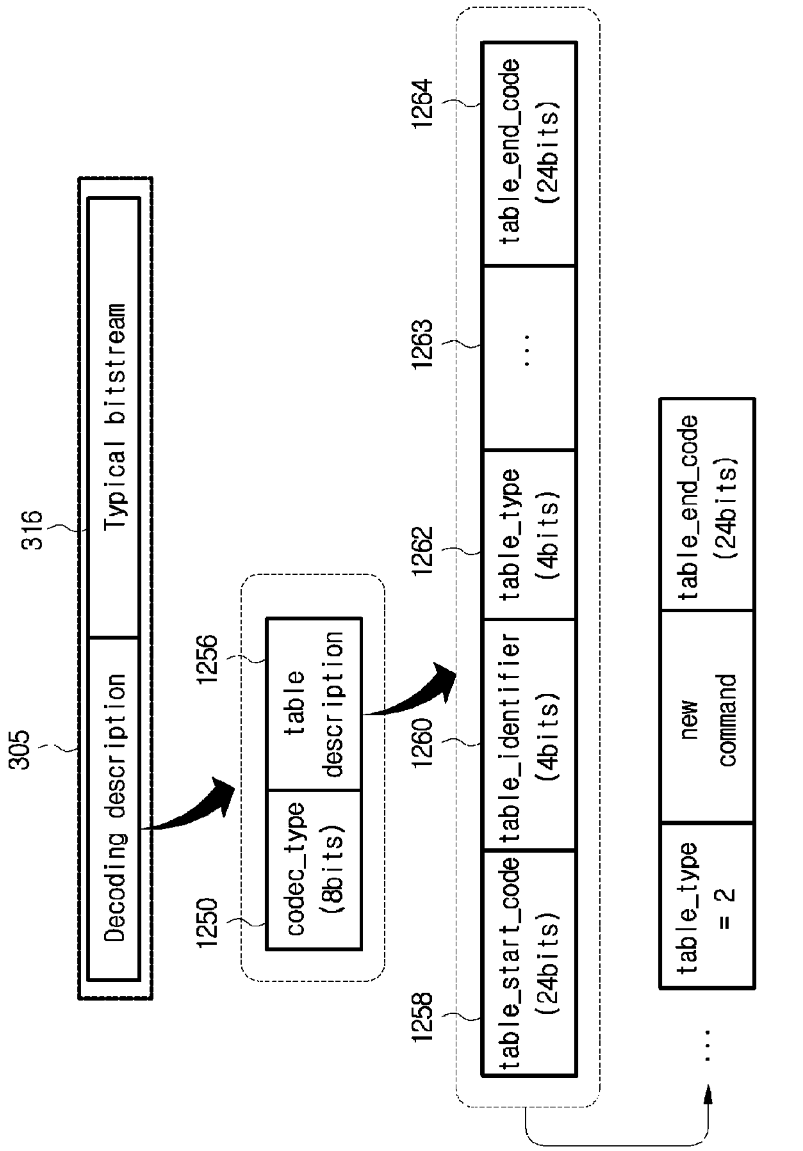
FIG. 16 shows the structure of an extended bitstream in accordance with an eighth embodiment of the present invention.

FIG. 13 shows the structure of an extended bitstream in accordance with a fifth embodiment of the present invention, and FIG. 14 shows the structure of an extended bitstream in accordance with a sixth embodiment of the present invention. FIG. 15 shows the structure of an extended bitstream in accordance with a seventh embodiment of the present invention, and FIG. 16 shows the structure of an extended bitstream in accordance with an eighth embodiment of the present invention.

The extended bitstream 305 of the present invention includes a decoder description (DD) area and the typical bitstream 316. It is evident to those of ordinary skill in the art that the typical bitstream 316 is formed to include coded video data (and/or coded audio data).

Here, the DD area can be formed in different structures according to the codec properties to be applied to decode the typical bitstream 316. In other words, firstly, in the case of using one standardized codec, a first decoder description structure can be applied.

Secondly, in the case of changing some contents of one conventional standardized codec (i.e. using some of the 7 aforementioned partial decoder descriptions as they are and modifying and using the other partial decoder descriptions), a second decoder description structure can be applied.

Thirdly, in the case of processing and using a plurality of conventional standardized partial decoder descriptions (i.e. selectively using the conventional standardized partial decoder descriptions for some of the 7 aforementioned partial decoder descriptions and modifying and using the other partial decoder descriptions), a third decoder description structure can be applied.

Finally, in the case of using a new codec that is not conventionally standardized (including and transmitting all 7 aforementioned partial decoder descriptions formed to include new contents), a fourth decoder description structure can be applied.

The 4 aforementioned structures of the decoder descriptions can be classified as different codec type information, respectively. For example, the first decoder description structure is set as "codec_type=0". The second decoder description structure is set as "codec_type=1". The third decoder description structure is set as "codec_type=2". The fourth decoder description structure is set as "codec_type=3".

FIG. 13 shows a first decoder description structure.

In accordance with the first decoder description structure shown in FIG. 13, the decoder description area can include a codec type 1250, a codec number 1252 and a profile and level number 1254. In other words, in accordance with the first decoder description structure, the decoder description area is described based on only information related to the codec to be applied. Although the drawings assume that each field is 8 bits, it shall be obvious that the size of each field can be adjusted depending on the magnitude of information to be represented.

The codec type 1250 will be set as zero (i.e. codec_type=0). This shows the case of using one of various conventional standardized codecs as it is.

FIG. 14 shows a second decoder description structure.

In accordance with the second decoder description structure shown in FIG. 14, the decoder description area can include a; codec type 1250, a codec number 1252, a profile and level number 1254 and a table description 1256. In other words, in accordance with the second decoder description structure, the decoder description area is described based on information related to the codec to be applied and modified contents of 7 partial decoder descriptions. Here, the table descriptions are individually equipped for the 7 partial decoder descriptions, respectively. In other words, there can be 7 table descriptions in the decoder description area.

Each table description 1256, as shown in FIG. 14, can include a table start code 1258, a table identifier 1260, a table type 1262, a content 1263 and a table end code 1264. Of course, the size of each field can be increased or decreased as necessary. Moreover, as described below, the content 1263 can be omitted or included according to the information of the table type 1262.

For example, if the table type 1262 has the value of zero, the table descriptions 1256 can be recognized so as to be applied without modification of an existing partial decoder description (i.e. a partial decoder description recognized by the codec type 1250, the codec number 1252, the profile and level number 1254 and the table identifier 1260). In this case, the content 1263 can be omitted.

However, if the value of the table type 1262 is 1, the table description 1256 can be recognized so as to partially modify (i.e. modify to the contents defined in the contents 1263) and use an existing partial decoder description (i.e. a partial decoder description recognized by the codec type 1250, the codec number 1252, the profile and level number 1254 and the table identifier 1260). In this case, the changed content (e.g. an update command) can be described in the content 1263. For example, the modified content (e.g. the update command) can be the information including commands such as update, insert, and/or delete and modifying the contents of the index corresponding to the pertinent partial decoder description.

However, if the value of the table type 1262 is 2, the table description 1256 can be recognized so as to completely modify (i.e. modify to the contents defined in the contents 1263) and use an existing partial decoder description (i.e. a partial decoder description recognized by the codec type 1250, the codec number 1252, the profile and level number 1254 and the table identifier 1260). In this case, the modified contents (e.g. contents for newly defining the pertinent partial decoder description such as a new command) can be described in the content 1263.

FIG. 15 shows a third decoder description structure.

In accordance with the third decoder description structure shown in FIG. 15, the decoder description area can include a codec type 1250 and a table description 1256. In other words, in accordance with the third decoder description structure, the decoder description area is described based on the information related to the codec to be applied and the modified contents of the 7 partial decoder descriptions. Here, the table descriptions are individually equipped in the 7 partial decoder descriptions, respectively. In other words, there can be 7 table descriptions in the decoder description area.

Each table description 1256, as shown in FIG. 15, can include the table start code 1258, the table identifier 1260, the table type 1262, the content 1263 and the table end code 1264. Of course, the size of each field can be increased or decreased as necessary.

For example, if the value of the table type 1262 is zero, the table description 1256 can be recognized so as to be applied without modification of an existing partial decoder description (i.e. a partial decoder description recognized by the codec number 1252, the profile and level number 1254 and the table identifier 1260). In this case, there are described the codec number 1252 and the profile and level number 1254, corresponding to the partial decoder description to be applied to fields of the content 1263.

However, if the value of the table type 1262 is 1, the table description 1256 can be recognized so as to partially modify (i.e. modify to the contents defined in the modified contents 1266) and use an existing partial decoder description (i.e. a partial decoder description recognized by the codec number 1252, the profile and level number 1254 and the table identifier 1260). In this case, the modified content (e.g. update command) can be described in the content 1263, and the modified contents (e.g. the update command) can be described in a field of the modified contents 1266.

However, if the value of the table type 1262 is 2, the table description 1256 can be recognized so as to completely modify (i.e. modify to the contents defined in the field of the content 1263) and use an existing partial decoder description (i.e. a partial decoder description recognized by the codec type 1250, the codec number 1252, the profile and level number 1254 and the table identifier 1260). In this case, the modified content (e.g. content for newly defining the pertinent table such as a new command) can be described in the content 1263. In other words, as described above, if the table type 1262 is zero or 1, a specific codec is used as it is or some partial decoder descriptions are modified and used. Accordingly, the information related to the codec (i.e. the codec number 1252 and the profile and level number 1254) is required. If the table type 1262 is 2, completely new partial decoder description information is defined. Accordingly, the additional codec information is not necessary.

FIG. 16 shows a fourth decoder description structure.

In accordance with the fourth decoder description structure shown in FIG. 16, the decoder description area can include the codec type 1250 and the table description 1256. In other words, in accordance with the fourth decoder description structure, the decoder description area is described based on the 7 partial decoder descriptions. The table descriptions are individually equipped in the 7 partial decoder descriptions, respectively.

Each table description 1256, as shown in FIG. 16, can include the table start code 1258, the table identifier 1260, the table type 1262, the content 1263 and the table end code 1264. Of course, the size of each field can be increased or decreased as necessary.

For example, if the value of the table type 1262 is a predetermined value (e.g. 2), the information for describing a new table corresponding to the table identifier 1260 (e.g. contents for newly defining the pertinent partial decoder description such as the new command) is displayed in the field of the content 1263. As described above, in case that the codec type 1250 is 3, it is recognized that the decoding is performed by using new partial decoder descriptions. Accordingly, one table type 1262 can be designated or the table type 1262 can be omitted.

Hereinafter, the syntax structure of the decoder description area and the syntax structure of each field are shown in each table below.

TABLE 5

Decoder Description

| Decoder_Description( ) { | No. of bits |
|---|---|
| codec_type | 8 |
| if ((codec_type==0x00) || (codec_type==0x01)) { | |
| Codec_Description( ) | |
| } | |
| if (codec_type!=0x00) { | |
| do { | |
| Table_Description( ) | |
| } while (next_bits( )==table_idetifier) | |
| } | |
| } | |

TABLE 6

Codec Description

| Codec_Description( ) { | No. of bits |
|---|---|
| codec_num | 8 |
| profile_level_num | 8 |
| } | |

TABLE 7

| Table Description | |
|---|---|
| Table_Description( ) { | No. of bits |
| table_start_code | 24 |
| table_identifier | 4 |
| table_type | 4 |
| if ((table_type ==‘0000’) \|\| (table_type ==‘0001’)) { | |
| if (codec_type==0x02) | |
| Codec_Description( ) | |
| if (table_type ==‘0001’) | |
| Update_Description( ) | |
| } | |
| if (table_type ==‘0010’) { | |
| New_Description( ) | |
| } | |
| table_end_code | 24 |
| } | |

TABLE 8

| Update Description | | |
|---|---|---|
| Update_Description( ) { | No. of bits | Mnemonic |
| Update_Command | | vlclbf |
| } | | |

TABLE 9

| New Description | | |
|---|---|---|
| New_Description( ) { | No. of bits | Mnemonic |
| New_Command | | vlclbf |
| } | | |

Hereinafter, the semantics of the decoder description are described in each table below.

TABLE 10

| Decoder Description | |
|---|---|
| codec_type | Meaning |
| 0x00 | A profile@level of an existing MPEG standard |
| 0x01 | Some parts of the existing one profile@level changed |
| 0x02 | Some parts of the existing multiple profile@level changed |
| 0x03 | A new decoding solution |
| 0x04-0xFF | RESERVED |

Here, the codec type, which is an 8 bit code, can be information for identifying the codec type.

TABLE 11

| Codec Description | |
|---|---|
| codec_num | MPEG standards and others |
| 01 | MPEG-1 |
| 02 | MPEG-2 |
| 03 | MPEG-4 Part 2 |
| 04 | MPEG-4 Part 10 (AVC) |
| 05-FF | RESERVED |

Here, the codec type, which is an 8 bit code, can be information for indicating the code of a used codec code. The profile and level number, which is an 8 bit code, can be also information for directing to the number of the profile and level for the codec. The profile and level number can be identical to that of the standard of each MPEG standard.

TABLE 12

| Table Description (Table identifier) | |
|---|---|
| table_identifier | table name |
| 0000 | SET (Syntax Element Table) |
| 0001 | S-RT (Syntax Rule Table) |
| 0010 | CSCIT (CSCI Table) |
| 0011 | DVT (Default Value Table) |
| 0100 | FL (FU List) |
| 0101 | F-RT (FU Rule Table) |
| 0110 | FU-CSCIT (FU CSCI Table) |
| 0111-1111 | RESERVED |

Here, the table start code can be 0xFFFFFE of hexadecimal 26-bit text strings, which refers to the start of the table description. The table identifier can be a 4 bit code as shown in the table 12 above.

TABLE 13

| Table Description (Table type) | |
|---|---|
| table_type | Meaning |
| 0000 | conventional table |
| 0001 | updated table |
| 0010 | new table |
| 0011-1111 | RESERVED |

Here, the codec type, which is a 4 bit code, can be information for determining whether to maintain an existing partial decoder description, to update the existing partial decoder description or to generate a new partial decoder description. The table end code can be 0xFFFFFE of hexadecimal 26-bit text strings, which refers to the end of the table description.

TABLE 14

| Ordering set for update_command | | |
|---|---|---|
| Code | Instruction | Usage |
| 00 | UPDATE | UPDATE [index#] in [table#] [a record]; |
| 01 | INSERT | INSERT into [table#] [a record]; |
| 10 | DELETE | DELETE [index#] from [table#]; |
| 11 | RESERVED | |

Here, index# can be a 4-bit string directing to the index number of a partial decoder description, and table# can be a 32-bit string as the table identifier.

TABLE 15

| Ordering set for new_command | | |
|---|---|---|
| Code | Instruction | Usage |
| 00000001 | READ | READ bits B > CSCI; |
| 00000010 | SEEK | SEEK bits B > CSCI; |
| 00000011 | FLUSH | FLUSH bits B; |
| 00000100 | IF | IF (condition) { ~ } ELSE { ~ } |
| 00000101 | WHILE | WHILE (condition) { ~ } |
| 00000110 | UNTIL | UNTIL (condition) { ~ } |
| 00000111~0 | DO~WHILE | DO { ~ } WHILE (condition) |
| 00000111~1 | DO~UNTIL | DO { ~ } UNTIL (condition) |
| 00001000 | (~) (compute) | ( ......... ) |
| 00001001 | BREAK | BREAK; |

TABLE 15-continued

| Ordering set for new_command | | |
|---|---|---|
| Code | Instruction | Usage |
| 00001010 | SET | SET CSCI, CSCI; |
| 00001011 | STOP | STOP; |
| 00001100 | PUSH | PUSH CSCI Value, Value ; |
| 00001101 | RLD | RLD index, level, run, islastrun, t#; |
| 00010010 | VLD2 | VLD2 [T#] in > v1, v2, v3; |
| 00010100 | VLD4 | VLD4 [T#] > CSCI; |

Here, "bits" is any one of 3 through 34 bits for indicating the number of the requested bits, and "B" is a 1-bit string indicating a byte alignment. ">" is a 1-bit string for printing left output, and VLD2(for MPEG-2) and VLD4(for MPEG-4) are functions for entropy coding.

Figure 17:
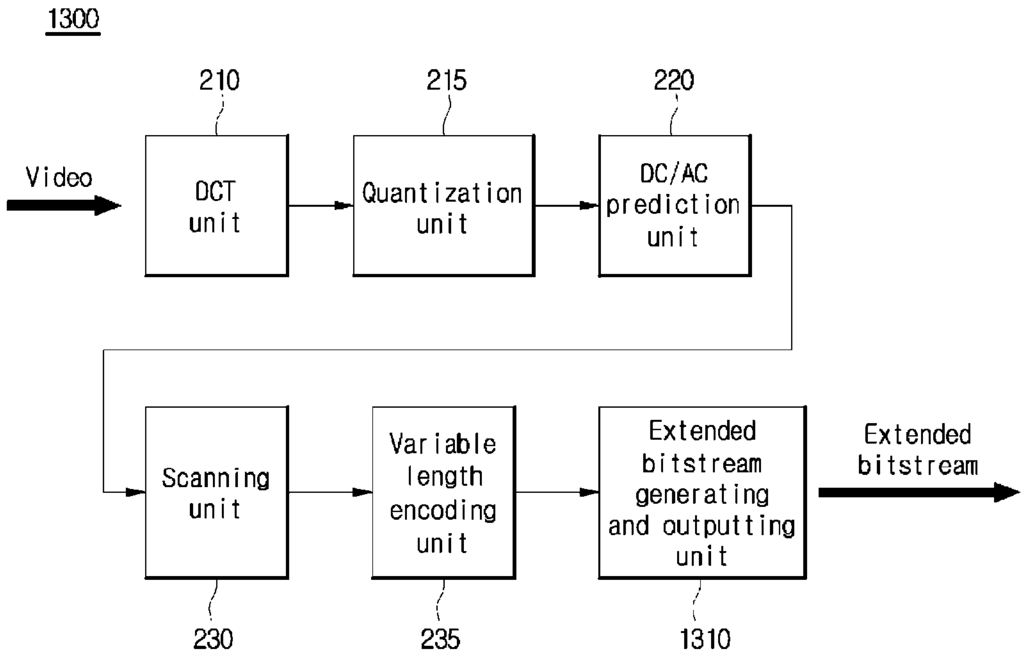
FIG. 17 is a block diagram showing an encoder in accordance with an embodiment of the present invention.

FIG. 17 is a block diagram showing an encoder in accordance with an embodiment of the present invention.

The encoder 1300 of the present invention further includes an extended bitstream generating and outputting unit 1310 as compared with the conventional encoder 200 described below with reference to FIG. 2. The extended bitstream generating and outputting unit 1310 generates a decoder description by using control information (e.g. a list and the connection of the used functional units, the input data of the pertinent functional units, the syntax information and the syntax connection information) in the generating operation of the typical bitstream 316 generated by the processing of the prior operation. The extended bitstream 305 is also generated by using the generated decoder description and the typical bitstream 316 to be transmitted to the decoder 300. Since the method of generating the decoder description is understood enough by any person of ordinary skill in the art with only aforementioned explanation, the pertinent description will be omitted.

The variable length encoding unit 235 of the present invention merely points to an element for finally performing the encoding to generate the typical bitstream 316 in an encoder 1300, but not limited to this embodiment of the present invention. This is not caused to restrict the scope of claims of the present invention.

FIG. 17 assumes the case of providing the extended bitstream 305, generated by using decoder description information and the typical bitstream 305, to the decoder.

However, as described above, the decoder description can be transferred in a form of separate data or bitstream to the decoder 300. In this case, it shall be obvious that the extended bitstream generating and outputting 1310 is not placed behind the variable length encoding unit 235, but a decoder description generating and outputting unit is provided independently of the conventional encoding unit, so as to provide independently generated information to the decoder 300.

Although the above description related to a unified codec device and a method thereof in accordance with the present invention has been described based on a decoder, the mutual relationship between a decoder and an encoder is evident to any person of ordinary skill in the art, and considering that the encoder can be easily formed through the detailed description related to the decoder only, it shall be obvious that the present invention is not limited to the decoder.

As described above, the unified codec device and the method thereof in accordance with the present invention make it easy to analyze a syntax element and control the connection of functional units in one standard (or codec) or between standards (or codecs). In other words, it is no problem to change the order of syntax elements in the bitstream generated according to a specific standard, to add a new syntax element or to delete the existing syntax element.

In accordance with the conventional art, the decoder was unable to properly decode the pertinent bitstream in the manipulation of the syntax element. For example, if the bitstream of ABC is changed to ACB before being transmitted, the decoder is unable to recognize the bitstream of ACB, to thereby making it impossible to properly decode the bitstream of ACB. Similarly, in the case of adding F and forming ABFC or deleting B and forming AC, the proper decoding is impossible.

However, according to the unified codec device and the method thereof in accordance with the present invention, since the decoder description information is provided in a form of being included in the extended bitstream or as separate data, the decoding operation of the decoder 300 can be smoothly performed.

It shall be obvious that although the above description related to a unified codec device and a method thereof in accordance with the present invention have been based on MPEG-4 AVC, MPEG-1, MPEG-2 and MPEG-4, other video encoding/decoding standards can be applied without any restriction.

Moreover, it shall be obvious that information included in each partial decoder description can be described by using not only information related to the connection of functional units for performing the decoding by one standard and information related to the processing operation required for the pertinent functional unit but also information for performing the decoding by a plurality of standards.

For example, it is assumed that a plurality of initial frames of encoded video data included in the extended bitstream are encoded by using MPEG-2, a plurality of following frames are encoded by using MPEG-4 and the other frames are encoded by using MPEG-1. In this case, it shall be obvious that partial decoder description information included in the decoder description for decoding the encoded video data will be realized such that the functional units according to each standard included in the toolbox 510 can be organically coupled and operated, in order that each frame having different encoding methods can be decoded.

Hereinafter, a compact decoder description language (CDDL) representing a method supporting a network language (NL) environment will be described in accordance with yet another embodiment of the present invention. The terms used for describing this embodiment will be defined as follows.

Firstly, the network language (NL), which is one of computer languages, is basic information necessary for forming a network between functional units in the decoder forming unit 520. The network language is also a reference language being used for forming a network in the current MPEG.

A CDDL, which refers to basic information for forming a decoder that decodes a bitstream in the decoder forming unit 520, can describe information related to all parts of the decoder, such as a syntax parsing and a network between functional units.

An abstract decoder model (ADM) refers to information (or a storing unit) necessary for forming a decoder, before the decoder is formed. Here, each information can be a partial decoder description or information formed by processing a pertinent decoder description. In this description, an element represented as the decoder forming unit 520 can be the ADM.

Finally, a network refers to a connection between functional units. It is possible to determine a network (i.e. the connection between functional units in a hierarchy) of each hierarchy to which the functional units individually pertain to perform the processing per hierarchic structure or the connection between networks in upper and lower hierarchic structures or between a functional unit and a lower network. In other words, the network can be defined as at least one of the connections between functional units, between a functional unit and a lower hierarchic network, and between an upper hierarchic network and a lower hierarchic network.

In order to complete one network, data such as input data which is inputted through at least one input port to the network, output data, which is outputted through the network, a parent network, to which the network pertains, a parameter, which the network declares, a parameter, which goes into the network, are required.

At least one name of input port and at least one name of output port can be described in a virtual network table (VNT) in order to designate input data or a corresponding port, inputted into the network, among the aforementioned data. The parent network, to which the network pertains, can be described in a functional unit instance table (FUIT) when the network is created, and a field describing a parent index is included. This can show how networks are included. The parameter which the network declares can also refer to a parameter table (PT). The PT includes a VNT index. When a functional unit is generated, it is possible to determine which parameters are generated in the pertinent network with reference to the VNT index of the PT. In the case of inheriting a parameter value through the parent network to use by referring to the PT index declared in the FUIT. Each network can be connected to each other through a network connection table (NCT) to receive and transmit described data from and to each other.

As described below, a purpose of this embodiment can be to show a method of representing a CDDL, so as to be compatible with a network language that can form an abstract decoder model (ADM) in the MPEG RVC standardization technology. The method of representing the CDDL can be represented so as to be compatible with contents capable of being described by using the network language by partially correcting the contents and/or format of the partial decoder description described in the aforementioned relevant embodiment of the present invention. Moreover, another purpose of this embodiment is to maximize the compression efficiency by representing the structure of an ADM by use of the CDDL and compressing it in a binary code.

In the foresaid embodiment, a network, which is a set of functional units, is regulated by the partial decoder descriptions such as an FRT, an FU-CSCIT, and an FLT.

The operation of decoding bitstream data by using a pertinent decoder description can be successively performed. However, it may be not sufficient to form an ADM. This is because a network structure (i.e., a hierarchical connection structure) should be possible in order to form the ADM, and each network and functional unit can be more efficient by having an input port and an output port.

Here, a port can be defined as parts of transmitting and receiving data in connection structures between functional units, between a functional unit and a network, and between upper and lower networks. In particular, the network language forms the ADM by using a control method according to data flow. Accordingly, in a network, a part for transmitting data is referred to as an output port, and a part for receiving data is referred to as an input port. The connection structure is described so as to allow data to be transmitted between networks or functional units in a network connection table (NCT). A port is necessary to form the connection structure between the networks. The port can be realized as a physical port according to realizing methods. The NCT describes which functional unit uses outputted data as an input value.

Yet another embodiment of the present invention attempts to modify and complement partial decoder descriptions of a CDDL corresponding to a network, which is a set of function units, so as to be compatible with ADM configuration information. There are 4 partial decoder descriptions of the CDDL that are modified to describe the network. The partial decoder descriptions can be a virtual network table (VNT), a functional unit instance table (FUIT), a network connection table (NCT), and a parameter table (PT). In other words, the new partial decoder descriptions such as the VNT, the FUIT, the NCT, and the PT replace the aforementioned FRT, FLT, and the FU-CSCIT. On the other hand, the SET, the SRT, and the CSCIT used for the syntax parsing have their inner roles, in which there is a little modification to acquire compatibility. The overall forms of the SET, the SRT, and the CSCIT, however, can be similar to what is described above. It shall be evident to any person of ordinary skill in the art that, even though the format and contents of the partial decoder descriptions are different from those of the aforementioned embodiment, an encoder can perform the corresponding processing without additional explanation. Moreover, although partial decoder descriptions forming a decoder description are partially modified, the forming format of the decoder description can be applied as described above. The pertinent description will be omitted.

Hereinafter, each of the newly replaced partial decoder descriptions will be described.

A virtual network table (VNT) refers to a partial decoder description describing information corresponding to a basic template. There is a possibility that networks, which are function unit sets, have the same structures and input data is not identical to output data. As such, a form that makes necessary objects based on the template after forming a basic template object is formed in order to efficiently realize a plurality of objects having the same structures but different inputs and outputs.

The VNT can be described in the form of "((FUID), INPUT PORTs, OUTPUT PORTs)." Here, when an actual functional unit is included in the toolbox 515, instead of the network, the FUID, which is an ID of the pertinent functional unit, refers to an inherent ID for calling a pertinent functional unit in a toolbox. There may be one or more input port(s) and one or more output port(s).

The VNT deals with both functional units, which are actually included in the toolbox and networks, which are considered as visual functional units. Since the network forming the connection structure of functional units has both an input port and an output port like functional units and provides connection information to each functional unit, the functional units that are not actually included in the toolbox can be considered as the virtual functional units. However, the virtual functional units that are not included in the toolbox and dynamically generated have no FUID, and no FUID will be described in the VNT. Unlike functional units of the toolbox, at least two different networks have the same structures and functions. In order to efficiently describe the two different networks, at least two networks can be generated by storing a commonly describable part in the VNT and having different input values. For example, a network of DC_Reconstruction_8×8 can describe the connection structure of MPEG4_algo_DCRaddressing_8×8 and MPEG4_algo_DCRinvpred_chroma_8×8. Here, both MPEG4_algo_DCRaddressing_8×8 and MPEG4_algo_DCRinvpred_chroma_8×8 can be functional units that are actually included in the toolbox.

Below is an example of realizing the VNT.

```
    VNT (Virtual Network Table)
    {
    //Decoder
    ("BITS", "VID"),
    //Parser
    (1, "BITS", {"BTYPE_Y", "BTYPE_U", "BTYPE_V",
"MV_Y", "MV_U", "MV_V", "B_Y", "B_U", "B_V"}),
    }
```

("BITS", "VID") of a decoder part shows that an input of an input port is BITS and an output of an output port is VID. (1, "BITS", {"BTYPE_Y", "BTYPE_U", "BTYPE_V", "MV_Y", "MV_U", "MV_V", "B_Y", "B_U", "B_V"}) of a parser part indicates FU ID #1 in the toolbox, and "BITS" shows that an input of an input port is BITS and there are 9 output ports of {"BTYPE_Y", "BTYPE_U", "BTYPE_V", "MV_Y", "MV_U", "MV_V", "B_Y", "B_U", "B_V"}.

Next, a functional unit instance table (FUIT) will be described. The FUIT stores main information for generating objects that are used as actually required networks based on a basic template, VNT information. The actually required networks can be represented by using an instance derived from the basic template. In other words, when the information for generating the networks is described, since there are networks having similar structures, some information may be overlapped. For example, if the networks for obtaining motion vectors are divided into two groups according to whether the networks are Luma blocks or Chroma blocks, the methods of computing motion vectors are the same but only the sizes of variables actually storing the block sizes are different. Accordingly, the present invention suggests the method of storing common information in the VNT and branching into other networks in the FUIT. For this, the concept of the instance and the template is applied. Moreover, the common information can be considered "templates" that can be formed in various ways. This model can be used to generate various forms of instance networks.

The FUIT can be described in the form of "(VNT Index, Parent VNT Index, Parameter Indexes)". Basic template information for forming an instance of an actually required network is brought through the VNT Index. The Parent VNT Index indicates which upper template network uses the current instance. The Parameter Indexes include an index of a parameter table (PT) having information related to parameters being used in each network. The Parameter Indexes are formed to include at least one index. When an instance is generated, an initial value of a parameter can be inputted. The sign of colon (:) can be used for distinguishment.

Below is an example of realizing the FUIT.

```
{
//decoder
(1, -, -)
(2, 1, {6, 7, 1, 8, 9, 10, 11, 12, 13, 14, 15, 20, 19, 17, 18, 5}),
(3, 1, {1, 8, 9, 7, 10, 11, 12, 13, 17, 18, 21}),
(4, 1, {1, 8, 9, 7, 10, 11, 12, 13, 17, 18, 21}),
(4, 1, {1, 8, 9, 7, 10, 11, 12, 13, 17, 18, 21}),
(5, 1, {22:3, 2, 1, 3, 5, 4, 8, 9, 10, 11, 12, 18, 14, 20, 23:1}),
(5, 1, {22:3, 2, 1, 3, 5, 4, 8, 9, 10, 11, 12, 18, 14, 20, 23:0}),
(5, 1, {22:3, 2, 1, 3, 5, 4, 8, 9, 10, 11, 12, 18, 14, 20, 23:0}),
(6, 1, 4),
//~decoder
//texture__16x16
(7, 3, 7),
```

-continued

```
(8, 3, {24:1024, 1, 8, 9, 7, 10, 11, 12, 13, 18, 17, 21}),
(9, 3, 7),
(10, 3, {1, 8, 7}),
(11, 3, {7, 21}),
(12, 3, -),
//~texture__16x16
//texture__8x8
(7, 4, 7),
(8, 4, {24:1024, 1, 8, 9, 7, 10, 11, 12, 13, 18, 17, 21}),
(9, 4, 7),
(10, 4, {1, 8, 7}),
(11, 4, {7, 21}),
(12, 4, -)
```

In the example of realizing the FUIT, "(2, 1, {6, 7, 1, 8, 9, 10, 11, 12, 13, 14, 15, 20, 19, 17, 18, 5})," refers to a network formed by using information of a VNT #2 index and a sub-network of a network formed by using information of a VNT #1 index. The numbers of the brace { } are indexes of a PT. This network brings predetermined parameters (i.e. 16 described parameters) from the PT to use. In other words, the VNT index is an index for bringing information necessary for generating the current network, and the Parent VNT index is an index for reporting which network has a network to be generated. The parameter indexes are described by using an index of a variable of a parameter defined in the PT.

Moreover, like "(5, 1, {22:3, 2, 1, 3, 5, 4, 8, 9, 10, 11, 12, 18, 14, 20, 23:1}), (5, 1, {22:3, 2, 1, 3, 5, 4, 8, 9, 10, 11, 12, 18, 14, 20, 23:0}), and (5, 1, {22:3, 2, 1, 3, 5, 4, 8, 9, 10, 11, 12, 18, 14, 20, 23:0})," 3 networks can be formed by using one template information. 23:1 and 23:0 are initial values of parameter determined when a network is generated, and a second example and a third example show that the same information of the FUIT is completely identical. Even though one network (chroma) for computing a motion vector is formed according to the design method, the network can be divided into two networks to simultaneously process two block values.

Thereafter, a network connection table (NCT) will be described. The NCT has information related to a port capable of functioning as a path through which data can be transmitted between the networks. Inherent names can be allotted to an input port and an output port that perform the input and the output, respectively. When data is transmitted between the networks, data can be transmitted by placing a buffer in each port and duplicating contents of an input buffer in an output buffer.

The NCT can be described in the form of "(Src FUIT Index, Dst FUIT Index, Src Port, Dst Port)". A network, which is a function unit set, has the connection structure in which a plurality of instances transmit and receive data to and from each other. Accordingly, information related to how a network (or a network instance) is connected to another network (or another network instance) is needed. Thus, the NCT can include fields of Src FUIT Index, indicating the number of an original instance in which data starts, Dst FUIT Index, indicating the number of a destination instance in which data arrives, Src Port, indicating an output of the original instance, and Dst Port, indicating an input of the destination instance. The connection of ports can be necessarily made between two instances.

Below is an example of realizing NCT.

```
{
//decoder.nl
(-, 2, "BITS", "BITS"),
(2, 6, "MV_Y", "MV"),
(2, 6, "BTYPE_Y", "BTYPE"),
(2, 3, "BTYPE_Y", "QFS"),
(2, 3, "B_Y", "TEX"),
(3, 6, "f", "TEX"),
(2, 7, "MV_U", "MV")
}
```

As shown above, in a decoder, (–, 2, "BITS", "BITS") shows that an input source (–) represented in BITS is received, the destination is an index 2 of FUIT, and an input port, Dst Port, of an instance corresponding to the index 2 of FUIT is BITS. Here, the BITS is merely an example showing that a name is allotted to a port and the port is referred to through the name.

(2, 6, "MV_Y", "MV") shows that the FUIT of the original instance has an index of 2, the FUIT of the destination has an index of 6, an output, Src Port, of the original instance is defined as MV_Y, and an input, Dst Port, of the destination instance is defined as MV.

Next, a parameter table (PT) will be described. The parameter is not syntax generated from a bitstream but is used to generate necessary data when an operation of a functional unit is performed. Since the parameter is not syntax, the parameter is unable to be transferred through the port transmitting data. The parameter can be transferred from a network, which is a function unit set, to a subnetwork included in the network. Information related to the transferred parameter is described in the FUIT. The PT has generation information of each parameter.

The operation of transferring a parameter to a subnetwork will be briefly described as follows. A FUIT describes a VNT index of an upper network and indexes of used parameters. A parameter table describes the VNT index related to which network the pertinent parameter must be defined in. For example, if (1, "MAXW_IN_MB", 121) is described in the PT, it can be recognized that MAXW_IN_MB is a variable of a parameter defined in a network defined that is firstly defined in the VNT. The variable of the parameter can be used by the first network or its subnetwork. If an $N^{th}$ lower subnetwork attempts to use the variable, continual successive inheritance should be performed. For example, if it is assumed that a second network is a lower network of a first network, a third network is a lower network of the second network, and the third network must use MAXW_IN_MB, both of the second and third networks must bring the parameter index of MAXW_IN_MB when it is described by the FUIT.

The PT can be described in the form of "(VNT Index, Parameter Name, Initial Value)". Since a network instances derived from the basic template and having the same shapes use the same parameters, all of the parameters can be declared in the template. A name of parameter and an initial value are described as information of PT. However, since an initial value of parameter may be changed in each network instance, the FUIT describes information related to a parameter that is different from the initial value.

Below is an example of realizing the PT.

-continued

```
PT
{
//decoder
(1, "MAXW_IN_MB", 121),
(1, "MAXH_IN_MB", 69),
(1, "ADDR_SZ", 24),
(1, "PIX_SZ", 9)
(1, "MV_SZ", 9)
(1, "SAMPLE_COUNT_SZ", 8),
(1, "SAMPLE_SZ", 13),
(1, "MB_COORD_SZ", 8),
(1, "BTYPE_SZ", 12),
(1, "NEWVOP", 2048),
(1, "INTRA", 1024),
(1, "INTER", 512),
(1, "QUANT_MASK", 31),
(1, "ROUND_TYPE", 32),
(1, "FCODE_MASK", 448),
(1, "FCODE_SHIFT", 6)
}
```

As described above, "(1, "MAXW_IN_MB", 121)" shows that an index 1 of a VNT indicating basic template information is referred and MAXW_IN_MB used as a parameter has an initial value of 121.

Described below is yet another embodiment of a method of applying the method of describing an SET, an SRT, a DVT, and a CSCIT used to perform the syntax parsing of a bitstream by a decoder, unlike the above embodiments. In this case, it can be possible to use partial decoder descriptions of an FRT, an FU-CSCIT, and an FLT. Moreover, it can be possible to apply partial decoder descriptions of a VNT, an FUIT, an NCT, and a PT, which are described as yet another embodiment of the present invention. However, the case of applying the partial decoder descriptions of the VNT, the FUIT, the NCT and the PT will be described below for the convenience of understanding.

Figure 58:
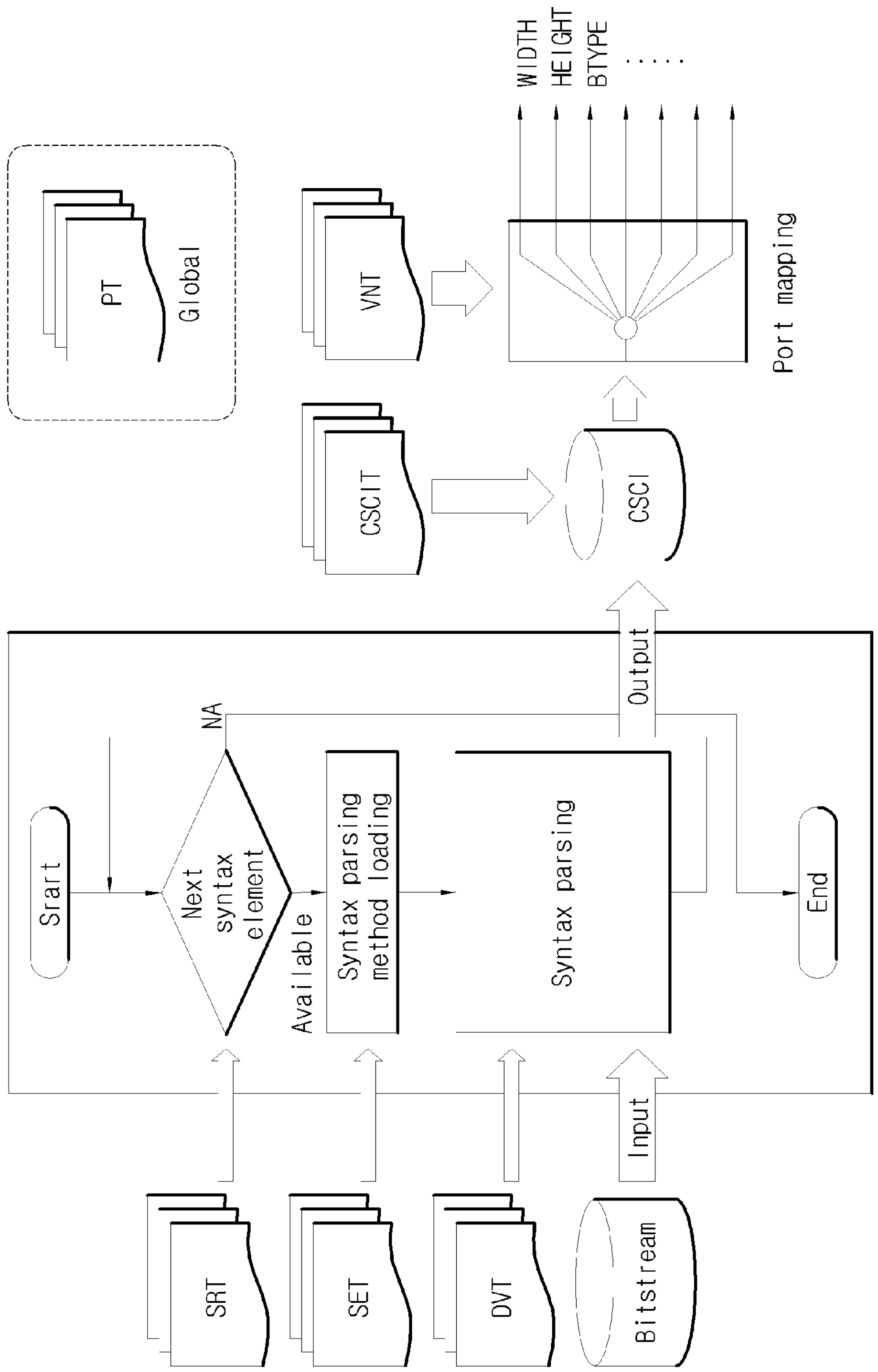
FIG. 58 is an example showing how syntax parsing is performed in accordance with yet another embodiment of the present invention.

FIG. 58 is an example showing how syntax parsing is performed in accordance with yet another embodiment of the present invention.

Referring to FIG. 58, a decoder uses the SET, the SRT, the DVT, and the CSCIT in order to perform the syntax parsing as described above. However, it can be possible to use port information described in the VNT to allow each functional unit and/or each network to use information extracted from a bitstream through the syntax parsing, and it can be possible to use the PT when basic information necessary for the operation of a syntax parser is transferred.

However, the following change occurs in a decoder description being used for the syntax parsing in this embodiment. That is, the flow of parsing can be described in more various ways such as a linear method or a hierarchic method by changing formats of the SRT and the SET. It can be possible to be universally applied to other entropy encoding methods (e.g. a context-adaptive variable length decoder (CAVLD) and an exponential golomb encoding) by changing a format of the DVT. An interface for transferring data stored in a CSCI to individual functional units through a network is also described.

Hereinafter, changes of each partial decoder description will be briefly described by comparing with the embodiments (i.e. the aforementioned CDDL) described with reference to FIG. 1 through FIG. 57.

Firstly, a change of the SET will be described. In accordance with the above embodiments (i.e. the aforementioned CDDL) described with reference to FIG. 1 through FIG. 57, there is a case that a plurality of identical processing algorithms with little difference in detailed driving method are repeated. Accordingly, a parameter system is introduced to a format of the SET in accordance with this embodiment of the present invention. The parameter is provided as a factor value when a parsing process calls a parsing algorithm of the SET. This factor value can be an identifier of a buffer space (e.g. a CSCI memory) for storing a fixed constant, a value computed from a bitstream, or data deduced from the parsing process.

Moreover, it can be possible to further include new commands to change the SET, unlike the above embodiments of the present invention. For example, the new commands such as FOR and CONTINUE can be added to use a repeating statement more conveniently. A new command such as EX_Gol can be added for a more universally exponential golomb encoding. New commands such as VLD_A and VLD_B can be added for a more universal Huffman decoding VLD. If data is received from the PT, a new command such as GETP can be used. Finally, if data is transferred to the FU network through a port with reference to the VNT, a new command such as OUTPUT can be added.

For example, the SET can be represented by using such a command system as shown in the following table. Here, the field of "before" indicates the SET representing method according to the above embodiment of the present invention for comparison.

TABLE 16

<table>
<tr><th>Modified</th><th>Before</th></tr>
<tr><td></td><td>...</td></tr>
<tr><td></td><td>("READ 32 B;</td></tr>
<tr><td></td><td>(C0=(IBS==HEX:1B0));"),</td></tr>
<tr><td></td><td>("READ 8 > C2;"),</td></tr>
<tr><td>...</td><td>("READ 16 > C4;"),</td></tr>
<tr><td>("READ 32 B > V10;</td><td>("READ 32 > C32;"),</td></tr>
<tr><td>(P1=(V10==P2));"),</td><td>("VLD4 [0];"),</td></tr>
<tr><td>("READ P1 > P2;"),</td><td>("VLD4 [4] > V1;</td></tr>
<tr><td></td><td>IF ((C55==3) || (C55==4)) {</td></tr>
<tr><td>("VLD_A(V10, 0);"),</td><td>RLD INTRA V1,V2,V3,V4,T4;</td></tr>
<tr><td>("VLD_B(4,7,V2,8,V3,9,V4);"),</td><td>} ELSE {</td></tr>
<tr><td>...</td><td>RLD INTER V1,V2,V3,V4,T4;</td></tr>
<tr><td></td><td>}"),</td></tr>
<tr><td></td><td>...</td></tr>
</table>

Next, a change of the SRT will be described. In accordance with this embodiment of the present invention, the description structure of the SRT is changed such that the SRT can be represented in a hierarchic structure.

In other words, the existing CDDL uses the structure of an FSM to control a general parsing flow, based on a 'GO' command. According to the new method, however, the parsing structure can be more efficiently described by allowing the processing operations to be successively listed and the repeat and the branch to be processed by using a control statement, which is a more general method, such as IF and WHILE.

Moreover, when processing a parsing rule, the new SRT can use another parsing rule in a lower layer while a certain parsing rule is executed. Such a hierarchic call structure can be used to represent various hierarchic structures (e.g. a VO, a VOL, a GOP, a VOP, a Slice, an MB, and a Block) that can be applied in the statement parsing on a decoder description.

By these changes, the SRT can be represented as shown in the following table, for example. Here, the field of "before" indicates the SRT representing method according to the above embodiment of the present invention for comparison. As shown in the following table, while the SRT according to the aforementioned embodiment has the representing structure based on an FSM, the SRT according to this embodiment has a representing structure that is adequate for the hierarchic structure.

TABLE 17

| Modified | Before |
|---|---|
| ... | |
| ( | |
| S3(C0, 432); | ... |
| IF(C0!=1) ERR; | (0, "1: (C0==1) GO R1; 2: GO ERR;") |
| S0(8, C1); | (1, "1: GO R2;") |
| S4(V1); | (3, "1: 1: ([C2]==1) GO R3; 2: GO R5;;") |
| IF([C2]==1) { | (4, "1: GO R4;") |
| S6(C0); | (5, "1: GO R5;") |
| S7(C2); | ... |
| } | |
| ), | |
| ... | |

Next, a change of the CSCIT will be described. The CSCIT according to this embodiment allows some of a CSCI being stored in a multi-dimensional array to be more clearly represented such that it is possible to acquire a memory space more efficiently when a decoder sets a memory for the CSCI. The array dimension of the CSCI and a maximum array size per each dimension are described in the CSCIT in order to provide these functions.

By these changes, the CSCIT can be represented as shown in the following table, for example. Here, the field of "before" indicates the CSCIT representing method according to the above embodiment of the present invention for comparison.

TABLE 18

| Modified | Before |
|---|---|
| ... | ... |
| (integer, C50), | (array), |
| (integer, 6), | (array), |
| (integer, 6, 64), | (array), |
| (integer), | (integer), |
| ... | ... |

Next, a change of the DVT will be described. The DVT according to this embodiment separates a partial decoder description describing a coded bit represented on a bitstream from a partial decoder description describing an actual value represented by each symbol before describing them in order to support variable length decoding of more various types. In other words, the DVT can use two types of partial decoder descriptions.

By these changes, the DVT can be represented as shown in the following table, for example. Here, the field of "before" indicates the DVT representing method according to the above embodiment of the present invention for comparison

TABLE 19

| Modified | Before |
|---|---|
| | ... |
| | DVT { |
| ... | MPEG4 |
| { | ( |
| (1, {1, 001, 010, 011, 0001, | (0,1), (1,001), (2,010), (3,011), (4,0001), |
| 000001, 000010, 000011, | (5,000001), (6,000010), (7,000011), |
| 000000001}), | (8,000000001), (9,NULL) |
| (0, { ..., ... }, | ), |
| } | ( ..., ... ) |
| ... | } |
| | ... |
| | ... |
| ... | DVT { |
| { | MPEG2 |
| (0, {{9,10},{0,6},{7,2},...}), | ( (9, 10), (0, 6), (7, 2), ... ) |

TABLE 19-continued

| Modified | Before |
|---|---|
| (1, { ..., ... }), | ( ..., ... ) |
| } | } |
| ... | ... |

Described below is a method of forming a syntax parser according to a caltrop actor language (CAL) from the CDDL. The CAL refers to a process design language suggested by an EFPL.

It can be possible to make a syntax parser in a CAL programming language by using the CDDL. This making process can roughly use 6 partial decoder descriptions. A CAL parser is formed by using these partial decoder descriptions to form global variables, actions, and a finite state machine (FSM), which is an action control structure. The following table indicates functions corresponding to the partial decoder descriptions realized by the CDDL when the CAL parser is made.

TABLE 20

| CDDL | CAL | Purpose |
|---|---|---|
| SRT | Global variables, Actions, FSM | syntax parsing |
| SET | Global variables, Actions, FSM | syntax parsing and interface to FU network |
| CSCIT | Global variables | syntax parsing |
| DVT | Global variables | syntax parsing |
| VNT | Actions | Interface to FU network |
| PT | Actions | syntax parsing and interface to FU network |

Figure 59:
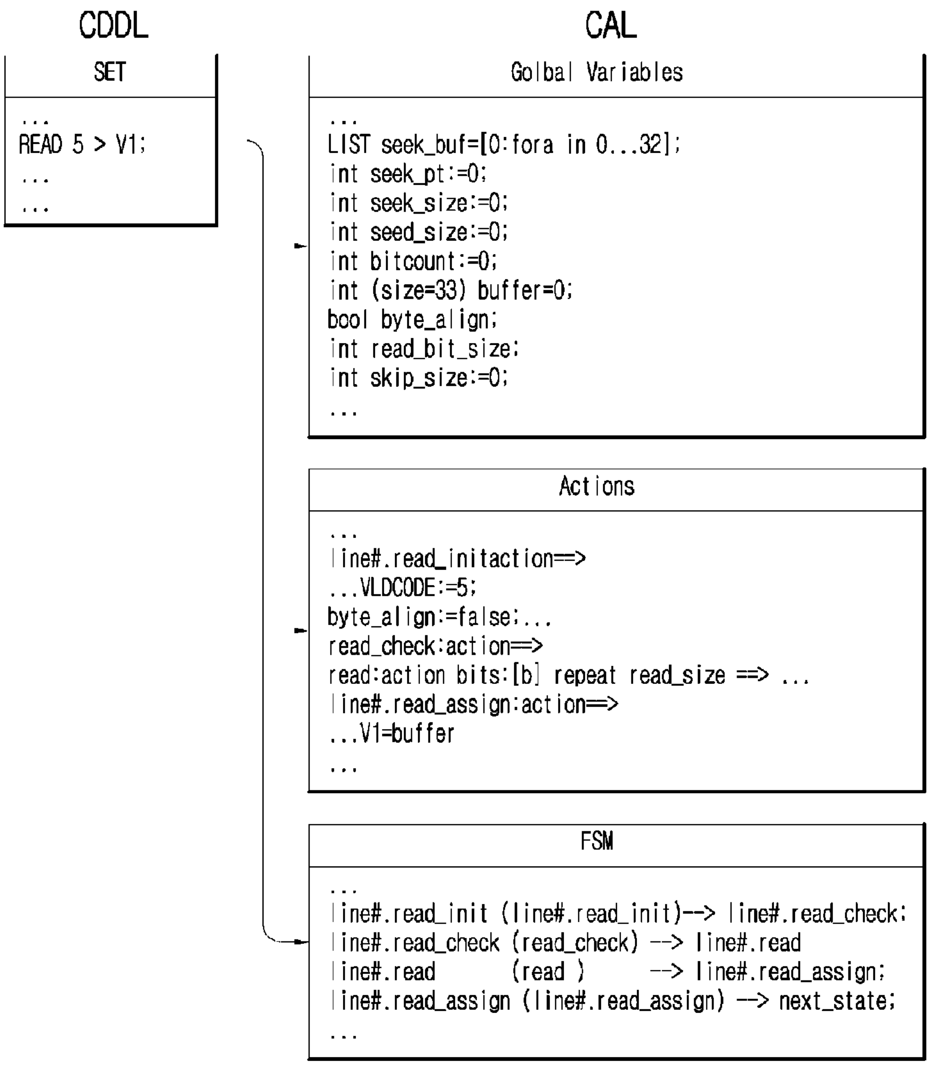
FIG. 59 is an example showing how a READ command among SETs is converted to a CAL in accordance with yet anther embodiment of the present invention.

FIG. 59 is an example showing how a READ command among SETs is converted to a CAL in accordance with yet anther embodiment of the present invention.

As shown in FIG. 59, in the case of an SET and an SRT among CDDL partial decoder descriptions, a parser is made by converting a particular command of the description or instruction to a CAL code corresponding to a CAL parser maker.

Figure 60:
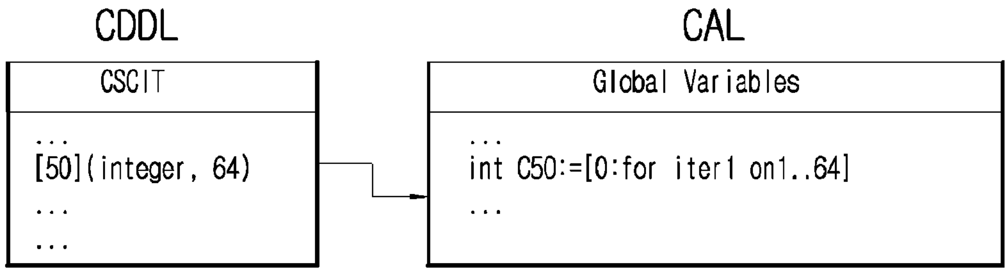
FIG. 60 is an example showing how a CSCIT is converted to a CAL in accordance with yet anther embodiment of the present invention.

FIG. 60 is an example showing how a CSCIT is converted to a CAL in accordance with yet anther embodiment of the present invention.

As shown in FIG. 60, in the case of the CSCIT and the DVT, a parser can be made more simply. In other words, the making process can be completed only by changing the description method of the CSCI to be adequate for the CAL rule.

Figure 61:
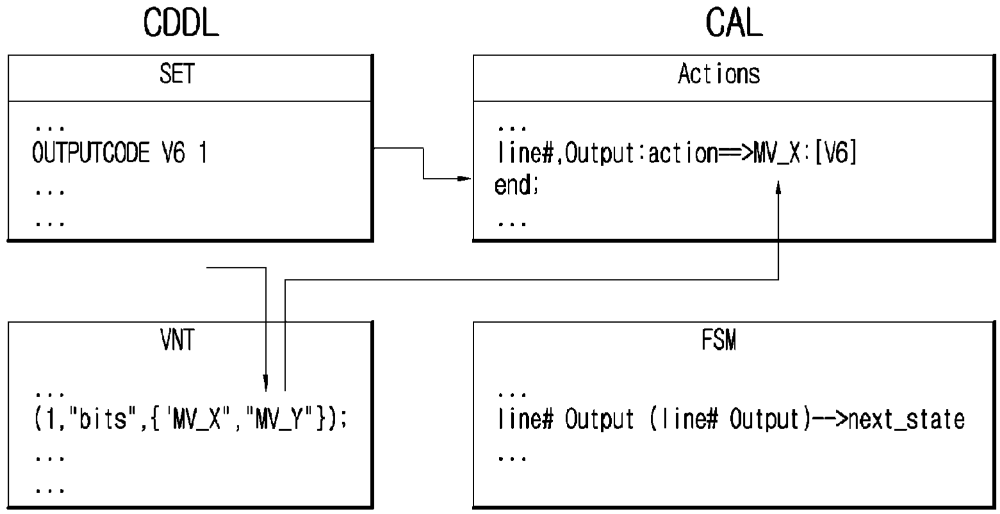
FIG. 61 is an example showing how a VNT is used in accordance with yet anther embodiment of the present invention.

FIG. 61 is an example showing how a VNT is used in accordance with yet anther embodiment of the present invention.

When a parser transfers data to a port, the VNT can be used. The VNT describes a breakdown of a port through which a certain functional unit can output data. When a driving method of a parser is described by using an OUTPUT command, the CDDL helps particular data to be transmitted to a pertinent output port. At this time, VNT information is used to compare a name of output port and transmit an output to an adequate port.

Figure 62:
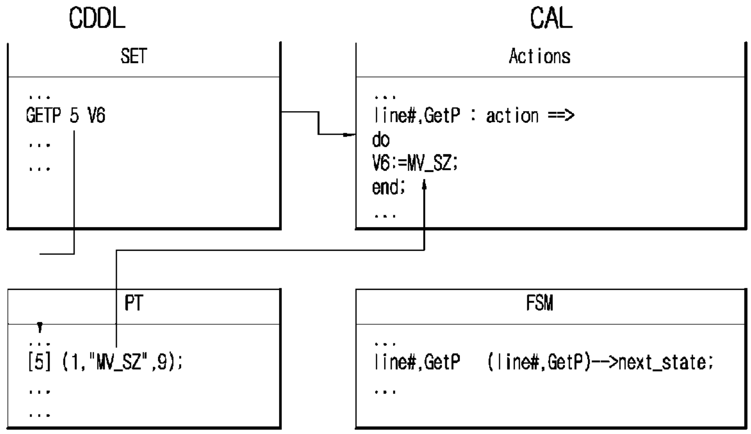
FIG. 62 is an example showing how a PT is used in accordance with yet anther embodiment of the present invention.

FIG. 62 is an example showing how a PT is used in accordance with yet anther embodiment of the present invention.

Information described in the PT can be used when a value is transferred to a functional unit and while some of necessary information is received from an outside in the parsing process. In this case, a parameter value described in the PT can be extracted by using a command such as GETP.

Figure 63:
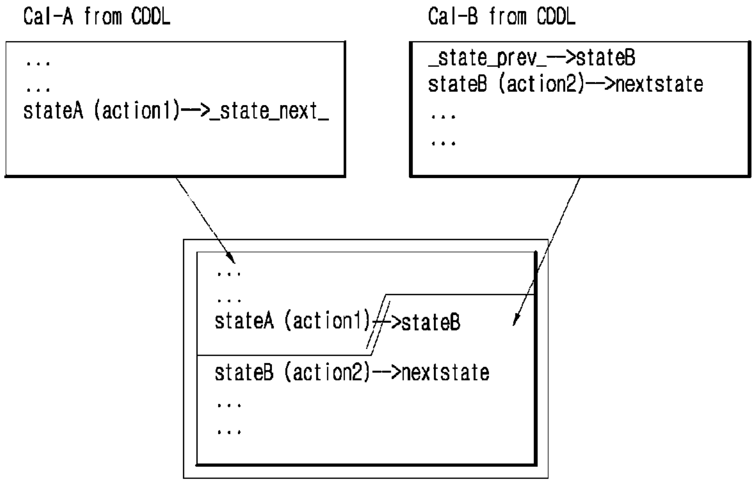
FIG. 63 and FIG. 64 are examples showing the combination of an FSM section and the combination of a global variable section among a CAL source in accordance with yet anther embodiment of the present invention.
Figure 64:
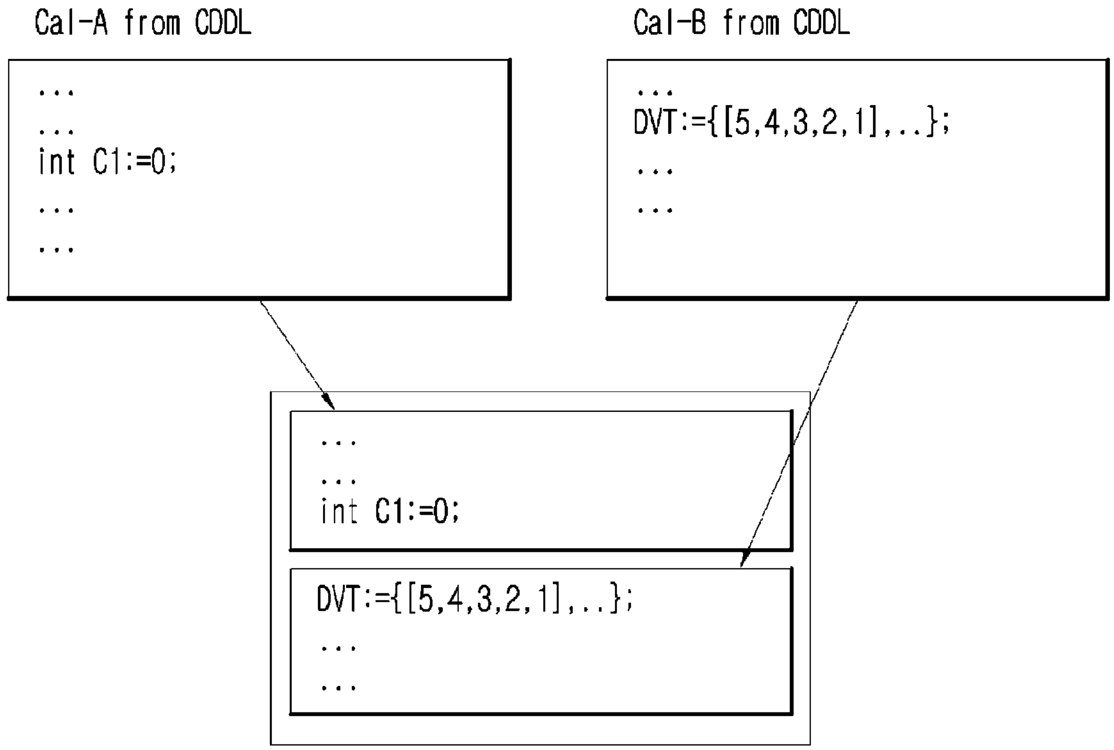

FIG. 63 and FIG. 64 are examples showing the combination of an FSM section and the combination of a global variable section among a CAL source in accordance with yet anther embodiment of the present invention.

Each CDDL statement has code fragments in CAL. Combining the code fragments can make a completed statement information parser that is actually operated. Each code fragment is defined as shown in FIG. 63 and FIG. 64. The breakdowns corresponding to “global variables” and “actions” are combined by simply unifying all necessary global variables. However, the global variables and actions, which have been ever described as CAL sources by CDDL commands or statements, are not defined twice but reused. The breakdown corresponding to the “FSM” is used for the combining by providing information related to the method of combining each code fragment with the previous code fragments and the following code fragments to identifiers such as _state_prev_, _state_next_.

INDUSTRIAL APPLICABILITY

This present invention can be used for an encoding or decoding system of a video.

The invention claimed is:

1. A decoding apparatus, comprising:

a description storing unit configured to store partial decoder descriptions;

a description decoder configured to receive a decoder description that includes a new partial decoder description and update information for one of the stored partial decoder descriptions, the update information including an identifier for identifying the stored partial decoder description to be updated, store the new partial decoder description in the description storing unit, and update the stored partial decoder description according to the received update information and the identifier;

a decoder forming unit configured to generate and output connection control information by using the new and updated partial decoder descriptions stored in the description storing unit; and a decoding unit configured to selectively load a plurality of functional units included in a toolbox by using the connection control information, and direct the functional units to perform a predetermined process in an order according to the connection control information, wherein the connection control information identifies the plurality of functional units to be selectively loaded by the decoding unit and specifies an order of processing the plurality of functional units by the decoding unit.

2. The decoding apparatus of claim 1, wherein the toolbox comprises at least one parsing functional unit and a plurality of decoding functional units, the parsing functional unit configured to perform syntax parsing of a bitstream, the plurality of decoding functional units configured to decode the bitstream.

3. The decoding apparatus of claim 1, wherein the partial decoder descriptions are described to be compatible with a network language.

4. The decoding apparatus of claim 1, wherein the partial decoder descriptions are converted to a caltrop actor language (CAL) and stored in the description storing unit or converted to a caltrop actor language (CAL) and used by the decoder forming unit.

* * * * *